United States Patent [19]

Evans et al.

[11] 4,029,947

[45] June 14, 1977

[54] CHARACTER GENERATING METHOD AND SYSTEM

[75] Inventors: Gregory W. Evans, Santa Ana; Robert L. Caswell, Placentia, both of Calif.

[73] Assignee: Rockwell International Corporation, El Segundo, Calif.

[22] Filed: May 11, 1973

[21] Appl. No.: 359,591

[52] U.S. Cl. ........................ 235/151; 340/324 AD; 354/7

[51] Int. Cl.² ........................................... G06F 3/14

[58] Field of Search ......... 340/172.5, 324, 324 AD, 340/324 A

[56] References Cited

UNITED STATES PATENTS

| | | | |
|---|---|---|---|
| 3,422,419 | 1/1969 | Mathews et al. | 340/324 A |
| 3,430,207 | 2/1969 | Davis | 340/172.5 |
| 3,480,943 | 11/1969 | Manber | 340/172.5 X |
| 3,588,872 | 6/1971 | Kolb et al. | 340/324 AD |
| 3,594,759 | 7/1971 | Smura | 340/324 A |
| 3,629,841 | 12/1971 | Hare | 340/172.5 |
| 3,686,662 | 8/1972 | Blixt et al. | 340/324 AD |
| 3,789,200 | 1/1974 | Childress et al. | 235/151 |

*Primary Examiner*—Eugene G. Botz
*Attorney, Agent, or Firm*—H. Frederick Hamann; G. Donald Weber, Jr.

[57] ABSTRACT

A digital character generator method and system encode characters based on a normalized quad in accordance with coordinates of initial starting points of outlines of the character and variational parameters defining changes in those outlines such as slope and curvature. All characters of all formats are encoded for a maximum point size display. Vertical scaling factors permit character generation at any desired point size display. Horizontal scaling factors are employed both for transforming computations based on the encoded parameters for the normalized quad to a desired point size of display and also to adapt cyclic computations to the stroking density of a display CRT.

47 Claims, 50 Drawing Figures

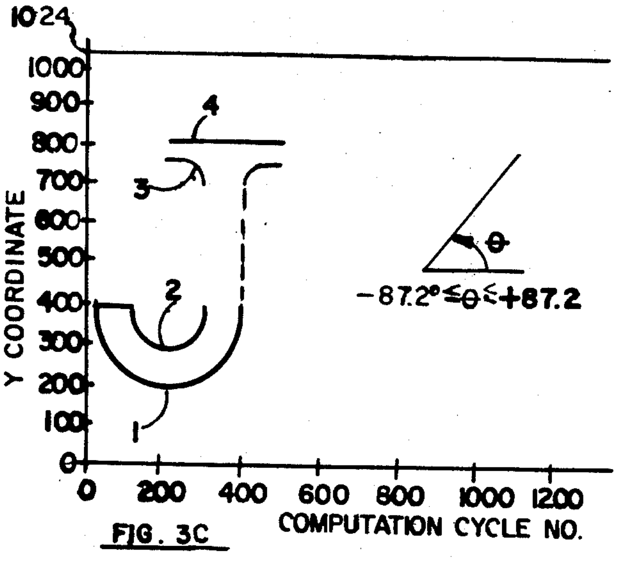

FIG. 3C

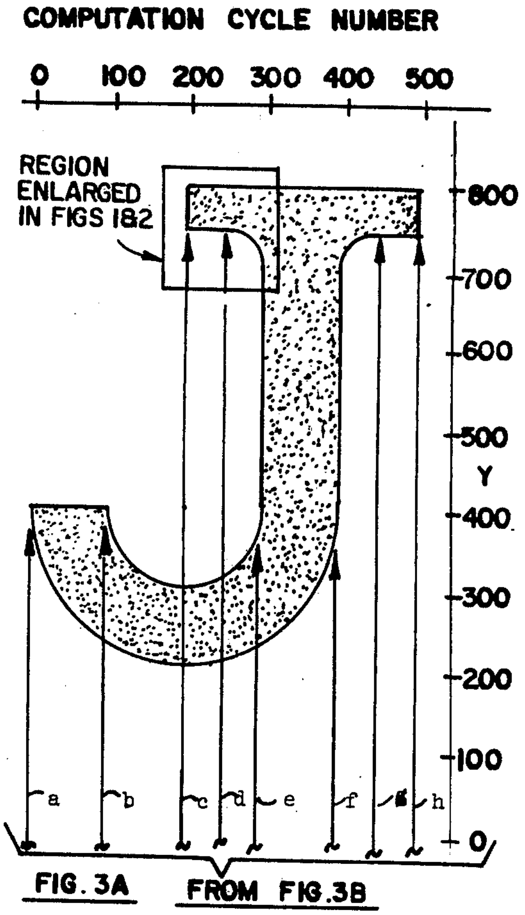

FIG. 3A

FROM FIG.3B

PACT INSTRUCTION SET FOR UPPER CASE "J"

| | INSTRUCTION | PARAMETER AND ITS VALUE | OUTLINE MODIFIED BY INSTRUCTION | COMPUTATION CYCLE TO NEXT INSTRUCTION |
|---|---|---|---|---|
| BOLP | BEGIN OUTLINE PAIR | Y = 400<br>Y = 400 | 1<br>2 | 0 |
| CM | CHANGE SLOPE | $\theta$ = -87.2° | 1 | 0 |
| CK | CHANGE CURVATURE | K = $+\frac{1}{200}$ | 1 | 100 |
| CM | CHANGE SLOPE | $\theta$ = -87.2° | 2 | 0 |
| CK | CHANGE CURVATURE | K = $+\frac{1}{100}$ | 2 | 100 |
| BOLP | BEGIN OUTLINE PAIR | Y = 750<br>Y = 800 | 3<br>4 | 50 |
| CK | CHANGE CURVATURE | K = $-\frac{1}{50}$ | 3 | 50 |
| EOLP | END OUTLINE PAIR | — | 2<br>3 | 100 |
| BOLP | BEGIN OUTLINE PAIR | Y = 700 | 1 | 0 |
| | | Y = 700 | 1 | 0 |
| CM | CHANGE SLOPE | $\theta$ = +87.2° | 1 | 0 |
| CK | CHANGE CURVATURE | K = $-\frac{1}{50}$ | 1 | 50 |
| CM | CHANGE SLOPE | $\theta$ = 0° | 1 | 50 |
| EC | END CHARACTER | — | — | 0 |

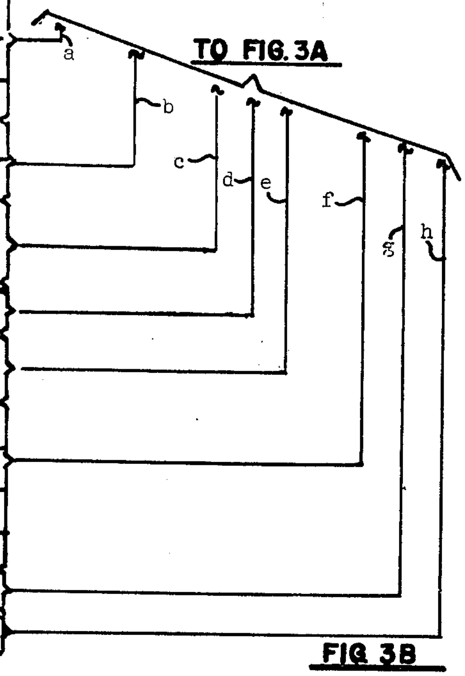

FIG 3B

PACT INSTRUCTION FORMAT

| | | | | | | | | | | | | | | | | |
|---|---|---|---|---|---|---|---|---|---|---|---|---|---|---|---|---|
| NOP | OP CODE | | | | | NOT USED | | | C.C. TO NEXT INST | | | | | | | |
| | 0 | 0 | 0 | 0 | 0 | 0 | 0 | 0 | $X_{128}$ | $X_{64}$ | $X_{32}$ | $X_{16}$ | $X_8$ | $X_4$ | $X_2$ | $X_1$ |
| BOLP | OP CODE | | | Intermediate Order Bits Y Smaller | | | | | Number of Outline With Smaller Y Coor. | | | | High Order Bits of Y Smaller | | | Lowest Order |
| | 0 | 0 | 1 | Ys13 | Ys12 | Ys11 | Ys10 | Ys9 | J4 | J3 | J2 | J1 | Ys16 | Ys15 | Ys14 | Ys8 |
| | Not Used | | | Intermediate Order Bits Y Larger | | | | | Number of Outline with Greater Y Coor. | | | | High Order Bits of Y Larger | | | Lowest Order |
| | 0 | 0 | 0 | $Y_{L13}$ | $Y_{L12}$ | $Y_{L11}$ | $Y_{L10}$ | $Y_{L9}$ | J4 | J3 | J2 | J1 | $Y_{L16}$ | $Y_{L15}$ | $Y_{L14}$ | $Y_{L8}$ |
| CDY | OP CODE | | | | | Not Used | | | Outline Number | | | | C.C to next inst. | | | |
| | 0 | 0 | 0 | 1 | 1 | 0 | 0 | 0 | J4 | J3 | J2 | J1 | $X_8$ | $X_4$ | $X_2$ | $X_1$ |
| | Not Used | Y Increment Value (neg. values are 1's complement) | | | | | | | | | | | | | | |
| | 0 | $\Delta Y_2$ | $\Delta Y_1$ | Sign 0 = + | $\Delta Y_{14}$ | $\Delta Y_{13}$ | $\Delta Y_{12}$ | $\Delta Y_{11}$ | $\Delta Y_{10}$ | $\Delta Y_9$ | $\Delta Y_8$ | $\Delta Y_7$ | $\Delta Y_6$ | $\Delta Y_5$ | $\Delta Y_4$ | $\Delta Y_3$ |
| CM | OP Code | | SLOPE INFORMATION | | | | | | Outline Number | | | | C.C. to next Inst. | | | |
| | 0 | 1 | $M_8$ | $M_7$ | $M_6$ | $M_5$ | $M_4$ | $M_3$ | J4 | J3 | J2 | J1 | $X_8$ | $X_4$ | $X_2$ | $X_1$ |
| CK | OP Code | Curvature Information | | | | | | | Outline Number | | | | C.C. to next inst. | | | |
| | 1 | K7 | K6 | K5 | K4 | K3 | K2 | K1 | J4 | J3 | J2 | J1 | $X_8$ | $X_4$ | $X_2$ | $X_1$ |
| EOLP | OP Code | | | | | Not Used | | | Number of Outline With Smaller Y Coord. | | | | C.C. to next inst. | | | |
| | 0 | 0 | 0 | 1 | 0 | 0 | 0 | 0 | J4 | J3 | J2 | J1 | $X_8$ | $X_4$ | $X_2$ | $X_1$ |
| EC | OP Code | | | | | Not Used | | | | | | | MUST BE ALL 0 | | | |
| | 0 | 0 | 0 | 0 | 1 | 0 | 0 | 0 | 0 | 0 | 0 | 0 | 0 | 0 | 0 | 0 |

FIG. 4

NOTE "CC" stands for "Computation Cycles"

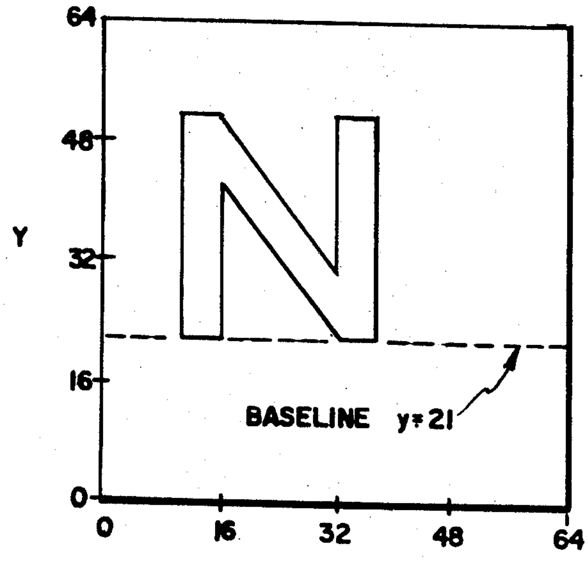
FIG. 5
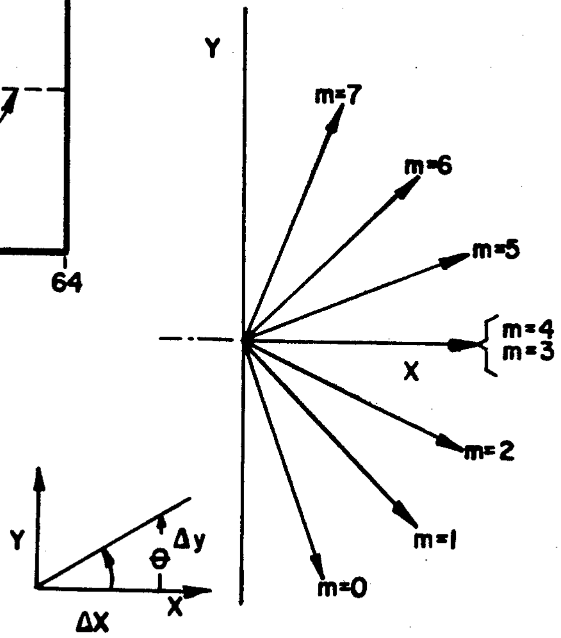
FIG. 6
CALCULATION OF ΔY(M) VALUES
| PACT CODE FOR M | | θ | TAN θ | ΔY(M) M = 0,···,7 ΔX = 1 |
|---|---|---|---|---|
| Base 10 | Base 2 | | | |
| 0 | 0 0 0 | -67.5° | -2.414 | -2 27/64 |
| 1 | 0 0 1 | -45° | -1.000 | -1 |
| 2 | 0 1 0 | -22.5° | -0.414 | - 27/64 |
| 3 | 0 1 1 | 0° | 0 | 0 |
| 4 | 1 0 0 | 0° | 0 | 0 |
| 5 | 1 0 1 | +22.5° | +0.414 | + 27/64 |
| 6 | 1 1 0 | +45° | +1.000 | +1 |
| 7 | 1 1 1 | +67.5° | +2.414 | +2 27/64 |
$M_3$ $M_2$ $M_1$
FIG. 7

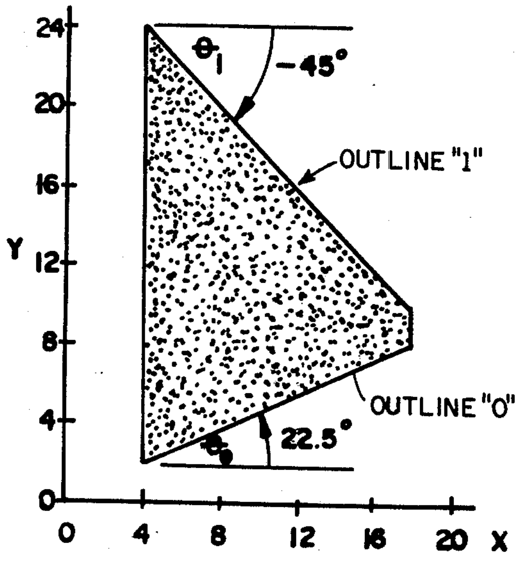
FIG. 8
PACT INSTRUCTIONS:
| Instruction Name | Sym. | Parameter Information | $\Delta X_I$ |
|---|---|---|---|
| Begin Outline Pair | BOLP | $y_o = 2$<br>$y_1 = 24$ | 0 |
| Change Slope | CM | $m_o = 5$ | 0 |
| Change Slope | CM | $m_1 = 1$ | 14 |
| End Character | EC | ——— | ——— |
FIG. 9
| X | $y_o(X)$ | $y_1(X)$ |
|---|---|---|
| 4 | 2 | 24 |
| 5 | 2 27/64 | 23 |
| 6 | 2 54/64 | 22 |
| 7 | 3 17/64 | 21 |
| 8 | 3 44/64 | 20 |
| 9 | 4 7/64 | 19 |
| 10 | 4 34/64 | 18 |
| 11 | 4 61/64 | 17 |
| 12 | 5 24/64 | 16 |
| 13 | 5 51/64 | 15 |
| 14 | 6 14/64 | 14 |
| 15 | 6 41/64 | 13 |
| 16 | 7 4/64 | 12 |
| 17 | 7 31/64 | 11 |
FIG. 10
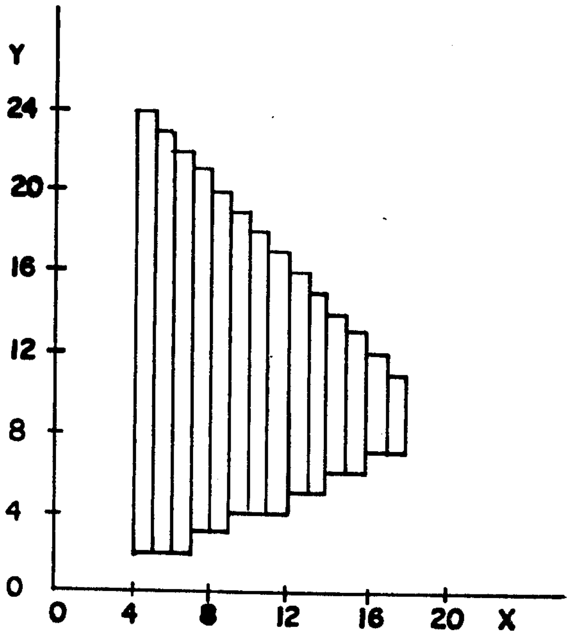
FIG. 11

Base 10

| Input $M^+$ | Output $\|\Delta Y(M)$ |
|---|---|
| 0 | 0 |
| 1 | 27/64 |
| 2 | 1 |
| 3 | 2 27/64 |

Base 2

| Input $M^+$ | Output $\|\Delta Y(M)$ |
|---|---|
| 0 0 | 0 0 \| 0 0 0 0 0 0 |
| 0 1 | 0 0 \| 0 1 1 0 1 1 |
| 1 0 | 0 1 \| 0 0 0 0 0 0 |
| 1 1 | 1 0 \| 0 1 1 0 1 1 |

$M_2^+$ $M_1^+$ $N_1$ $N_2$ $M^+$ TRUTH TABLE

| M | $\overline{M_3}$ | $M_2$ | $M_1$ | $M_2^+$ | $M_1^+$ |
|---|---|---|---|---|---|
| 0 | 1 | 0 | 0 | 1 | 1 |
| 1 | 1 | 0 | 1 | 1 | 0 |
| 2 | 1 | 1 | 0 | 0 | 1 |
| 3 | 1 | 1 | 1 | 0 | 0 |
| 4 | 0 | 0 | 0 | 0 | 0 |
| 5 | 0 | 0 | 1 | 0 | 1 |
| 6 | 0 | 1 | 0 | 1 | 0 |
| 7 | 0 | 1 | 1 | 1 | 1 |

| PACT CODE FOR K | | DESIRED $r_c$ |
|---|---|---|
| Base 10 | Base 2 | |
| 0 | 0 0 0 | 64 |
| 1 | 0 0 1 | 16 |
| 2 | 0 1 0 | 32 |
| 3 | 0 1 1 | 8 |
| 4 | 1 0 0 | 64 |
| 5 | 1 0 1 | 16 |
| 6 | 1 1 0 | 32 |
| 7 | 1 1 1 | 8 |

$k_3 k_2 k_1$

| k | m | $S_N$ |
|---|---|---|
| 6 | 4 | 6 |
| 6 | 5 | 12 |
| 6 | 6 | 9 |
| 6 | 7 | 5 |

Y → y + Δy(m)
S → S + 1

M → M + 1 when S = $S_N$

| X | M | S | $S_N$ | ΔY(M) | Y Integer | Y 1/64's | X | M | S | $S_N$ | ΔY(M) | Y Integer | Y 1/64's |
|---|---|---|---|---|---|---|---|---|---|---|---|---|---|
| 4 | 4 | 1 | 6 | 0 | 0 | | 20 | 5 | 11 | 12 | 27/64 | 4 | 41 |
| 5 | 4 | 2 | 6 | 0 | 0 | | 21 | 5 | 12 | 12 | " | 5 | 4 |
| 6 | 4 | 3 | 6 | 0 | 0 | | 22 | 6 | 1 | 9 | 1 | 6 | 4 |
| 7 | 4 | 4 | 6 | 0 | 0 | | 23 | 6 | 2 | 9 | " | 7 | 4 |
| 8 | 4 | 5 | 6 | 0 | 0 | | 24 | 6 | 3 | 9 | " | 8 | 4 |
| 9 | 4 | 6 | 6 | 0 | 0 | | 25 | 6 | 4 | 9 | " | 9 | 4 |
| 10 | 5 | 1 | 12 | 27/64 | 0 | 27 | 26 | 6 | 5 | 9 | " | 10 | 4 |
| 11 | 5 | 2 | 12 | " | 0 | 54 | 27 | 6 | 6 | 9 | " | 11 | 4 |
| 12 | 5 | 3 | 12 | " | 1 | 17 | 28 | 6 | 7 | 9 | " | 12 | 4 |
| 13 | 5 | 4 | 12 | " | 1 | 44 | 29 | 6 | 8 | 9 | " | 13 | 4 |
| 14 | 5 | 5 | 12 | " | 2 | 7 | 30 | 6 | 9 | 9 | " | 14 | 4 |
| 15 | 5 | 6 | 12 | " | 2 | 34 | 31 | 7 | 1 | 5 | 2 27/64 | 16 | 31 |
| 16 | 5 | 7 | 12 | " | 2 | 61 | 32 | 7 | 2 | 5 | " | 18 | 58 |
| 17 | 5 | 8 | 12 | " | 3 | 24 | 33 | 7 | 3 | 5 | " | 21 | 21 |
| 18 | 5 | 9 | 12 | " | 3 | 51 | 34 | 7 | 4 | 5 | " | 23 | 48 |
| 19 | 5 | 10 | 12 | " | 4 | 14 | 35 | 7 | 5 | 5 | " | 26 | 9 |

S(M) (BASE 10) ROM BIT PATTERN:

| (BASE 10) $M^+$ | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 0 | 0 | 0 | 0 | 0 | 0 | 0 | 1 | 1 | 1 | 1 | 1 | 1 | 1 | 1 | 1 | 1 |
| 1 | 0 | 0 | 0 | 0 | 0 | 0 | 0 | 0 | 0 | 0 | 0 | 0 | 1 | 1 | 1 | 1 |
| 2 | 0 | 0 | 0 | 0 | 0 | 0 | 0 | 0 | 0 | 1 | 1 | 1 | 1 | 1 | 1 | 1 |
| 3 | 0 | 0 | 0 | 0 | 0 | 1 | 1 | 1 | 1 | 1 | 1 | 1 | 1 | 1 | 1 | 1 |

δ line

| PACT CODED K (Base 10) | (Base 2) | DESIRED $r_c$ | Δ M | Δ S | $S_o$ |
|---|---|---|---|---|---|
| 0 | 0 0 0 | 64 | $-\frac{1}{2}$ | +1 | +1 |
| 1 | 0 0 1 | 16 | -2 | +1 | +1 |
| 2 | 0 1 0 | 32 | -1 | +1 | +1 |
| 3 | 0 1 1 | 8 | -2 | +2 | +2 or +3 |
| 4 | 1 0 0 | 64 | $+\frac{1}{2}$ | +1 | +1 |
| 5 | 1 0 1 | 16 | +2 | +1 | +1 |
| 6 | 1 1 0 | 32 | +1 | +1 | +1 |
| 7 | 1 1 1 | 8 | +2 | +2 | +2 or +3 |

$K_3K_2K_1$

PACT PROCESSOR

COMPUTATION AND
STORAGE UNIT
(CSU)

COMPUTATION OF $Y_n$

SUMMARY $k_7 = 1 \Rightarrow \Delta m_k > 0$ $k_7 = 0 \Rightarrow \Delta m_k < 0$ $\Delta m_k = \frac{1}{4}, \frac{1}{2}, 1, 2, 4, 8$ $m_8 = 1 \Rightarrow \Delta y_m > 0$ $m_8 = 0 \Rightarrow \Delta y_m < 0$ $\Delta y_m = 0, \frac{3}{64}, \ldots, 10\frac{10}{64}, 19\frac{28}{64}$ COMPUTATION OF $M_n$

K DECODE LOGIC

| Input | | | | Output | | |
|---|---|---|---|---|---|---|
| K6 | K5 | K2 | K1 | $\lvert\Delta M\rvert$ | $\Delta S_I$ | $\Delta S_F$ |
| 0 | 0 | 0 | 0 | $\frac{1}{4}$ | 1 | 0 |
| 0 | 0 | 0 | 1 | $\frac{1}{4}$ | 1 | 1/16 |
| 0 | 0 | 1 | 0 | $\frac{1}{4}$ | 1 | 1/8 |
| 0 | 1 | 0 | 0 | $\frac{1}{2}$ | 1 | 0 |
| 0 | 1 | 0 | 1 | $\frac{1}{2}$ | 1 | 1/16 |
| 0 | 1 | 1 | 0 | $\frac{1}{2}$ | 1 | 1/8 |
| 1 | 0 | 0 | 0 | 1 | 1 | 0 |
| 1 | 0 | 0 | 1 | 1 | 1 | 1/16 |
| 1 | 0 | 1 | 0 | 1 | 1 | 1/8 |
| 1 | 1 | 0 | 0 | 2 | 1 | 0 |
| 1 | 1 | 0 | 1 | 2 | 1 | 1/16 |
| 1 | 1 | 1 | 0 | 2 | 1 | 1/8 |
| 1 | 1 | 1 | 1 | 2 | 2 | 0 |
| 1 | 0 | 1 | 1 | 4 | 2 | 0 |
| 0 | 1 | 1 | 1 | 4 | 4 | 0 |
| 0 | 0 | 1 | 1 | 8 | 4 | 0 |

FIG. 31A

MK DECODE LOGIC

| INPUT | | | | | | | OUTPUT |
|---|---|---|---|---|---|---|---|
| M | | | K | | | | |
| M6 | M5 | M4 | K6 | K5 | K2 | K1 | $S_o$ |
| | | 1 | 1 | 1 | 1 | 1 | 0 |
| | | 0 | 1 | 1 | 1 | 1 | 1 |
| | 1 | | 1 | 0 | 1 | 1 | 0 |
| | 0 | | 1 | 0 | 1 | 1 | 1 |
| | 1 | | 0 | 1 | 1 | 1 | 1 |
| | 0 | | 0 | 1 | 1 | 1 | 2 |
| 1 | | | 0 | 0 | 1 | 1 | 1 |
| 0 | | | 0 | 0 | 1 | 1 | 2 |
| | | | | | 1 | 0 | 0 |
| | | | | | 0 | 1 | 0 |
| | | | | | 0 | 0 | 0 |

FIG. 31C

PROM LOOK UP TABLE

| SLOPE M+ | \|ΔY(M)\| | $S_N$ K3 = 0 K4 = 0 | $S_N$ K3 = 1 K4 = 0 | $S_N$ K3 = 0 K4 = 1 | $S_N$ K3 = 1 K4 = 1 |
|---|---|---|---|---|---|
| 0 | 0 | 6 | 5 | 4 | 4 |
| 1 | 3/64 | 12 | 10 | 9 | 7 |
| 2 | 6/64 | 12 | 10 | 8 | 7 |
| 3 | 9/64 | 12 | 10 | 8 | 7 |
| 4 | 12/64 | 11 | 10 | 8 | 7 |
| 5 | 15/64 | 13 | 10 | 9 | 7 |
| 6 | 19/64 | 13 | 11 | 10 | 8 |
| 7 | 23/64 | 13 | 11 | 10 | 8 |
| 8 | 27/64 | 13 | 11 | 9 | 8 |
| 9 | 31/64 | 12 | 10 | 8 | 7 |
| 10 | 35/64 | 11 | 10 | 7 | 6 |
| 11 | 39/64 | 10 | 8 | 7 | 6 |
| 12 | 43/64 | 9 | 8 | 7 | 6 |
| 13 | 47/64 | 9 | 8 | 7 | 5 |
| 14 | 52/64 | 10 | 8 | 7 | 6 |
| 15 | 58/64 | 10 | 8 | 7 | 6 |
| 16 | 1 | 9 | 8 | 6 | 5 |
| 17 | 1 7/64 | 9 | 7 | 6 | 5 |
| 18 | 1 14/64 | 7 | 6 | 6 | 5 |
| 19 | 1 22/64 | 7 | 6 | 5 | 4 |
| 20 | 1 32/64 | 8 | 6 | 5 | 4 |
| 21 | 1 43/64 | 7 | 6 | 4 | 4 |
| 22 | 1 56/64 | 6 | 5 | 4 | 4 |
| 23 | 2 7/64 | 5 | 4 | 4 | 3 |
| 24 | 2 27/64 | 5 | 4 | 3 | 3 |
| 25 | 2 51/64 | 4 | 4 | 3 | 3 |
| 26 | 3 19/64 | 4 | 3 | 3 | 2 |
| 27 | 3 63/64 | 3 | 3 | 3 | 2 |
| 28 | 5 2/64 | 2 | 2 | 2 | 1 |
| 29 | 6 41/64 | 2 | 2 | 1 | 1 |
| 30 | 10 10/64 | 2 | 1 | 1 | 1 |
| 31 | 19 23/64 | 1 | 0 | 0 | 0 |

FIG. 31B

SCALING, STROKING, AND VIDEO CONTROL UNIT 22 (SSVCU)

CENTRAL PROCESSING UNIT 26 (CPU)

PROCESSOR STATES

OUTLINE SEQUENCE UNIT 124

CHARACTER GENERATING METHOD AND SYSTEM

BACKGROUND OF THE INVENTION

1. Field of the Invention

The present invention relates to character generating systems and, more particularly, to a digital such system having a minimum data storage requirement and wherein character display controls are derived by computations on a few stored parameters by which each character is encoded.

2. State of the Prior Art

Character generators have numerous applications, a common commercial one being phototypesetters. Early such devices were primarily optical and used masks formed in the character configurations. CRT displays were developed wherein the patterns may be defined either optically or from digitally derived signals. As one example, a flying spot scanner is optically coupled to a matrix of character representations to derive the digital signals for the pattern in U.S. Pat. No. 3,324,346.

Other CRT systems have employed masks which are scanned for a similar purpose, as in U.S. Pat. Nos. 2,275,017 and 2,379,880.

One brute force method of character encoding is to identify each element or dot of a matrix of dots which correspond to the character segments when a character is superimposed on the matrix. A dot-type generating system is described in U.S. Pat. No. 3,165,145. A severe disadvantage of this approach is the excessively large amount of storage required for even moderate to poor quality reproduction.

Another form of coding developed in the prior art generally involves the breaking down of a character's area into narrow strips and quantizing and storing the starting coordinates and length of each strip. Such a technique is disclosed in U.S. Pat. No. 3,305,841. An improvement in that technique is set forth in U.S. Pat. No. 3,471,848 wherein an incremental form of encoding the terminal points of successive strips is employed. This generally serves to reduce the required memory for the encoded character data.

An alternative approach in the more recent prior art is set forth in U.S. Pat. No. 3,422,419 in which a set of characters is analyzed to define a plurality of patterns which are common to one or more characters and are of substantially rectangular configuration, comprising a plurality of line segments of controlled length. Each character is encoded as comprising a combination of selected ones of these common patterns. Such a system, while reducing storage requirements, can pose great restrictions on the font styles and result in some distortion of the generated characters.

SUMMARY OF THE INVENTION

In accordance with the present invention, all characters of all fonts to be stored in memory are encoded in relation to a normalized quad. The quad in general corresponds to the maximum point size character to be displayed.

Each character is analyzed in relation to the coordinates of the quad and specifically as to outline pairs which contain therebetween a segment of the character and thus define the boundaries of such a segment. Each character thus is defined by one or more of these outline pairs. The encoded information as to the parameters of each character includes the Y coordinates of the starting point or points of each such outline pair and the slope and curvature (variable directional parameters) of each such outline. In the quad, the X coordinate spacing, or bit positions, along the X coordinate are defined as unity value. Hence, all slopes are defined by incremental changes in the Y coordinate of the outline for successive X coordinate positions. Curvatures are then encoded for certain predetermined radii of curvature which are matched to the character outlines. Each such curvature determines a succession of incrementally changing slopes. Moreover, the rate of incrementing of the slopes is varied. Hence, a given curvature defines a succession of incremental slope changes each of varying duration, and the slope increments in turn determine successions of incremental changes in the Y coordinate positions.

Generation of a character from this encoded and stored parameter information is performed in accordance with successive computation cycles corresponding to successive X coordinate positions. Sequencing through successive computation cycles is a time function dependent on the number of computations which must be performed which, in turn, depends upon the number of outlines to be processed.

Character display finally is performed as a function of blanking and unblanking a scanning beam as it is directed through successive horizontally displaced vertical strokes. Each outline pair causes the scanning beam to be unblanked and scanned through the vertical displacement of the outline pair. As before noted, horizontal scaling factors provide for correlating the stroking function at any desired stroke density with the computed Y coordinate transition values generated in successive computation cycles as a function both of stroke density and the required point size of the display.

BRIEF DESCRIPTION OF THE DRAWINGS

FIG. 3A illustrates a character generated by the instructions of the table of FIG. 3B, relative to a normalized quad, and FIG. 3C illustrates the outlines of the same character of FIG. 3A as numbered in the instructions of FIG. 3B.

FIG. 4 is a table of instructions illustrating their formats.

FIG. 5 is a simplified quad for illustrating character encoding.

FIG. 6 is a simplified plot of codable slopes.

FIG. 7 is a table of values for the slopes of FIG. 6.

FIG. 8 is a simplified quad having a simple character configuration thereon for explaining slope encoding.

FIG. 9 is a table of instructions for the character and quad of FIG. 8

FIG. 10 is a table of computed Y coordinate values for successive X coordinate positions, computed for the instructions of FIG. 9.

FIG. 11 is a plot of the character generated from the encoded instructions of FIG. 9.

FIG. 31A is a table of values for the K decode logic of FIG. 31.

FIG. 31B is a table of values stored in the $S_N$ PROM of FIG. 31.

FIG. 31C is a logic truth table for the MK decode logic block of FIG. 31.

DETAILED DESCRIPTION OF INVENTION

General Discussion

Figure 1:
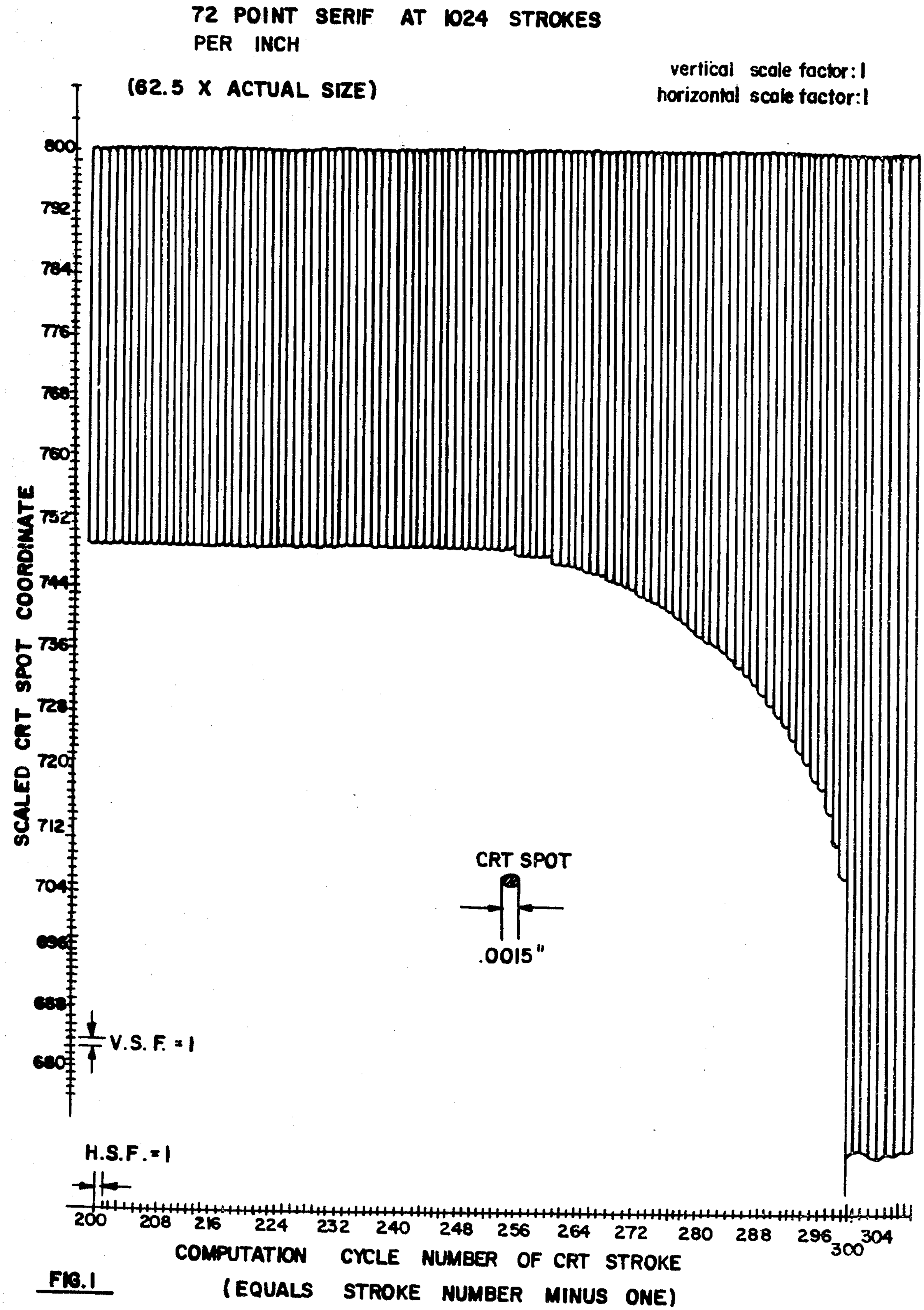
FIG. 1 is an illustration on a greatly enlarged scale of a 72 point Serif display for unity horizontal and vertical scale factors (HSF = VSF = 1) produced from encoded instructions in accordance with the invention.

Each character capable of being displayed typically is one of a plurality of characters of a set, generally designated a font or font style. It will be appreciated that each such font style must be available for display at any of a wide range of sizes. The typical terminology in typography relates character sizes to points as the basic typographic unit, one point being approximately 1/72 of an inch. Thus, a 9-point character is defined within a quad of $9 \times 1/72$ inch = ⅛ inch. Correspondingly, a 72-point character has a quad of 1 inch.

In the present invention, each character is encoded for storage in accordance with a normalized quad common to all characters of all fonts. That quad arbitrarily is assigned a coordinate system of 1,024 coordinate or bit positions in the X direction and 1,024 coordinate or bit positions in the Y direction.

As detailed hereafter, the present invention requires a minimum of storage or memory for the encoded character data. Particularly, each character is encoded as to certain parameters related to the outlines of each portion of the character in relation to the normalized quad. The outlines thus are related in pairs and in essence are the boundaries of the solid areas, or segments, of each character. Whereas a normalized quad is postulated as the basis for encoding of characters, in fact, the subject system is not inherently restricted to a predetermined quad configuration in the sense of the typically square quad of typography. Instead, the horizontal dimension or width of the quad effectively is variable in accordance with the width of a character.

The encoded and stored parameters for each character include the Y coordinates for the initial, or starting point, of each outline and slopes and curvatures of those outlines. In relation to the quad, each bit position in the X coordinate of the quad encompassing the character is considered as a unit spacing, and a computation is performed in relation to the stored parameters for each such successive X bit position of the quad encompassing the character, i.e., each computation cycle, to compute the Y coordinates at that bit position of each outline.

The display of each character is performed on a cathode ray tube (CRT) display screen of high resolution, both as to the quality of the luminescent screen and as to the control sensitivity of the scanning electron beam. As the scanning beam is displaced through a vertical stroke, the computed Y coordinates of the successive outlines of each pair cause the beam to be alternately unblanked and blanked, "filling-in" that vertical portion of the character segment between the outline pair. The character generator of the invention is adaptable to any desired scan density of the display CRT. For example, the display CRT may have a total display line width of 11 inches. A fixed increment of the successive displacement of vertical scans across that preset maximum width, as well, is established and, as an example, may comprise $2^{14}$ positions, or bit positions, for a total of 16,384 bit positions, across the 11 inch width or, more precisely 1,488 bits per inch. Typically, the scan density or resolution is adjustable and may be selected at the maximum of 1/1488 inch or at 1/744 inch (i.e., one scan or stroke for each bit position or every other bit position). In high quality display CRT's of the type contemplated to be employed with the present character generator, the spot size of the scanning CRT beam is very precisely controlled. In the present example, a spot size of 0.0015 inches may be employed. With these specifications, overlap of strokes may be achieved with a scan density, i.e., stroke displacement, of 1/744 inch.

A significant point to appreciate is that in the present invention, the bit positions, or the divisions of the quad are independent of the scan raster, and thus as well is the encoding of the characters, although obviously the two must be correlated to achieve the display function. Specifically, the characters are encoded for a maximum point size of display within the normalized quad. Horizontal and vertical scaling factors then are introduced for transforming the computed coordinate data for control of the scanning CRT beam, in accordance with the desired point size of the display. Thus, a single set of encoded character data for any given font suffices for display of all characters of that font in any desired point size within the full range of available point sizes.

A minicomputer receives the input data designating the font style and size for the display, as well as the particular data to be displayed, and provides for positioning the scanning beam at the appropriate line and character spacing positions desired.

The number of displayed lines of characters displaced on the CRT also may be selected in view of the font size being displayed, under control of the computer.

In one application of the invention, the CRT display is used to expose a photoresponsive medium which then is incrementally advanced past the CRT display of each line of characters. The ability to display plural lines of characters before advance of the photoresponsive image receiving medium to a position for receiving a subsequent plurality of displayed lines of characters permits higher speed operations. In this regard, it will be appreciated that the deflection of the scanning beam through successive, vertically displaced character display lines is a far more rapid and easily performed function than incrementally advancing the medium for each display line.

To summarize thus far, every character of each font is encoded in relation to a normalized quad and the data necessary to reconstruct a character includes initial coordinates of the character within the quad, i.e., the starting position of the character outlines, and variational parameters such as direction and curvatures of lines and curves comprising the outline. Generation of a character outline proceeds concurrently with display of the character in accordance with computations performed in time sequence with the stroking intervals of the CRT display beam. As noted, however, there is not any necessary one-to-one correspondence between the computation intervals and the stroking intervals; furthermore, although the same number of computations for defining the character outline are performed regardless of the point size of the character desired to be generated, the Y coordinates which are output for control of the unblanking of the scanning beam are generated in relation to the horizontal scaling factor which relates the number of computation cycles to the desired point size and stroke density of the CRT beam.

Scaling: Computations and Actual Displays

As an example, in a system having a maximum 72-point size display, implying further that all characters are coded for that size, and assuming a normalized quad of $2^{10}$ bit positions (1,024 bit position), the scale factors are computed as follows:

$$\text{Horizontal Scale Factor (HSF)} = \left[\frac{72}{\text{Point size}}\right] \times \left[\frac{1024}{\text{Stroke Density}}\right] \quad \text{Eq. (1)}$$

$$\text{Vertical Scale Factor (VSF)} = \left[\frac{72}{\text{Point size}}\right] \times \left[\text{Ramp Rate}\right] \quad \text{Eq. (2)}$$

(It will be appreciated that fractional values may result from the above calculations. These may be expressed as binary number equivalents used and in fact are so developed for processing by the system).

The actual number of strokes per character is related to the computation cycles by the following expression:

$$\text{Strokes per character} = 1 + \frac{(\text{Total Number of computation cycles}) - 1}{\text{HSF}} \quad \text{Eq. (3)}$$

Where the integral number of strokes is obtained by dropping the fractional part of the results.

To aid in visualizing the foregoing, refer to FIG. 1 which illustrates the display of a 72-point Serif, on a greatly enlarged scale (refer to FIG. 3A), as produced by a scanning CRT having a stroke density of 1,024 strokes per inch. Note that FIG. 1 for illustrative purposes assumes a stroke density of an equal number of strokes per inch as the number of bit positions in the normalized quad. Further, the illustration is for a maximum 72-point size character display, thus relating the computation of outlines on a one-to-one basis to the initial encoding of the character. From Equations (1) and (2) above, HSF = VSF = 1. It also follows from Equation (3) that the number of strokes per character equals the number of computation cycles.

In FIG. 1, the initial coordinates are X = 200 and Y = 750 as to the lower outline, and X = 200 Y = 800 as to the upper outline. Given this initial information, the CRT beam may proceed immediately to scan the first line at the X = 200 position with the beam initially being blanked, then unblanked at Y = 750 and then again blanked at Y = 800. The vertical location of the beam during the stroke is determined by counting pulses of an 8 MHz clock which, by Equation (2) for a given ramp rate, thus identifies the actual physical position of the beam.

During a given stroke, the system computes the character outline positions for the succeeding stroke. Since HSF = 1 in FIG. 1, a computation is performed for each successive horizontal bit position and a stroke, as well, is performed for each bit position. As described in detail below, the encoding of the character as in FIG. 1 would identify the Serif as having no change in the upper and lower outlines, from computational cycle 200 at which it initiates through cycle 250. Thus, the identical blanking and unblanking of the beam proceeds for the time duration of 50 computation cycles. At cycle 250, however, a change occurs in the lower outline, comprising a downward curvature continuing in more or less regular fashion through computation cycle 300. As suggested in FIG. 1, the curve is approximated by a succession of incremental steps and thus the Y coordinate for the lower outline decreases in successive steps for predetermined numbers of the computation cycles along the X axis. For example, a first change in the lower Y coordinate exists from computation cycle 256 through 260 (5 cycles), a further change is produced from cycle 261 through 264 (4 cycles) and so forth.

Figure 2:
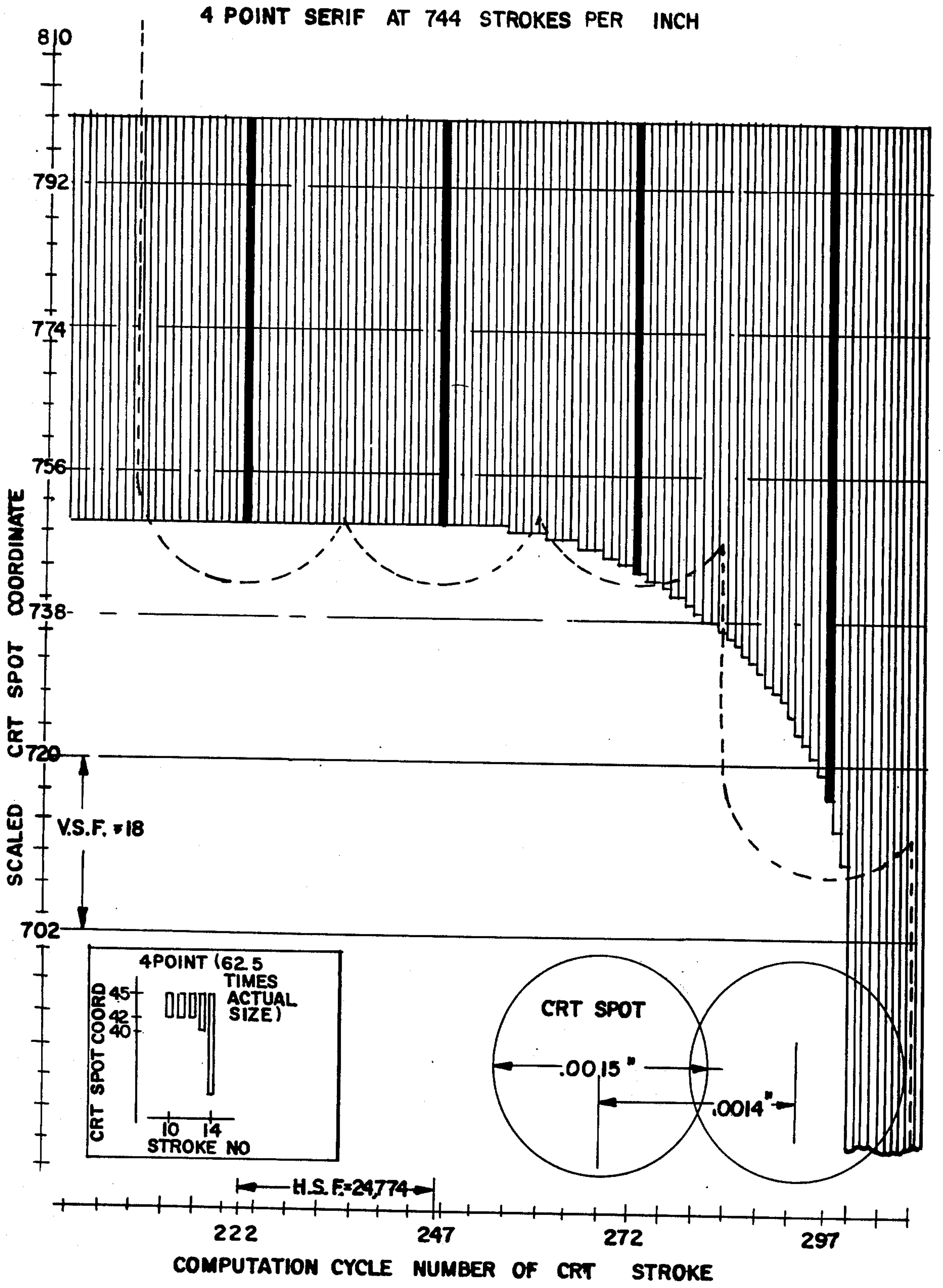
FIG. 2 is an illustration of the Serif as in FIG. 1 on an even larger scale, generated from the same encoded instructions but displayed at 4 points with VSF = 18 and HSF = 25.774, the insert illustrating the actual display on the same scale enlargement as in FIG. 1.

FIG. 2 now illustrates the more typical situation in which the stroke density does not correspond on a one-to-one basis with the bit positions of the normalized quad and, instead, a stroke density of 744 points per inch is illustrated. In addition, a 4-point Serif is illustrated which thus is 1/18th the size of the 72-point Serif of FIG. 1. From equation (2), VSF = 18 as illustrated in FIG. 2. The Serif is shown in FIG. 2 to be of the same size as in FIG. 1, since it is encoded on the basis of the normalized quad. However, whereas FIG. 1 illustrates the Serif at 62.5 times the actual display size of a 72-point character, for comparison, the display size of the 4-point Serif of FIG. 2 is suggested in the insert on FIG. 2. An appreciation of the scaling difference also will be derived by comparison of the CRT spot of 0.0015 inches in diameter as illustrated in FIG. 1 and that same spot in FIG. 2 for the 4-point Serif.

The beam location during each vertical stroke is still identified by the 8 MHz clock but instead of each clock pulse being counted as 1 as in FIG. 1, each clock pulse now causes a count increase of 18 in the counter. The ramp rate of the scanning beam, therefore, can remain constant.

From equation (1), HSF = 24.774 as also illustrated in FIG. 2. This implies that one vertical stroke is performed for each 24.744 computation cycles. To implement this, a whole number or integer number of computation cycles must be related to a single stroke and thus special circuitry is provided as hereinafter disclosed to vary the integer number of computation cycles for successive strokes whereby an average value of HSF = 24.774 is achieved.

Referring again to the insert in FIG. 2, it now will be seen that five strokes numbered from 10 to 14 are performed by the CRT to display the Serif portion of the illustrated character. FIG. 2 also shows in dotted line format the traces of the spot, the dark or heavy lines in FIG. 2 illustrating the computation cycle at which the actual strokes are performed. It will, of course, be appreciated that the resolution of the character is substantially decreased, consistent nevertheless with a high, or graphic arts, quality of the displayed character in view of its much reduced size. It also will be appreciated that once a stroke begins, the system proceeds to compute the character outlines, and hence the blanking and unblanking positions of the scanning beam, for the next stroke, and that multiple computation cycles are required.

Encoding of Character Data

In this section, there is considered in more detail the basic techniques of character encoding. In FIG. 3A is shown in large block "J" with a related table in FIG. 3B comprising the instructions for generating that character. The same character is shown in FIG. 3C to illustrate the outlines of the character. For correlation, FIG. 3A includes a bracketed region corresponding to the Serifs of FIGS. 1 and 2. The letter is seen to occupy 500 computational cycles with an initial X,Y coordinate of 0,400. As seen in FIG. 3A, the character is to be completely filled in by the CRT strokes and thus outline pairs are identified in FIG. 3C bounding those filled-in regions. At the beginning of the character (X ≡ 0), a first outline pair 1 and 2 is defined and at cycle No. 200, a new pair 3 and 4 initiates. As shown in FIG. 3C, the angle $\theta$ which ranges between ± 87.2° is measured relative to the horizontal. The line defining the angle is the tangent to the curved boundary or outline of the character, as discussed more fully hereafter.

Every character at its initial starting point necessarily includes at least one outline pair which for the illustrated letter "J" are the outlines lines 1 and 2 having a common initial Y coordinate 400. As knowledge of outline 1's slope is a prerequisite for the first computation cycle, the Begin Ouline Pair (BOLP) instruction must also indicate the need for this additional information. This is established in the last column of FIG. 3B as 0 "computation cycles to next instruction". At the starting point, outline 1 has a vertically downward direction. This is coded as a change slope instruction CM of $\theta = -87.2°$; again, 0 computation cycle is encoded. Also, at the starting point, outline 1 is encoded to have a change of curvature instruction (CK) of the curvature value +1/200. The CK instruction also is encoded for 100 computation cycles to the next instruction. Stroking and computing now proceeds, for the appropriate horizontal scaling factor, to the computation cycle (c.c.) No. 100.

Next, a CM instruction to change slope and a CK instruction to change curvature as to outline 2 are presented, which then prevail for the succeeding 100 computation cycles. No change in instruction for outline 1 is encoded and therefore, by computations to be explained, each of outlines 1 and 2 is defined in the curvilinear configuration shown until computation cycle 200. At c.c. 200, the outline pair 3,4 initiates in accordance with the further BOLP instruction encoded as to the respective Y coordinate values 750 and 800. At c.c. 250, there is a change curvature instruction CK for outline 3 encoded for curvature K = 1/50, which continues for 50 computation cycles. Note that an initial portion of outlines 2 and 3 and the entirely of outline 4 are horizontal and that no CM instruction is required to designate intial slopes for those outlines. Note also that no CM instruction is required prior to the CK instruction for outline 3, since no change in the tangent exists at the point the curve begins.

Note that outlines 2 and 3 cease to exist at cycle No. 300; this is established by the instruction End Outline Pair (EOLP). One hundred computation cycles are encoded in the EOLP instruction. As will be detailed, the outline pair which continue to define the remainder of the character now include the outlines 1 and 4. Hence, unblanking is continuous between outlines 1 and 4, outline 4 remaining a straight line and outline 1 continuing to follow the curvature of its earlier CK instruction.

At cycle No. 400, outline 1 is further defined by a special form of BOLP instruction, causing it to reinitialize at cycle No. 400 from a value of about Y = 400 directly to the value Y = 700. The special BOLP instruction is later described, but generally is employed to accommodate Y position discontinuities in the character outline at some intermediate X position. Outline 1 also is encoded in a CM instruction for $\theta = +87.2°$ and 0 c.c., and in a CK instruction for a curvature of K = 1/50, the CK instruction being encoded for 50 c.c. At cycle No. 450, the CM instruction encodes a change of slope to $\theta = 0°$ for 50 c.c., outline 1 thus proceeding as a horizontal line for the next 50 computation cycles. Finally, an instruction end character (RC) serves to identify completion of the character encoding, and hence completion of the computations for generating the character display controls.

FIG. 4 illustrates the instruction format as employed in an actual operating system. The instructions are based on a 16-bit word, BOLP and CDY each comprising two words. The seven instructions shown comprise the total of instructions for generation of any character. With the exceptions of NOP and EC, each instruction identifies not only the operation to be performed, or parameter to be controlled, but also the specific outline to which it relates and the number of computation cycles to the next instruction. An operational code of from 1 to 5 bit positions identifies the specific instruction and each, except for the BOLP instruction, includes a number of bits for encoding the computation cycles. Whereas 4 bits are provided for this purpose in the CDY, CM, CK and EOLP instructions, the NOP instruction includes 8 bit positions for this purpose. Thus, whereas 4 bits permit encoding of from 0 to 15 computational cycles to the next instruction, the NOP instruction permits encoding of 0 to 255 computation cycles. NOP therefore is useful where an extended portion of a character is to be generated without any outline information required NOP.

The two words of the BOLP instruction in succession relate to the upper and lower outlines of a given pair, as designated by the subscripts S and L for smaller and larger Y coordinate values. The Y value is encoded in 9 bits from bit 8 through bit 16, even though for computational purposes, Y comprises a 16 bit number. The 10 most significant bits identify the integar value of Y to one part in 1,024 and the lower order 6 bits are fractional bits required for approximating fractional, or noninteger portions of slope values. Control of the beam position, however, under the BOLP instruction, is limited, for convenience, to a 9-bit value and as implemented enables establishing an initial Y coordinate of any one of 512 even numbered values of the 1.024 bit positions of the Y coordinate axis. BOLP also has 4 bits in each word, J1 to J4, which identify the particular outline to which the instruction relates. This permits a total of 16 outlines and thus 8 outline pairs along any vertical portion of a character. Note that each of the remaining instructions is encoded with the bits J1 to J4 to identify the outline to be modified subject to the respective instruction.

The CDY instruction is employed for defining an outline which is a straight sloped line. From the foregoing, curves and slopes are achieved by incremental changes in the Y coordinate values. Thesee incremental values are encoded in the CDY instruction in 14 bits, $\Delta Y_1$ to $\Delta_{14}$, plus a sign bit, such that negative $\Delta Y$ values are defined as the 1's complement. This affords a range of slopes of straight lines of a character outline from +255 63/64 to −255 63/64, with a resolution of 1/64. The provision of CDY instruction is a compromise in light of efficient utilization of memory capacity for slope changes and curvature, to be discussed. Generally, generation of a straight sloping line, if performed by computations based on a slope change instruction (CM) would require an excessive storage of slope information to enable generation of the precise straight line as required in graphic arts quality display. Conversely, if only a reasonable number of slope changes are encoded, generation of a long straight sloped line by use of CM instructions (as in an "M" or a "W") would result in an uneven, or stepped, line configuration and thus be of unacceptable quality.

The change slope instuction (CM) thus includes 6 bits of a slope information (allowing for $2^6 = 64$ different slopes —considered a reasonable number). The change curvature instruction (CK) includes 7 bits of curvature information, K7 being a sign bit and thus providing $\pm 2^6 = \pm 64$ curvatures. Each of CM and CK also is encoded with the outline number, J1- J4.

The end outline pair instruction (EOLP) simply requires encoding to identify the outline number of the outline with the smaller Y coordinate. The term "pair" arises in EOLP since outlines always begin and end in pairs. The end character instruction (EC) is encoded and recognized by the system as the end of the character being generated.

ILLUSTRATIVE EXAMPLE OF COMPUTATONS

To faciliate the presentation of the invention, an illustrative example is set forth utilizing a greatly reduced level of data and parameters to simplify the explanation of the computations which are performed. Thus, in FIG. 5 is shown a quad of 64 units in each of the X and Y coordination directions. Consistent with the more complex illustrations set forth above, a base line is established within the quad, at Y = 21. This provides for letters such as Q or many lower case letters such as p, q, y, etc., which have portions extending below the base line to be included within the quad. The X coordinates may be defined by 6-bit binary numbers, whereas Y may be defined by 12-bit binary numbers. Thus, a point in the quad may be defined by X = 6, Y = 7 33/64 (note that $2^6$ bits 64 define the integer value of Y and $2^6$ bits identify the fraction, expressed therefore in 1/64th's ) In fact, whereas Y may be resolved to that precision, the coordinates which control ultimately the unblanking and blanking of the scanning beam are only 6-bit numbers, thus defining only integer or whole number values of Y coordinates. The necessity for the fractional Y values arises in coding and computing of slopes and curves as will now become apparent.

Slopes

In FIG. 6 is shown a plot of "codable" slopes. The plot illustrates rays of slopes M =0 to M = 7 and the adjacent coordinate plot relates an angle $\theta$ to the X coordinate. It follows that;

$$\frac{\Delta Y}{\Delta X} = \tan\theta \qquad \text{Eq. (4)}$$

Moreover, since the X increments $\Delta X$ correspond to successive computation cycles, or bit positions, and by definition may be of unity value, we may set $\Delta X = 1$. Thus, $$\Delta Y = \tan\theta \qquad \text{Eq. (5)}$$

From the preceding discussion, it will be recalled that slopes and curvatures are achieved by incrementally changing the Y coordinate of successive strokes. Those changes thus are the values $\Delta Y$. It is now seen how these are related to a slope function M, in turn related to the angle $\theta$. It also will be seen that to achieve a desired slope of a character outline, $\Delta Y$ must be adjusted in accordance with Equation (5).

The slopes M =0 to M = 7 are converted to 3-bit binary numbers as indicated in the table of FIG. 7, wherein is also shown the angle values for $\theta$, the value of tan $\theta$, and the calculated values of $\Delta Y(M)$.

FIG. 8 is a simplified geometric configuration serving to illustrate the "update" operation for Y as a function of the slope values M. FIG. 9 is a simplified list of encoded instructions corresponding to the generation of the configuration of FIG. 8. The BOLP instruction carries the initial coordinate information of $Y_0 = 2$ and $Y_1 = 24$ for the outline pair 0 and 1 as shown in FIG. 8. The X coordinate has been arbitrarily selected as X = 4. $\theta_0 = 22.5°$ for outline 0 and $\theta_1 = -45°$ for outline 1 which, from FIGS. 6 and 7, conveniently correspond to $M_1 = 1$ and $M_0 = 5$, encoded as the parameter information in the corresponding CM instructions. The system then preceeds to compute the $\Delta Y$ values, i.e., the Y update function, and generate the indicated sloping outlines 0 and 1 until the EC instruction designates the completion of the character.

In FIG. 9, the $\Delta X$ column corresponds to the computation cycle number of FIG. 4 and, for the CM instruction for outline 1, is the value 14. Note that the character in FIG. 8 extends from X = 4 to X = 18 or a $\Delta X$ of 14.

It follows that 14 vertical scans (assuming a 1 scan to 1 computation cycle relationship) are required to display the character of FIG. 8, requiring moreover 13 "Y updates" of outlines 0 and 1. The equations below describe the update process wherein, by definition $\Delta X$ ≡ 1 for each update and $j$ = outline number:

$$Y_j(X + \Delta X) = Y_j(X) + \Delta X \cdot \left(\frac{\Delta Y}{\Delta X}\right)_j \qquad \text{Eq. (6)}$$

$$Y_j(X + 1) = Y_j(X) + \Delta Y(M_j) \qquad \text{Eq. (7)}$$

Moreover, $$\Delta Y(M_j) = \frac{\Delta Y(M_j)}{\Delta X} = \tan\theta_j \qquad \text{Eq. (8)}$$

Therefore, since $\theta_0 = 22.5°$ and $\theta_1 = -45°$, $$\Delta Y(M_0) = \tan\theta_0 = \tan(22.5°) \cong 27/64 \qquad \text{Eq. (9)}$$

$$\Delta Y(M_1) = \tan\theta_1 = \tan(-45°) = -1 \qquad \text{Eq. (10)}$$

From the general expression of Equation 6, one may then write the specific update functions for the outlines 0 and 1 as follows:

$$Y_0(X + 1) = Y_0(X) + 27/64 \qquad \text{Eq. (11)}$$

$$Y_1(X) + 1) = Y_1(X) - 1 \qquad \text{Eq. (12)}$$

The table of FIG. 10 then illustrates the computed coordinate values of $Y_0(x)$ and $Y_1(x)$ for the successive values of X. From the corresponding CRT display plot of FIG. 11, and recalling that only integer values of Y control the unblanking of the scanning beam, it will be seen that ouline 0 steps in successive groups of changed Y coordinate values; nevertheless, from FIG. 10 it will be appreciated that the fractional Y values do accumulate and eventually affect the integer value of $Y_0(x)$. The reason for ignoring the fractional values of $Y_0(x)$, for example, may be that a 6-bit D/A converter is employed to generate the unblanking function correlated to the sweep of the CRT scanning beam.

Figures 12, 13A, 13B, 13C:
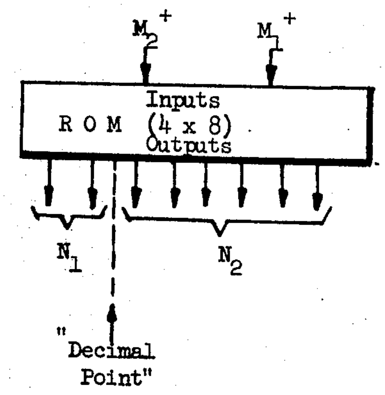
FIG. 12 is a block diagram of a ROM for storing values of incremental changes of the Y coordinate value for corresponding slope values.
FIG. 13A and 13B illustrate the bit pattern of the ROM of FIG. 12 to the bases 2 and 10, respectively.
FIG. 13C is a truth table relating the representative slope values of FIG. 6 to binary values and the bit positions thereof utilized as the addressing bits for the ROM of FIG. 12.

The calculation of Equation (5) $\Delta Y = \tan\theta$ conveniently is achieved by a readonlymemory (ROM) which for the illustrative system has 32 bits capacity with the bit pattern "programmed" to provide four 8-bit words, as illustrated in FIG. 12. FIG. 12 corresponds to binary coded values wherein $N_1$ is the integer portion of $\Delta Y$ and $N_2$ is the numerator value of the fractional 1/64th portion of $\Delta Y$, which may be expressed as follows:

$$|\Delta Y(M)| = N_1 + \frac{N_2}{64} \qquad \text{Eq. (13)}$$

Note that the inputs to the ROM of FIG. 12 are $M_1^+$ and $M_2^+$ which correspond to internally decoded values for the M input to the ROM in accordance with the Boolean "exclusive or" equations:

$$M_2^{\oplus} = M_2 \overline{M}_3 \qquad \text{Eq. (14)}$$

$$M_1^{\oplus} = M_1 \overline{M}_3 \qquad \text{Eq (15)}$$

The ROM bit pattern for the differing values of $M^+$ in binary notation then is shown in the table of FIG. 13A and the corresponding values to the base 10 are shown in FIG. 13B.

From the foregoing, it will be realized that the ROM is being addressed with only two bits and this is possible in light of Equations 14 and 15 by responding to the third bit $M_3$ to control the sign of the 66 Y and particularly, $$\Delta Y(M) < 0 \text{ if } M_3 = 1 \qquad \text{Eq. (16)}$$
$$\Delta Y(M) > 0 \text{ if } M_3 = 0 \qquad \text{Eq. (17)}$$

As will be appreciated from the above, the value of Y then is updated by adding or subtracting the $\Delta Y$ value (subtraction being performed by the 1's complement technique). The full expression of the M addressing function is illustrated in the truth table of FIG. 13C.

Figure 14:
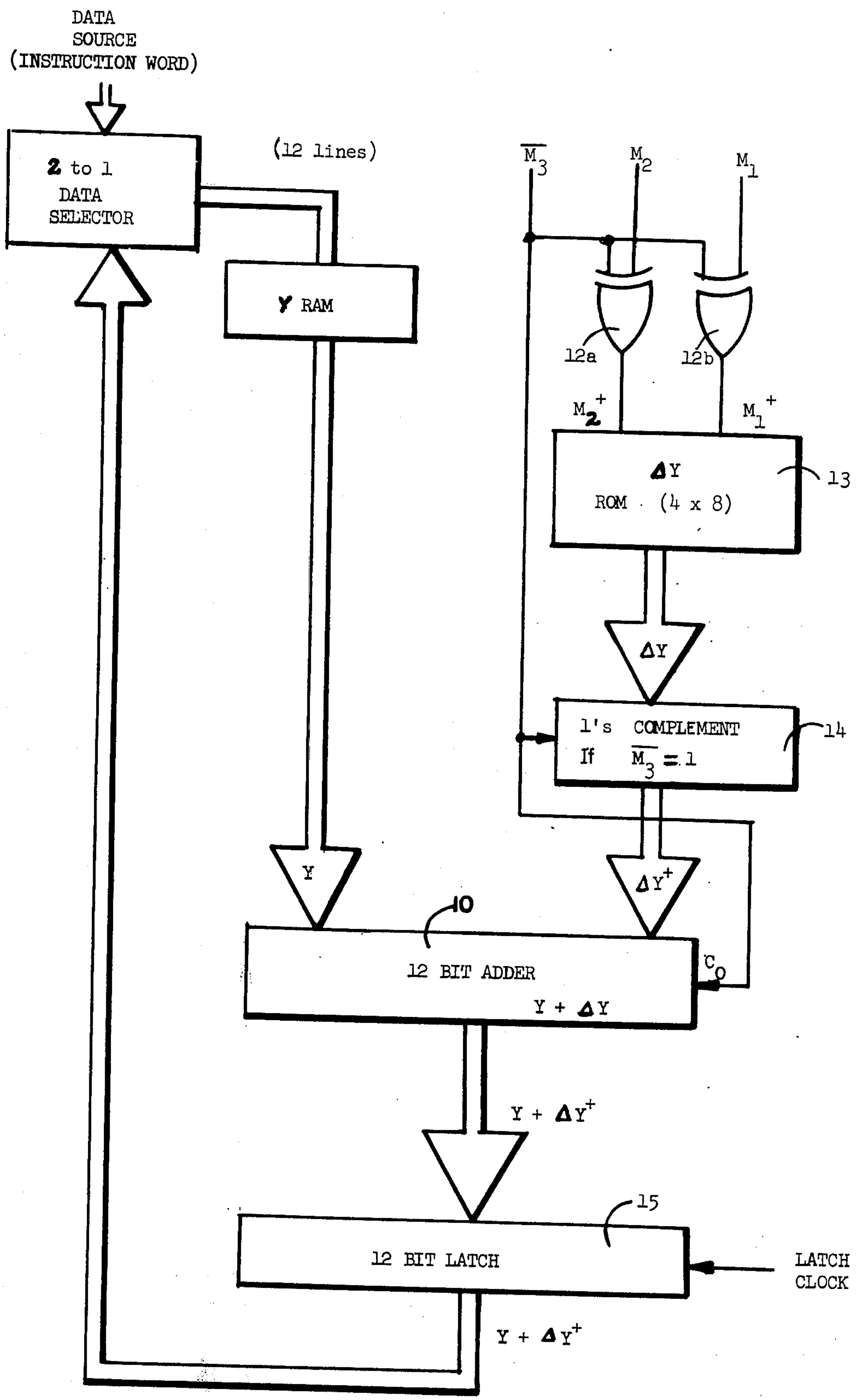
FIG. 14 is a simplified block diagram of a mechanization for the Y update function in slope computations.

A simplified illustration of a mechanization of Y update then is shown in FIG. 14. A 12-bit value either derived initially from a data source (such as a BOLP instruction) or comprising a current computed Y value, as will be explained, is made input to a 12adder 10. The 3-bit word defining an M slope value, as derived from a CM instruction, is supplied through suitable gates 12*a* and 12*b* to the ΔY ROM 13 to address it in the manner suggested in FIGS. 12 and 13A, and from which the stored ΔY value is supplied to a 1's complement gate 14 (also responsive to the $\bar{M}_3$ value). Gate 14 thereby supplies ΔY to the 12-bit adder 10 either for addition or subtraction (by the 1's complement function) to the concurrently supplied Y value. The resulting Y + ΔY sum is supplied to a 12-bit latch 15 which in turn stores the resulting Y + ΔY value in the Y coordinate RAM as the new Y coordinate value for use in a succeeding display scan. That new value of Y may be supplied to another Y coordinate RAM for accessing and control of the scanning beam. The current Y coordinate value then also is supplied back to the 12-bit adder 10 for use in the succeedng Y update operation.

CURVATURES

Figures 15, 16:
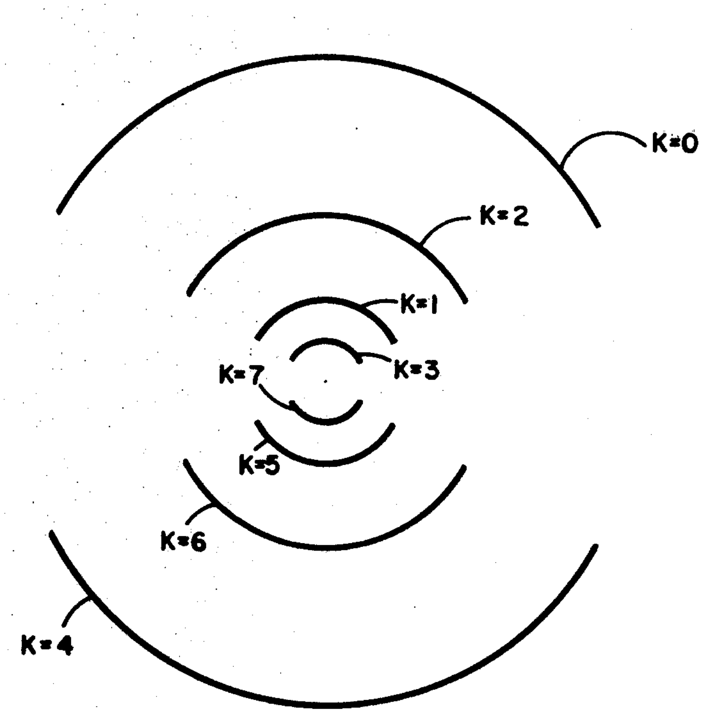
FIG. 15 is a simplified plot of curvatures.
FIG. 16 is a table relating the curvatures of FIG. 15 to binary form and the corresponding radii.

There is next considered the coding of curvatures. In FIG. 15 is illustrated a system of four radii of curvature in each of two curvature polarities and designated K = 0 through K = 7. A 3-bit binary number may encode these as one of four radii (2 bits) and one of two polarities (1 bit). Thus $k_1$ and $k_2$ define a desired radius of curvature $r_c$ and the third bit $k_3$ defines the sign of the curvature. For a base radius of $r_c = 32$, the table of FIG. 16 then relates the curvature *k* to its binary expression and the desired value of $r_c$.

Figure 17:
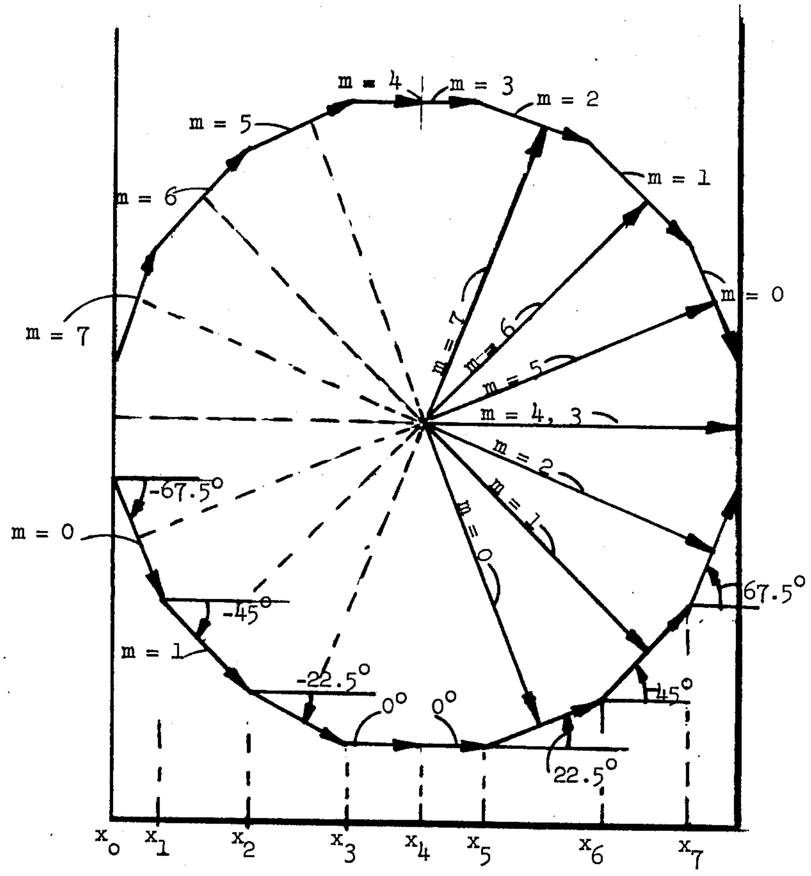
FIG. 17 is a plot of a succession of slopes approximating a circular curve of an arbitrary radius of curvature.

FIG. 17 now relates the foregoing to the generation of curves. The radial lines M = 0 through $M_7$ correspond to those in FIG. 6 and are the directions of slopes which can be approximated by successive Y updates, where M = constant. However, whereas a straight line slope is generated by a constant M, if the outline slope varies in accordance with varying values of M, the outline curves. In FIG. 17, the figure generated is a sixteen-sided polygon with slope variations occurring at each of positions $X_0$ through $X_7$. Thus, the M value is updated in the present system to approximate a curve, i.e., the circle of FIG. 17. FIG. 17 also illustrates that incrementing M, i.e., (M → M + 1) produces positive curvatures, whereas decrementing M, i.e., (M → M − 1) produces negative curvatures.

Figure 18:
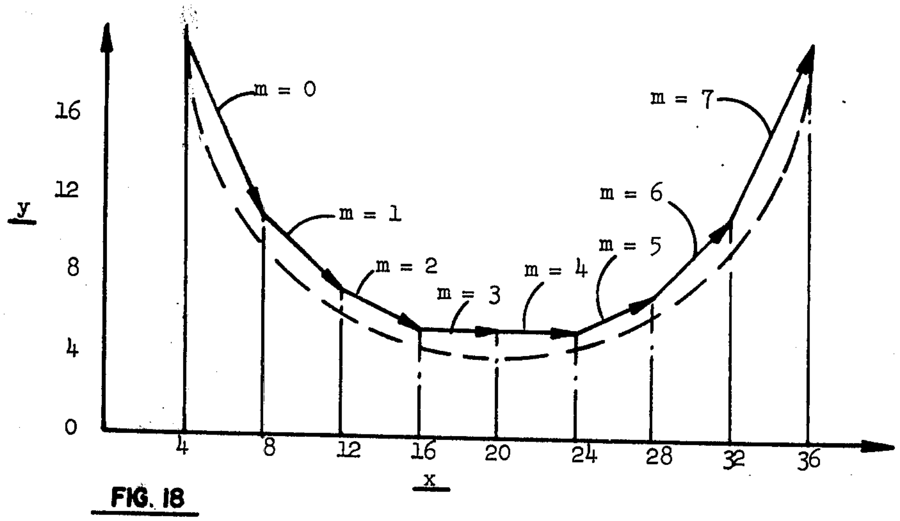
FIG. 18 is a comparison plot of a succession of slopes generated for equal X coordinate intervals and a curve to be approximated and encoded.

If the curvature parameters *k* were to represent the number of Y updates for every M update, a curve would result but it would not approximate a circular arc. For example, if *k* = 4 and (M → M + 1 ) for every fourth update of Y, (i.e., Y → Y + ΔY), then a succession of straight line segments as in FIG. 18 would result, which does not conform to the circular arc shown in dotted lines.

Figures 19, 20:
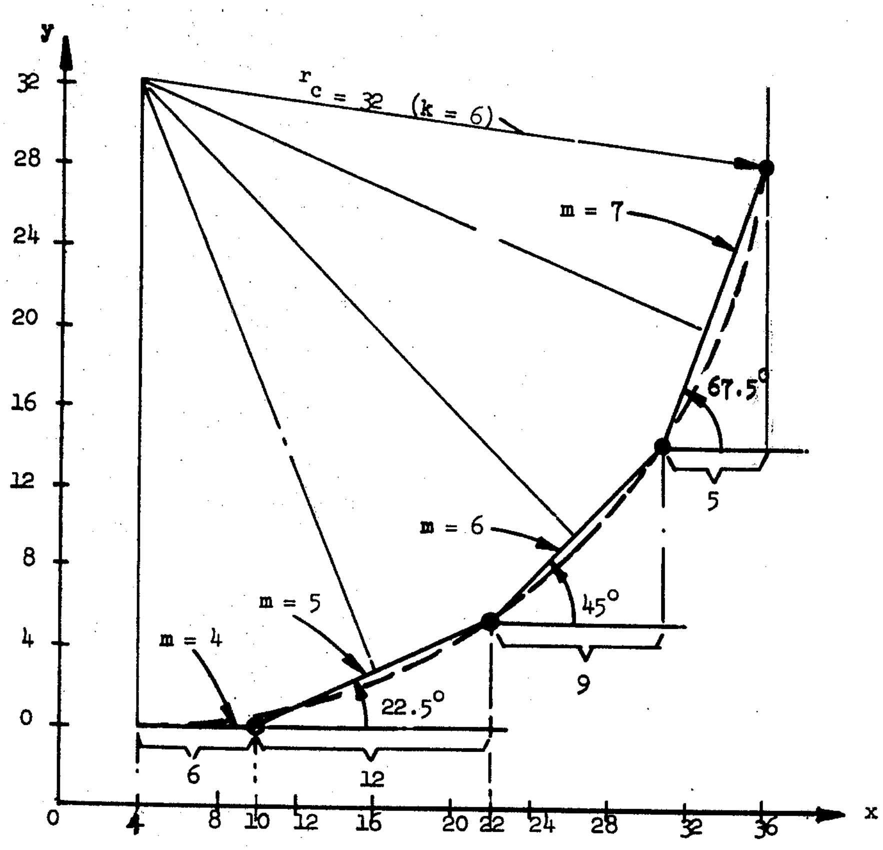
FIG. 19 is a simplified table, for a given curvature value $k$, of the corresponding stored succession of slope values M and respectively predetermined numbers $S_N$ of Y coordinate change computations to be made for each slope value, as utilized for closely approximating an arc of a circular curve.
FIG. 20 is a comparison plot of an outline generated in accordance with the curvature table of FIG. 19 and the arc to be approximated.

To permit matching the polygon more closely to a desired circular arc, the system introduces a new parameter S which, for a fixed curvature K, is a function of M and permits updating M after a variable number of Y updates. This is illustrated in the table of FIG. 19, wherein:

- $S_n$ = number of Y updates to be made at a given M before M is updated; and M = slope parameter encoded to define respectively corresponding ΔY values, and
- M= slope parameter encoded to define respectively corresponding ΔY values, and
- K = 6 (corresponding to $r_c$ = 32). The table of FIG. 19 is defined in accordance with matching straight line segments to the circular arc of $r_c$ = 32 of FIG. 20. Initially, for the coordinates shown and under the simplified presentation here considered, Y= 0, M = 4 and the sequence from the table of FIG. 19 is as follows:

Y → Y + 0 (6 times, with M = 4 then M → 5)
Y → Y = 27/64 (12 times, with M = 5 them M → 6)
Y → Y = 1 (9 times with M = 6, then M → 7)
Y → Y = 2 27/64 (5 times)

Figures 21, 22:
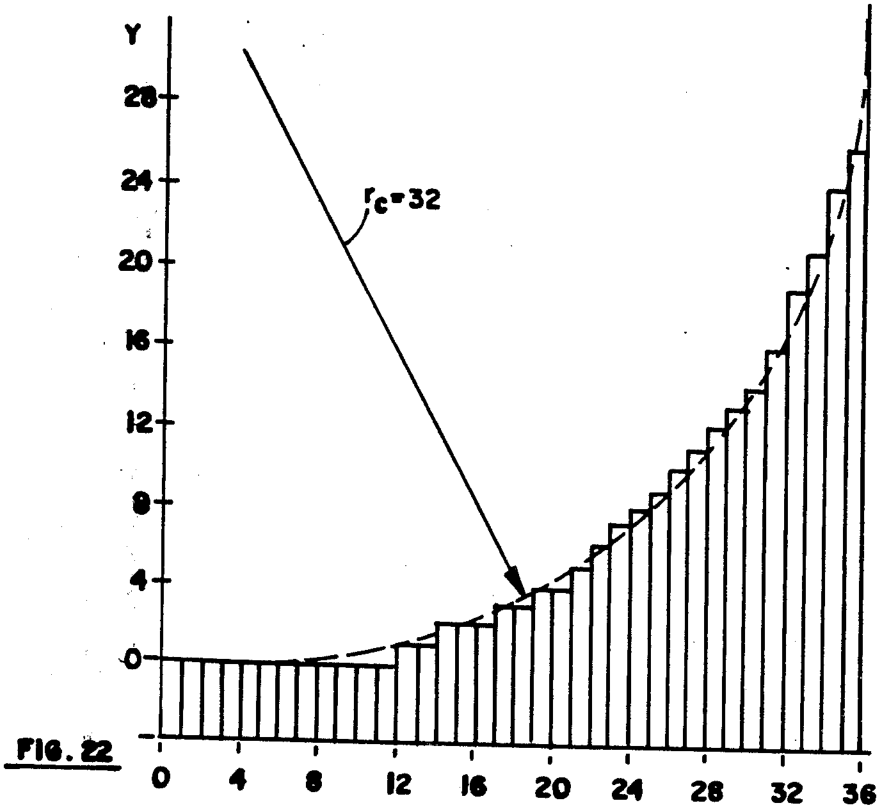
FIG. 21 is a table illustrating Y coordinate update values computed in accordance with the table of FIG. 19.
FIG. 22 is a comparison plot of the outline produced from the values of the table of FIG. 21 and the arc approximated thereby.

These update functions are fully set forth in the table of FIG. 21 and the computed value there listed would result in generating a succession of variably, incrementally changing Y coordinates approximating the desired curve of radius $r_c$ = 32 as in FIG. 22.

Figures 23, 24, 25:
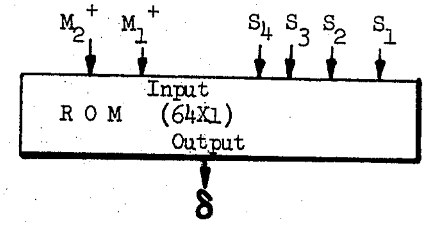
FIG. 23 is a simplified design of a ROM utilized to implement the function of M updating in accordance with the table of FIG. 19.
FIG. 24 is a table of the bit pattern of the ROM of FIG. 23.
FIG. 25 is a table illustrating the generation of difference curvatures from a single ROM as in FIG.'s 23 and 24 programmed for a base radius of $r_c = 32$ for $k = 6$.

An implementation to perform the calculation of when to increment or decrement M, in an M update operation, is programmed into a 64-bit ROM asillustrated in FIG. 23 (6 binary inputs corresponds to $2^6$ = 64) from which a single output δ is derived. This ROM would be in parallel with the Y update ROM of FIG. 12. With reference to the corresponding ROM bit pattern table of FIG. 24, δ = 1 when S = $S_N$ at which time S is reset to 0001 and S is then incremented by 0001 as long as δ= 0.

From the ROM bit pattern table of FIG. 24, δ = 1 when the accumulated value of S, in each successive operation, attains the value of $S_N$ = 6, 12, 9 and 5 (for $M^+$ = 0, 1, 2 and 3, respectively). Note that $\Sigma S_N = 6 + 12 + 9 + 5 = 32$, the desired $r_c$.

The preceding dicussion has provided only for generation of positive curvatures $r_c$ = 32. Generation of different curvatures may be achieved by programming a ROM for every desired curvature. This requires a large amount of memory and thus is undesirably expensive.

An alternative and preferable approach is to make ΔM, ΔS, and $S_0$ (the reset value of S when S = $S_N$) variable as functions of the curvature K. The table of FIG. 25 indicates different values of $r_c$ for such variations in the values ΔM, ΔS and $S_0$; $r_c$ = 32 is the base radius, as seen by the unity values of ΔM, ΔS and $S_0$.

Figure 26:
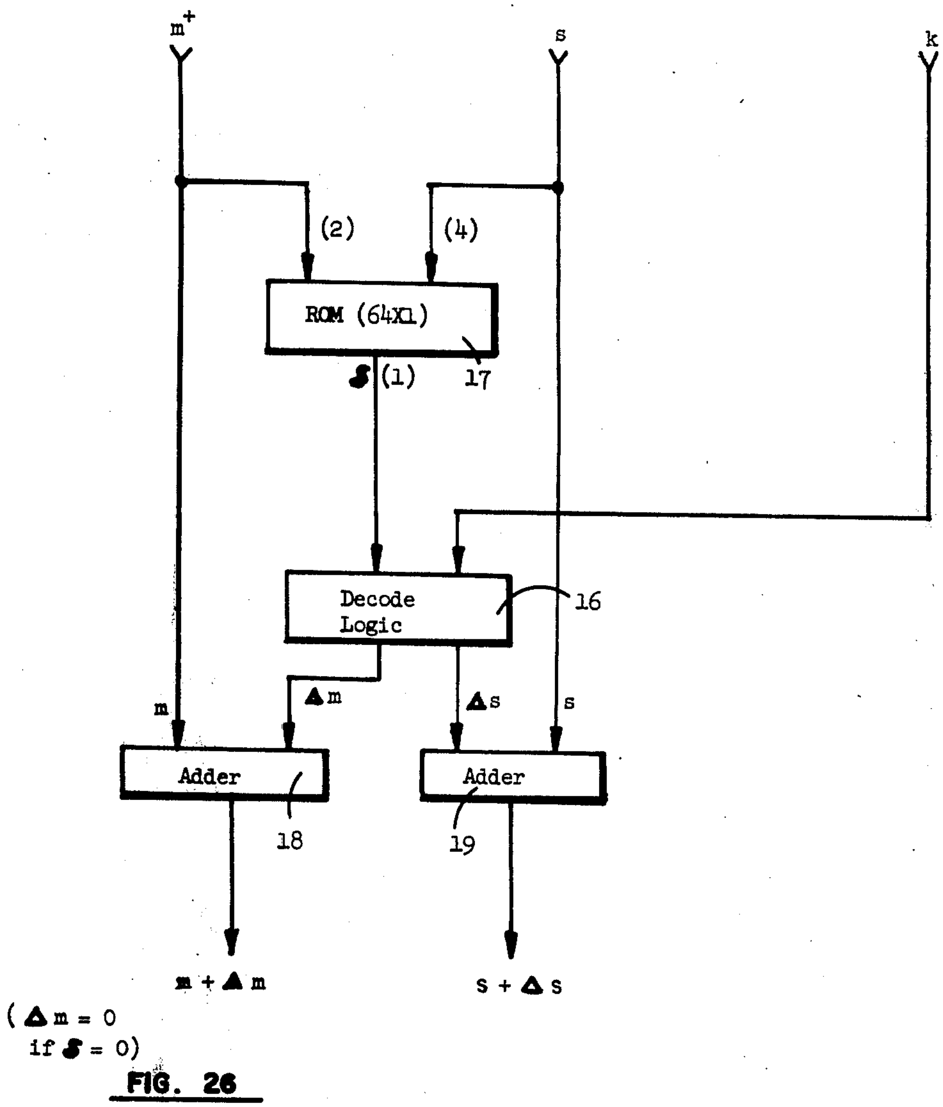
FIG. 26 is a simplified block diagram of a mechanization for implementing the M update function in accordance with FIG.'s 19–25.

In FIG. 26 is shown a block diagram of a system implementing the foregoing curve generation function. The curvature value K from a CK instruction is supplied to decode logic 16, the latter also receiving the δ output of ROM 17 (corresponding to the ROM of FIG. 23). Logic 16 supplies outputs ΔM and ΔS, defined from the table of FIG. 25 as a function of the value K, which are supplied with the corresponding M and S values to repective adders 18 and 19, the latter outputting the updated values M + ΔM and S + ΔS. The update operation of the circuit of FIG. 26, of course, assumes that ΔM = 0 if δ = 0. The M + ΔM and the S + ΔS updated values then become the inputs to the ROM of FIG. 23.

SUMMARY

In summary, the foregoing has demonstrated initially the basis on which characters are encoded as a function of a limited number of initial parameters defining one or more outline pairs and the slopes and curvatures by which outlines of any configuration are encoded. There also has been disclosed the instruction words which are stored in memory and based on which various calculations are performed for generating any desired character of any font stored in memory. Furthermore, simplified block diagrams have illustrated implementations of the necessary hardware for performing the computations to in turn develop the Y coordinate values providing control signals for the scanning beam, in reproducing each character on a CRT. It will be appreciated that the storage requirements of the present system are minimal compared with those of the prior art, and yet an extremely flexible and efficient system is afforded. Any desired font encoded as set forth above may be stored in memory and the characters thereof reproduced at any desired font size. The system is readily adaptable to any desired CRT scan density in accordance with the scaling factors. The computations are performed concurrently with the CRT scanning and in view of processing speeds, typically are completed well in advance of each scanning stroke. Hence, high speed operation is readily attainable since the speed limitation essentially is that imposed by the scan deflection circuitry itself. It, of course, will be appreciated that displays other than CRT's may be employed.

DETAILED BLOCK DIAGRAMS

Before proceeding with the discussion in this section, it is noted that the character generator of the invention is only a part of an overall character generation and display system and, thus, the scan electronics for the CRT, although having timing functions and the like coordinated with the generator, is not an integral portion of the generator itself. The CRT employed in an actual reduction to practice of the invention is available under code designation 12M115P47MFO, manufactured by Thomas Electonics, Inc. of Wayne, New Jersey. Moreover, the overall sequencing and coordination of operations is controlled by a minicomputer which again may be, and in actual reduction to practice of the invention, is a commercially available item. Particularly, the mini computer employed in an actual reduction to practice is sold under the trade name of Nova 1200 manufactured by Data General Corporation of Southboro, Massachusetts. Accordingly, these and other such components of the total system have not been shown. Communication with them, however, is indicated in the ensuing block diagrams.

In these block diagrams, the designation PACT appears, which is an acronym for Profile Algorithm Computation Technique, a term suitably characterizing the character generator of the invention.

The mini-computer receives the input characters to be generated, in any suitable encoded form compatible with the computer, such as from a mag tape, punched cards or tape, or the like. The data input to the computer designates the font to be displayed and the point size of the display. Through suitable memory or direct data input, the computer derives the necessary information as to justification of the characters of a line display, character spacing, line spacing and other such information.

Figure 27:
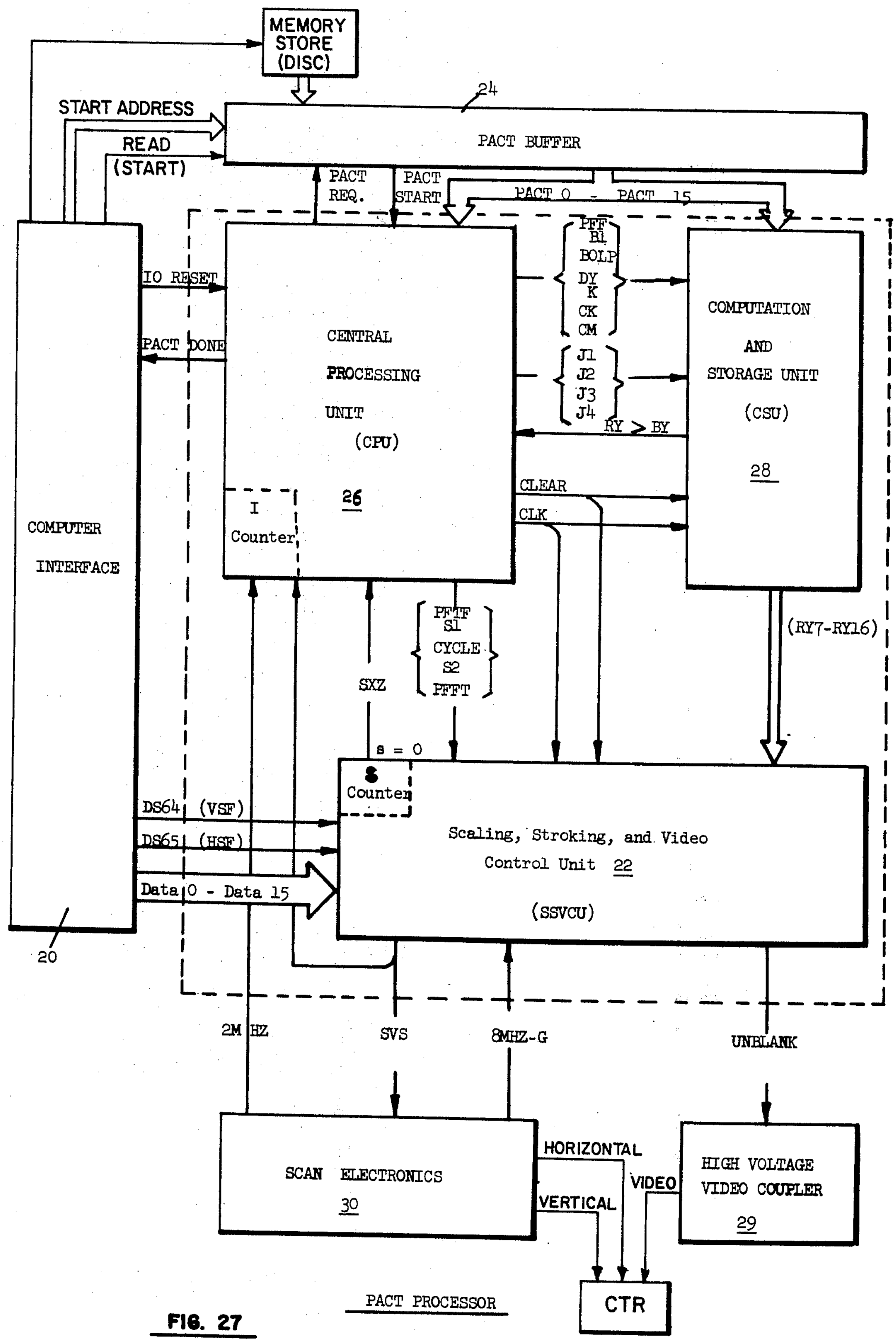
FIG. 27 is a basic block diagram of an actual embodiment of a character generator in accordance with the invention.

FIG. 27 is a general system block diagram illustrating all major sub-systems and the inputs and outputs of the character generator. The computer interface issues IORESET to the CPU 26 and by this signal initializes, through CPU 26, the entire system. The computer interface 20 also supplies strobes DS64 and DS65 for loading the vertical and horizontal scaling factors (16-bit words shown as data 0-data 15) into the scaling, stroking, and video control unit (SSVCU) 22. The computer also derives from disc or other large capacity memory the data comprising the instruction words as in FIG. 4 relating to a given font to be displayed, which then are stored in the pact buffer 24; the latter affords high speed access for the processing and computation functions. The pact start signal supplied to (CPU) 26 initiates the computations for display of each character and is issued by pact buffer 24 under control of the computer. The 16-bit instruction words designated pact 0-pact 15 are supplied from the pact buffer 24 to each of the central processing unit (CPU) 26 and the computation and storage unit (CSU) 28, in response to PACT REQ. (pact instruction request) issued by the CPU 26.

A basic system clock of 2 MHz is derived from a master oscillator in the scan electronics 30 and generally is supplied to the (CPU) 26 from which it in turn is issued to other operating systems. The (SSVCU) unit 22 supplies an SVS signal to the scan electronics 30 which serves to initiate and terminate each vertical stroke of the CRT scanning beam. SVS also is supplied to the CPU to indicate whether a stroke is currently in progress, thereby to coordinate the typically much faster computations of the system, for the successive computational cycles, with the much slower stroking intervals. The CPU 26 issues PFTF to the SSVCU 22 when a stroke is not in progress to cause the latter to perform certain load and transfer functions, to be described, and to initiate a stroke. PFTF moreover requires that the computations for the next stroke have been completed. Thus, coordination is as well afforded for the reverse condition in which such a large number of computations must be performed that the prior stroke terminates before the computations for the next stroke are completed —i.e., the CRT scan must then wait. This situation seldom occurs in practice.

One of the transfer functions is that of transferring the computed Y transition coordinate values from CSU 28 to SSVCU 22, shown as RY7 - RY16. A ten bit word is so transferred for each outline in that scan. In this regard, note that CPU 26 supplies J1–J4 to CSU 28 to identify each outline in the scan as well as PFF which is the command to CSU 28 to compute the parameters of the next outline (for each of the two or more oulines identified to J1 to J4). The computations by CSU 28 are interrupted and certain of its outline parameters initialized during the processing of instructions, as indicated by Bolp, DY, K, CK, and CM supplied by CPU 26 to CSU 28. Clearing and clocking controls are also provided by the CPU.

As will later be explained, the output RY>BY from CSU 28 to CPU 26 serves during BOLP instructions to order the outline numbers J1–J4 in ascending values of their Y coordinates to order the transfer (RY7 – RY16) from CSU 28 to SSVCU 22. When so ordered in a temporary memory of the SSVCU 22, a very simple blanking/unblanking operation is provided. As previously noted, an 8 MHz gated clock signal is issued by the scan electronics 30, the gating function beng that of issuing this signal when a vertical stroke begins. The 8 MHz clock activates a counter in the (SSVCU) which, for a known ramp function of the scanning beam thereby serves to identify the physical location of the beam in its vertical stroke. This count is scaled by the VSF and when it corresponds to a Y coordinate in the temporary memory of the SSVCU, the unblank signal is issured. The unblank signal is supplied to the high voltage video coupler 29 which controls the unblanking and blanking of the CRT scanning beam during each vertical stroke, and thus the painting of the character. The beam normally is blanked and is unblanked as the beam position reaches a first Y coordinate value, thus corresponding to the lowermost outline of a character. In view of the utilization of outline pairs, a very simple unblanking and blanking operation is achieved, in that on each successive Y coordinate value, the blanking-/unblanking state is changed from its current to the opposite state.

Brief note is made of other signals. An S counter in SSVCU is set to the horizontal scaling factor, and is decremented by one for each computation cycle by PFFT from CPU 26. When the count equals zero, the SXZ signal is issued to the CPU 26. The CPU 26 requires SXZ (for S = 0), to halt computations, transfer Y coordinates (RY7 – RY16) to the SSVCU 22 after completion of the current CRT scan, and initiate a stroke. The S counter function thus serves to relate the strokes to the computation cycles in accordance with the HSF.

CPU 26 includes an I counter receiving the 2 MHz clock from Scan Electronics 30. The I counter is loaded with the computation cycle number of an instruction being processed. It is decremented by one count, as is the S counter, under control of PFFT, by the 2 MHz clock.

Thus, the (CPU), the (CSU) and the (SSVCU) comprise the major functioning blocks of the pact processor. Moreover, the (CPU) and the (CSU) operate concurrently with the (SSVCU) to compute the Y coordinates and outline parameters M, K and S as well as the processing of any pact instructions required for a successive stroke while the CRT is scanning in a present stroke.

Figure 27A:
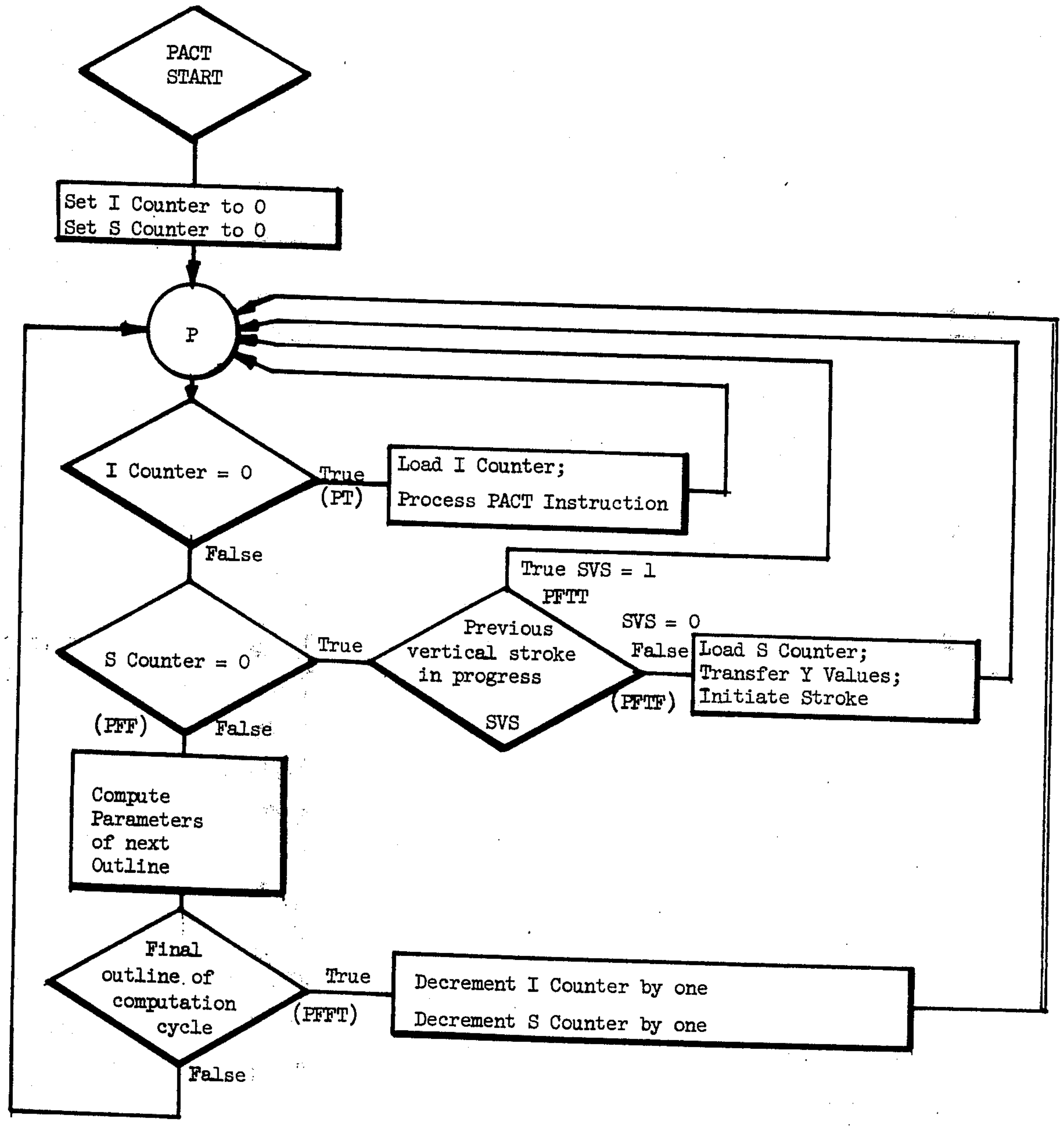
FIG. 27A is a logic flow diagram explaining the basic functions performed in the basic system block diagram of FIG. 27.

The foregoing dicussion of FIG. 27 and its functions will be more readily visualized with reference to the logic flow diagram of FIG. 27A. Note therein that the function PACT START sets both the I and S counters to zero, and places the system in the P state (a basic or return state), from which one of four operations commences:

1) Instruction Processing (PT)
2) Outline Computation (PFF)
3) Y Coordinate Transfer (PFTF)
4) Waiting for Current CRT Stroke to Complete (PFTT)

Figure 28:
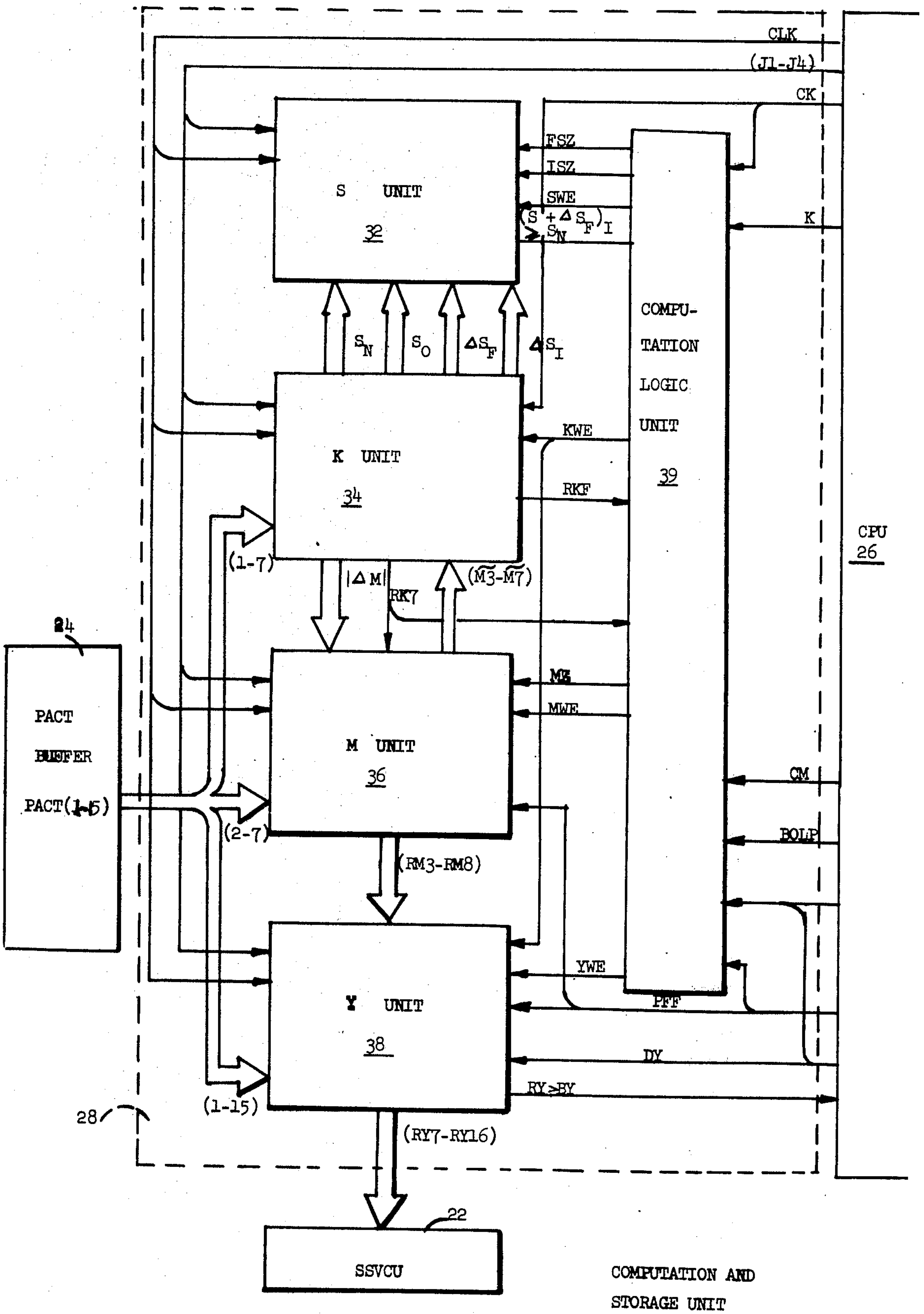
FIG. 28 is a detailed block diagram of the computation and storage unit of the block diagram of FIG. 27.

The block diagram of FIG. 28 illustrates the (CSU) 28 in more detail. The (CSU) includes an S unit 32, a K unit 34, an M unit 36 and a Y unit 38, the latter three units receiving the pact 1 – 15 data from the buffer 24 as therein illustrated. Each of these units receives from the CPU the system clock and the bits J1–J4 which, it will be recalled, identify which of 16 possible outlines is being processed or computed. Logic Unit 39 receives PFF (the command to compute) and instructions BOLP, CM, and CK from CPU 26, and also the K state signal, (established by a CK instruction word). The Unit 39 issues SWE, KWE, MWE and YWE to the corresponding units, which are the commands to write into the memories of these units. Note that J1 – J4 are supplied to each unit to identify the outline for which parameters are being computed. The various patterns of data flow and instructions herein are discussed subsequently. As before stated, the outputs of the (CSU) 28 are the Y coordinates RY7 – RY16 supplied to (SSVCU) 22. These values are computed and updated from the M parameters supplied by M unit 36 to Y unit 38 and shown as RM3 – RM8. The M parameter in turn is controlled by the K and S units. These basic blocks will now be considered separately.

Figure 29:
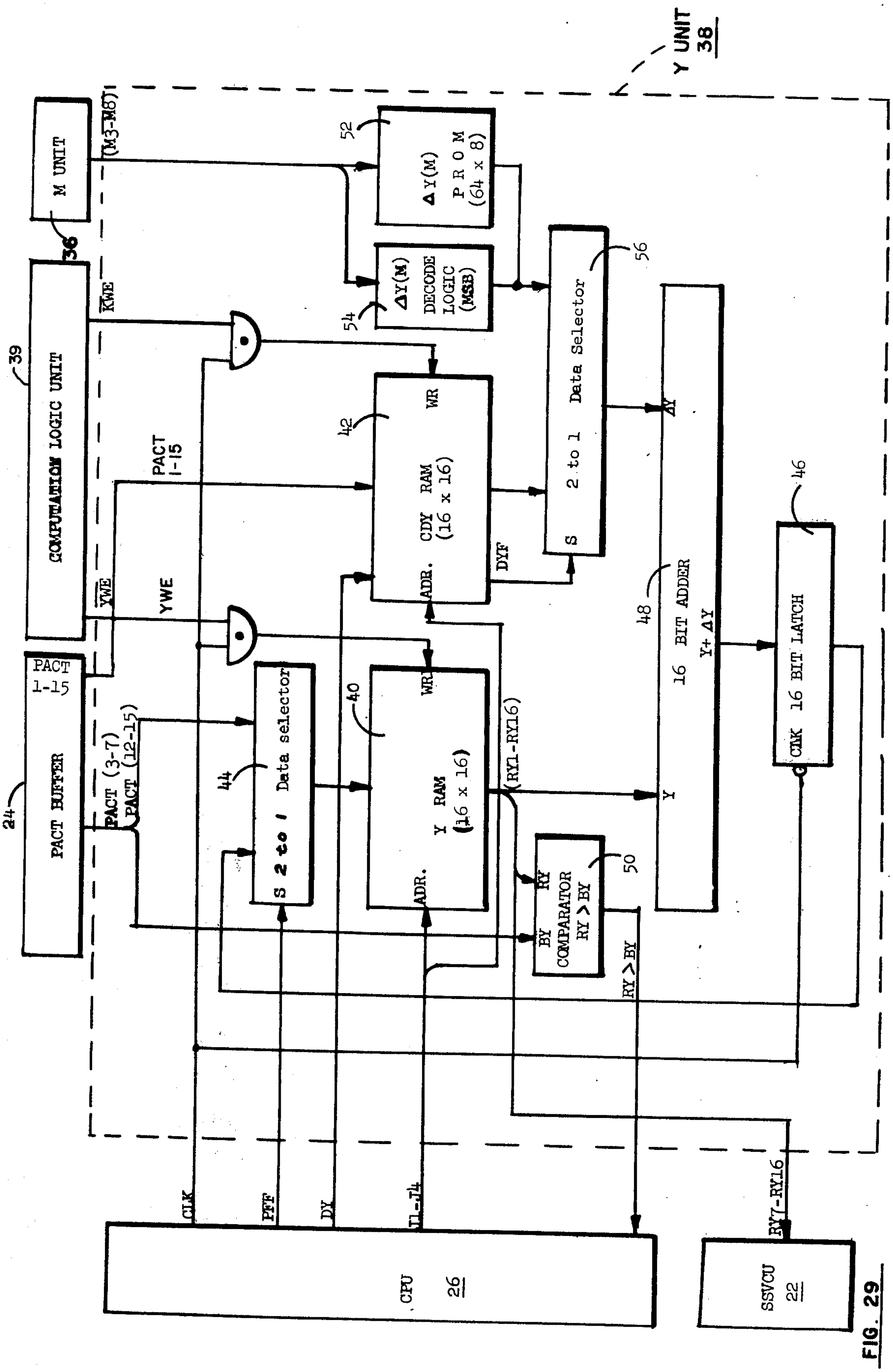
FIG. 29 is a detailed block diagram of the Y unit shown in FIG. 28.

In FIG. 29, the Y unit includes a Y RAM 40 and a CDY RAM 42, each thereof receiving Y coordinate data from instructions supplied from the pact buffer 24. The CDY RAM 42 particularly receives the Y increment data from the CDY instruction, whereas the Y RAM 40 receives Y coordinate data either from buffer 24 or from latch 46 through a 2 to 1 data selector 44. Latch 46 stores the Y + Δ Y output of the 16-bit adder 48 (the up-dated Y coordinate value), to be described. Selector 44 is controlled by PFF (see FIG. 27A) to pass the latch 46 Y value while computing outline parameters in a given computation cycle, and to pass a Y value from buffer 24 when a new instruction is received.

CDY RAM 42 is provided for the CDY instruction to permit generation of long straight, sloped lines in lieu of attempting to compute such lines from M values provided by a CM instruction.

Each of RAMS 40 and 42 has a capacity of storing sixteen 16 bit words, corresponding to 16 outlines, as identified and addressed by the inputs J1–J4 from (CPU) 26.

The Y unit also includes a programmed ROM 52 (PROM) which stores the ΔY (M) values. In an actual system, 64 values of ΔY (M) corresponding to 64 slopes (M) are stored and thus 64 corresponding ΔY values are provided in PROM 52. The adjacent ΔY decode logic 54 provides the most significant bits $\Delta Y_8 - \Delta Y_{16}$, which are not stored in the PROM 52 to economize on the circuitry. A further 2 to 1 data selector 56 normally selects the ΔY from the ΔY PROM 52 and decode logic 54 for supply to the adder 48; however, a CDY instruction results in DY from the CPU 26 and the RAM 42 output DYF for causing selector 56 to pass the CDY RAM 42 output to adder 48. Finally, the updated Y value is supplied as before noted to the Y RAM 40 and from which the CRT spot unblanking/-blanking control bits RY7 – RY16 are supplied to the (SSVCU) 22.

The comparator 50 is employed during resequencing of outline numbers at the time a new outline transition pair is begun during a BOLP instruction period. It serves to compare existing values of Y coordinates (RY) from the RAM 40 with the Y coordinate value (BY) of the new outline to be begun on the BOLP instruction from buffer 24 and determine, based on their Y coordinate numerical values, where, in the sequence of outline numbers, the new outline numbers should fall.

Figure 29A:
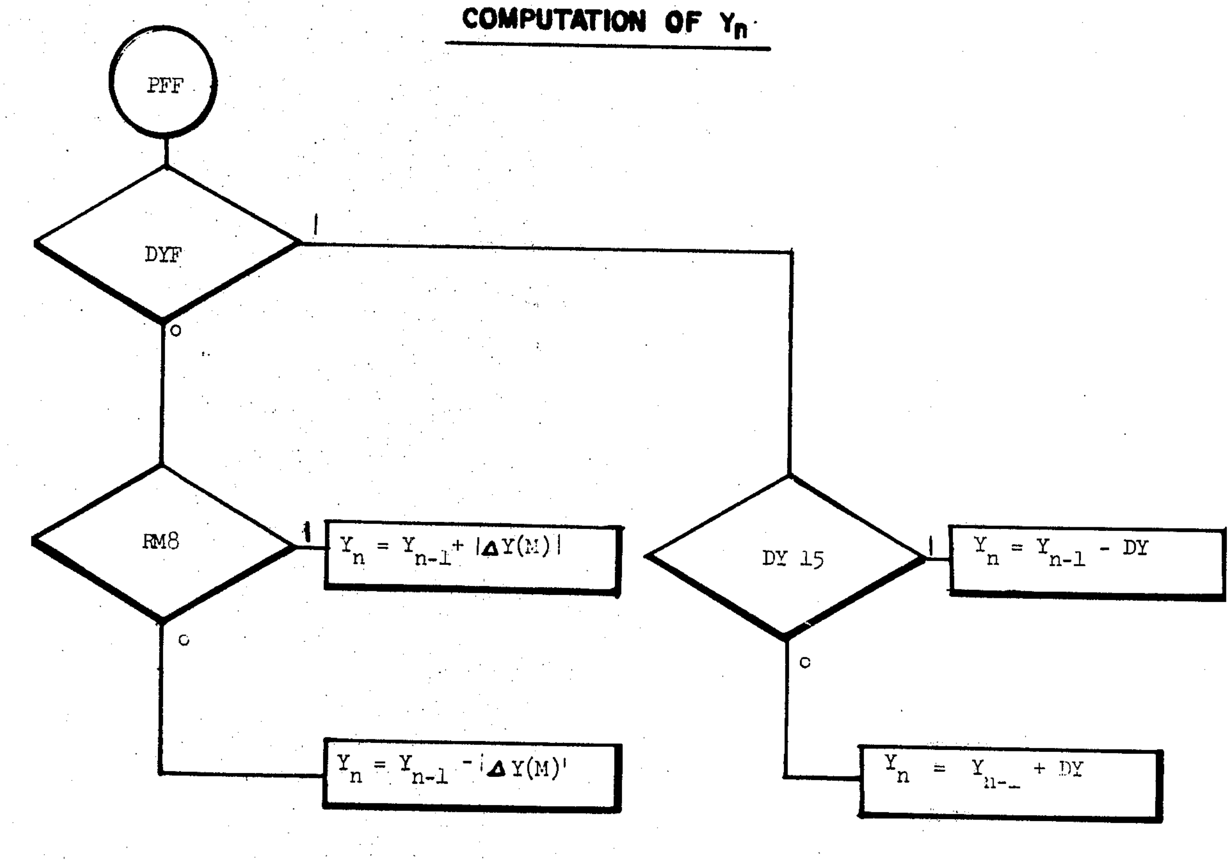
FIG. 29A is a flow chart for the Y computation function of the Y unit of FIG. 29.

The flow chart of FIG. 29A assists in illustrating the foregoing. From the PFF instruction to compute, if DYF is false (0), the MSB of the M3 – M8 bits from M unit 36 (i.e., bit 8) then determines whether an increment or decrement of Y by ΔY is to occur. The M8 bit can thus be thought of as a sign bit.

Figures 29B, 29C:
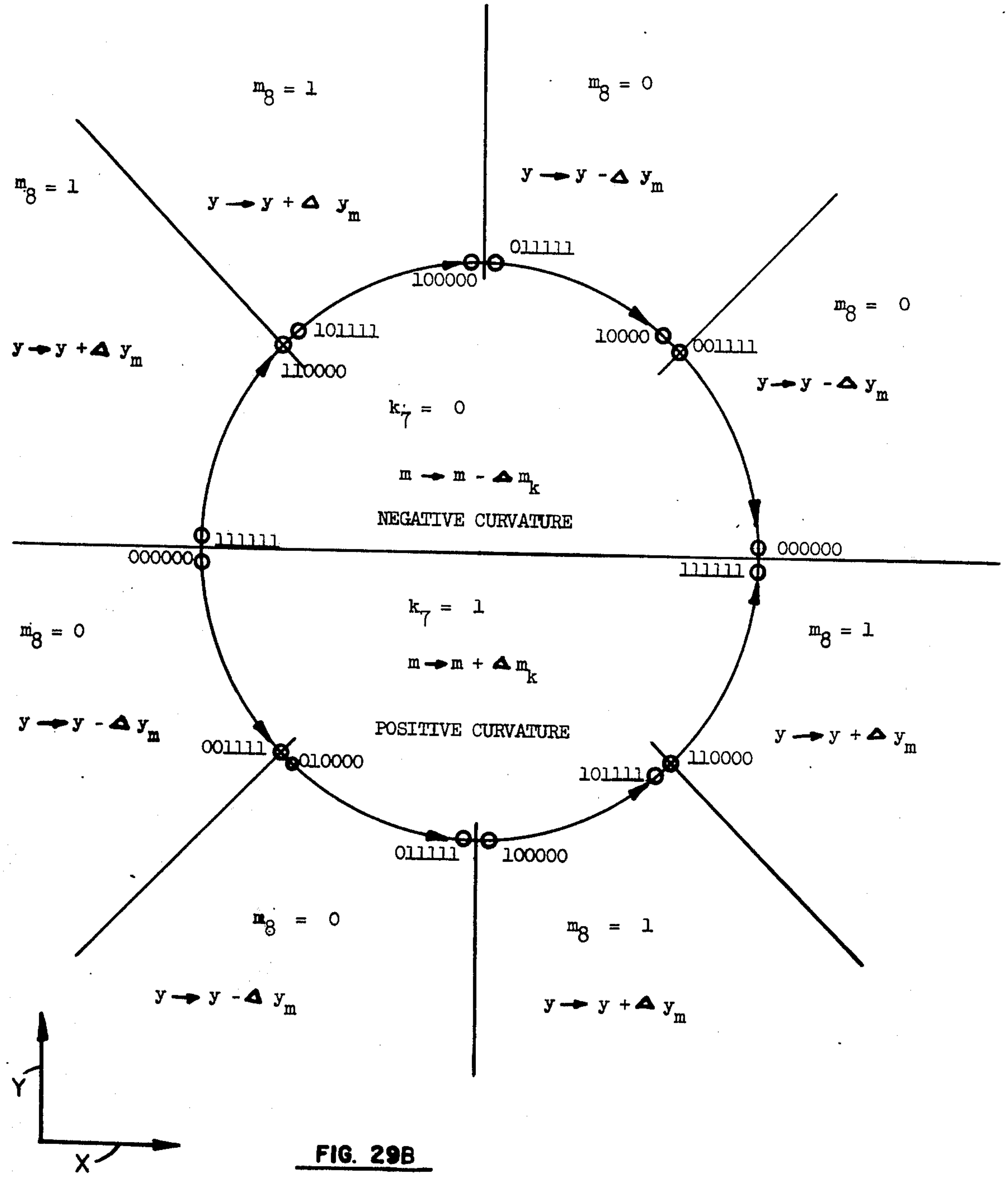
FIG. 29B is a plot illustrating curve generation in relation to incrementally updated values of M and Y.
FIG. 29C is a summary of the curve plot of FIG. 29B indicating the relationship of curvature polarity and slope increments and the relationship of slope polarity and Y coordinate increments.

The effect of the M8 bit being either 0 or 1 is readily appreciated from FIG. 29B which shows the effect thereof in the generation of positive slopes and curvatures. Note that curvature polarity is defined by the seventh curvature bit K7. If K7 = 0, curvature is negative and M is decremented by ΔM, and if K7 = 1, curvature is positive and M is incremented by ΔM.

Figure 30:
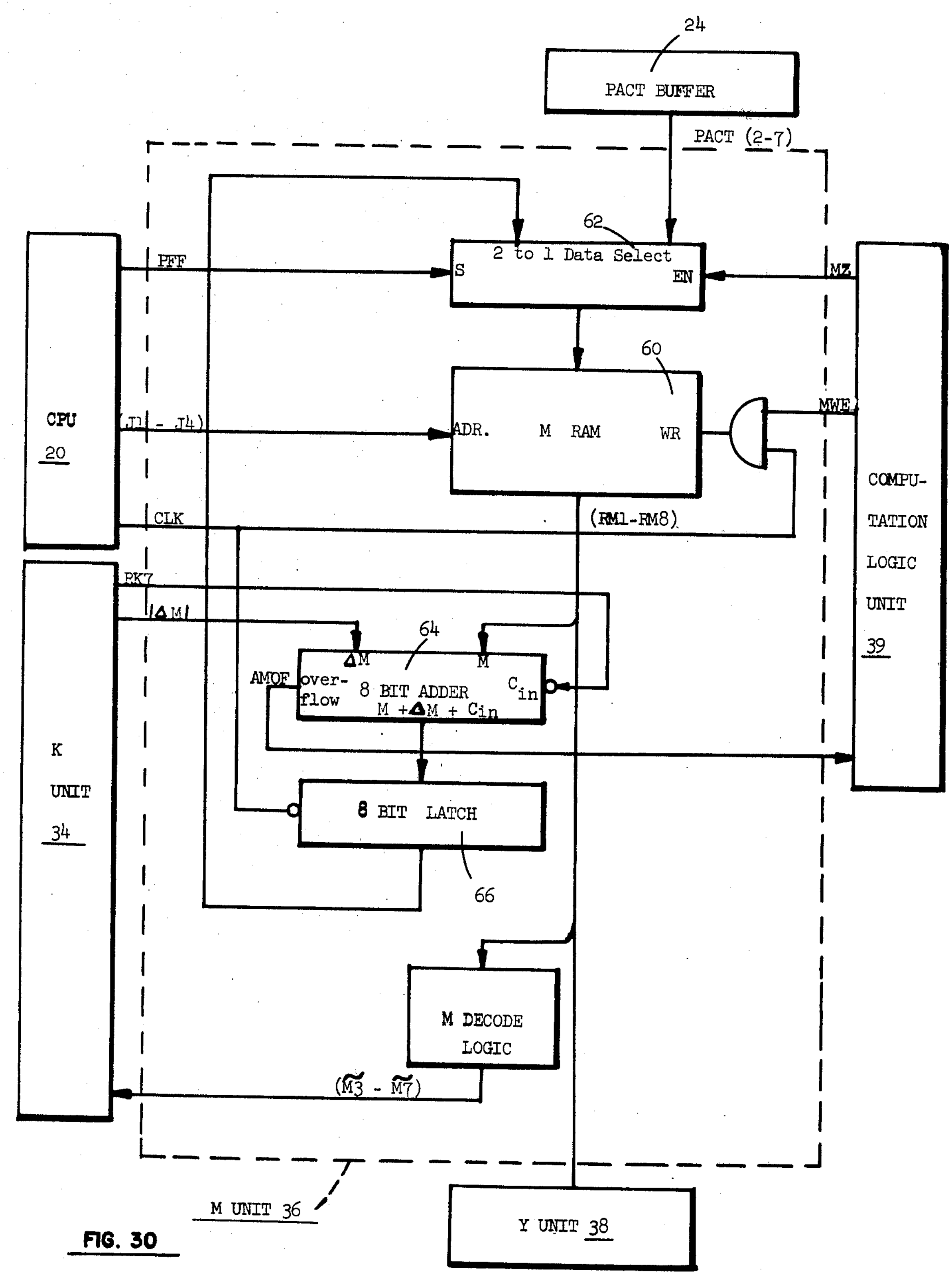
FIG. 30 is a detailed block diagram of the M unit of FIG. 28.

In FIG. 30 is shown the M unit 36 of FIG. 28. During a computation period, while the M parameter is addressing the ΔY PROM or lookup table (see FIG. 29), the value of M itself is being updated in the M unit 36. Particularly, there is shown the M RAM 60 which stores the M parameter for each existing outline. (Note addressing inputs J1 – J4). These are the coded slopes for each of the up to sixteen outlines. The M value, consistent with defining 64 possible slopes, comprises an eight-bit word including six bits defining the integer of from 0 to 63 slope values, and two bits defining a fractional portion 0, ½, ¼, or ¾. The bits M3 — M8 defining the integer value are supplied to the Y unit 38, as before noted.

Similarly to the function in the Y unit, the M parameter can be initialized through a pact instruction or the value may be an updated value incremented during a computation cycle. Hence, a 2 to 1 data select circuit 62 provides for selecting beween these inputs, i.e., either from the pact buffer 24 (comprising bit positions 2–7 of the CM instruction word of FIG. 4) or from the updating circuitry, under control of PFF.

The updating circuitry includes an 8 bit adder 64 and an 8 bit latch 66. As will be recalled, the value of M is updated under control of the K and S units. Moreover, the absolute value of ΔM, i.e., |ΔM|, by which M is to be changed is supplied by the K unit 34. The bit RK7, comprising the seventh bit of the K parameter, idenifies in accordance with its bit value of 1 or 0, whether curvature is positive (and M is incremented) or whether curvature is negative (and M is decremented) as seen in FIG. 29B.

The MZ signal from logic unit 39 is true for a BOLP instruction, and serves to set M − 31 ¾ (for which ΔY = 0) at the beginning of an outline pair. The effect of MZ is essentially to disable the selector 62, so that no input is supplied to the M RAM.

Figure 30A:
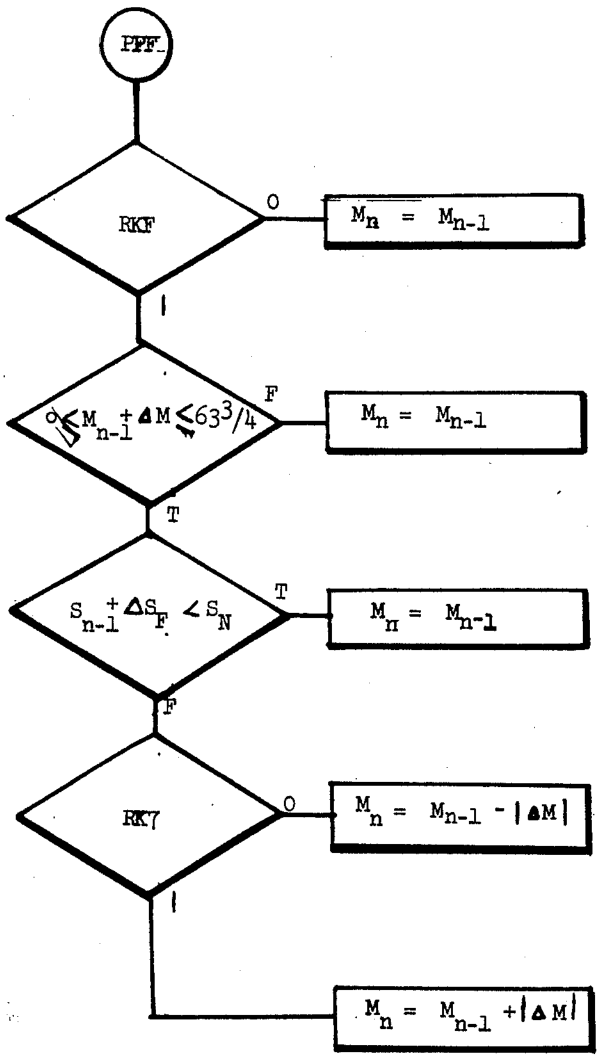
FIG. 30A is a flow chart for the functions of the Y unit of FIG. 30.

The conditions for M to change are best visualized from the flow chart of FIG. 30A. From FIGS. 30 and 30A, the CPU 20 issues the control PFF which initiates the M computation. The first decision RKF is whether a flag bit in the K unit indicates that no curvature exists for a given outline (J1 – J4) by the 0 decision wherein $M_N = M_{N-1}$, implying that M is not to change, i.e., no curvature value has been noted for that outline in the K RAM. The second diamond, or decision, indicates whether the increment to M will cause an overflow to occur and if it will, again M does not change.

The third decision is the primary decision or branch point for curved outlines, namely, whether the $S_N$ value stored in the $S_N$ lookup table exceeds the S parameter. If false, the logic calls for an update of M and, for the final diamond, RK7 (the sign bit of the curvature) determines whether a decrement or an increment will result. If true, M remains unchanges.

Returning then to FIG. 30, when an M update does occur, the new value from adder 64 is stored in latch 66 to be written through data select 62 into the M RAM 60.

Figure 31:
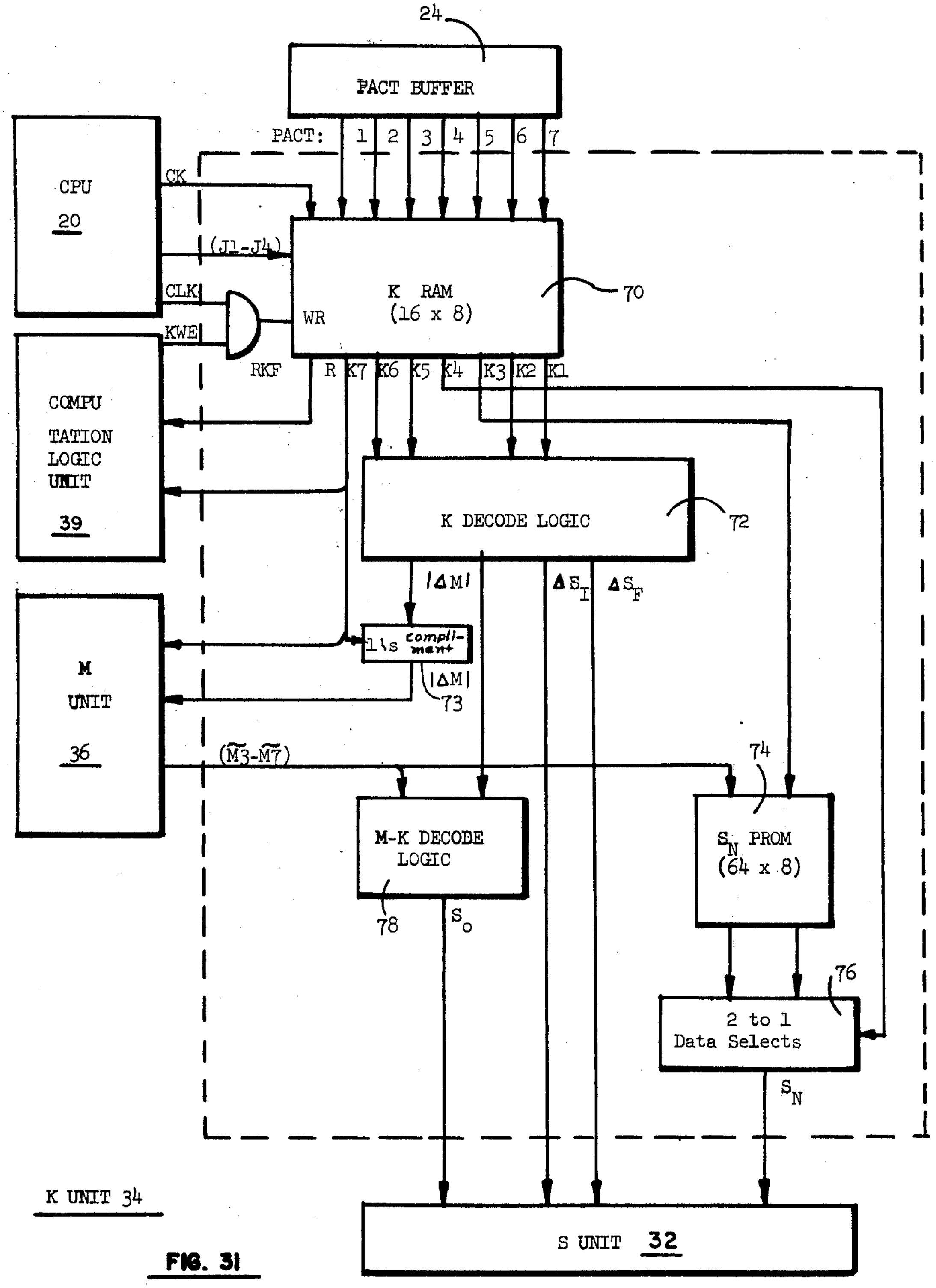
FIG. 31 is a detailed block diagram of the K unit of FIG. 28.

FIG. 31 is a detailed block diagram of the K unit 34. The K RAM 70 receives the 7 bit curvature information from buffer 24 in accordance with the CK instruction. Whereas the K RAM is initialized by the pact instruction, in contrast to the Y and M units, it is seen that the K value is not updated during computations. Bits K1, K2, K5, and K6 are supplied to K decode logic 72 which in turn supplies |ΔM|. RK7 controls the 1's complement circuit 73 an is supplied with |ΔM| to the M unit 36. In FIG. 31A is shown a truth table for the K decode logic. Note $|\Delta M| = \Delta S_I = 1$ and $\Delta S_F = 0$ for base radii K6 = 1; K5 = K2 = K1 = 0.

The K3 and K4 bits identify and select the base radius. Four $S_N$ lookup tables corresponding to four base radii are employed such that other desired curvatures are more readily approximated by scaling the ΔM and ΔS values within the $S_N$ table most closely relates to a curve to be encoded. The table of FIG. 31B illustrates the $S_N$ selection for K3 and K4 and the values of |ΔY (M)| for M- from 0 to 31. (A single $S_N$ table could be employed and the desired number of radii calculated by scaling ΔS and ΔM, as one extreme; an an opposite extreme, 64 different tables of $S_N$ could be provided, corresponding to 64 different radii, or curvatures). Note that data selector 76 serves a selection function in response to K4 for this purpose.

The M, K decode logic 78 controls the reset value $S_o$ of the S parameter, as function of K1, K2, K5, and K6, and a truth table for its inputs is shown in FIG. 31C.

Figure 32:
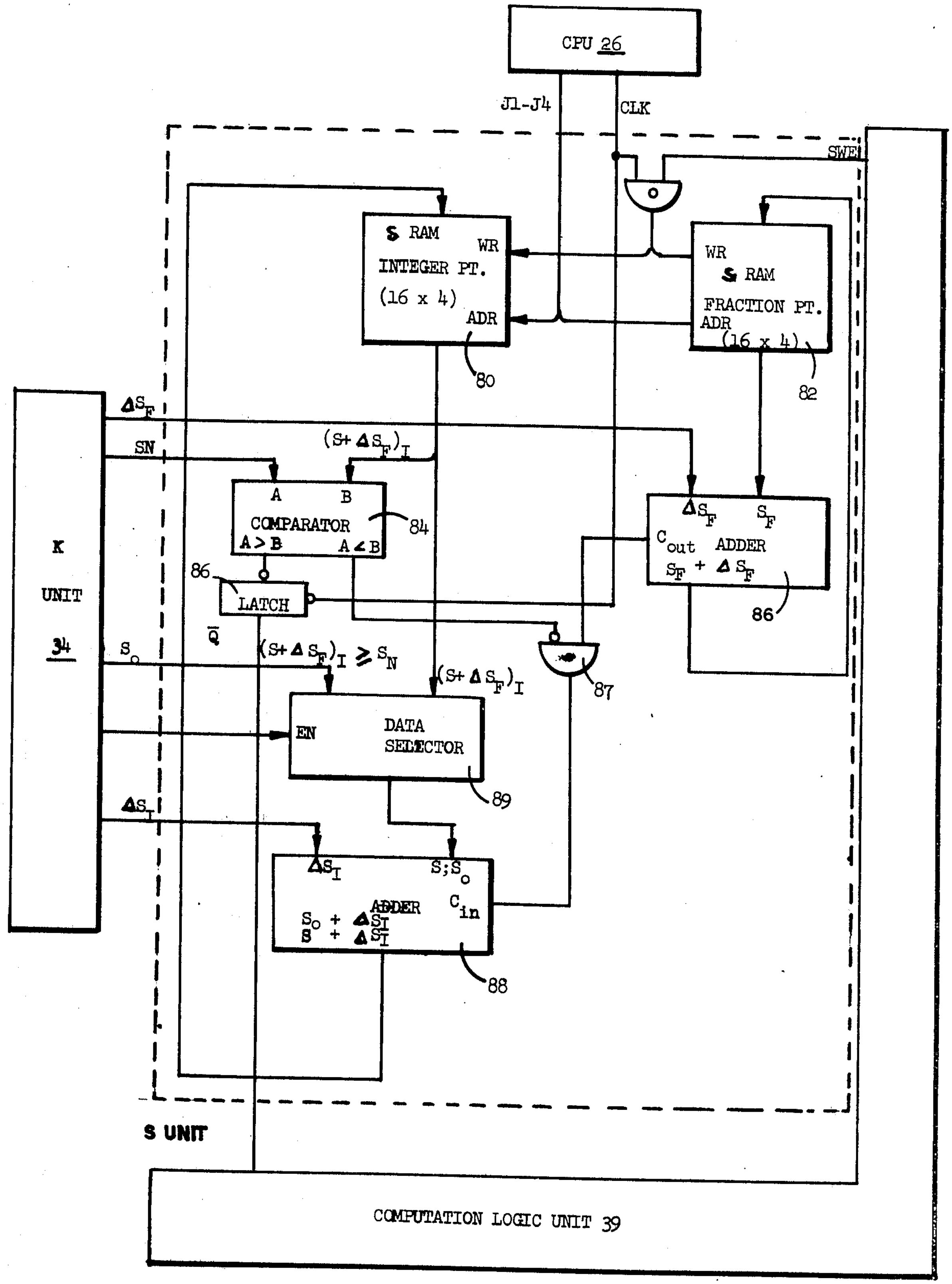
FIG. 32 is a detailed block diagram of the S UNIT of FIG. 28.

In FIG. 32 is provided a detailed block diagram of the S unit 32. The S RAM includes a 4 bit portion 80 storing the integer value of S and a 4 bit portion 82 storing the fractional value of S for each of sixteen outlines as identified by the J1 – J4 addresses. A key function of the S unit is afforded by comparator 84 which compares the value $S_N$ from K unit 34 with the increasing integer value of S (i.e., $S + \Delta S_F)_I$ supplied thereto from the S RAM 80.

If comparator 84 produces the A<B output, the carry value from adder 86 and $\Delta S_I$ from K unit 34 are added to the S value supplied to adder 88 by data selector 89. That S value is either $S_o$, where the S count has exceeded $S_N$ and thus is reset to $S_o$, or the current value of $(S + \Delta S_F)_I$. The incremented value then is supplied to RAM 80 as the updated value.

Note that adder 86 adds the fractional increment $\Delta S_F$ to the stored increment $S_F$ from RAM 82, and supplies the sum $S_F$ +0 $\Delta S_F$ to RAM 82 for updating.

The complementary logic output of A>B from comparator 84 is derived from latch 86. Thus, when $(S + \Delta S_F)_I \geq S_N$, an output is provided to computation logic unit 39 of the CSU 28 (see FIG. 28).

As will be recalled, when $S \geq S_N$, M is incremented or decremented by |Δ M| in accordance with K7, the M–K decode logic defines a new value of $S_o$, and Y is incremented on succeeding computations as a function of the new value of M. Thus, a successive segment of the curve approximation is generated in accordance with the new Y coordinate transition values.

Figure 33:
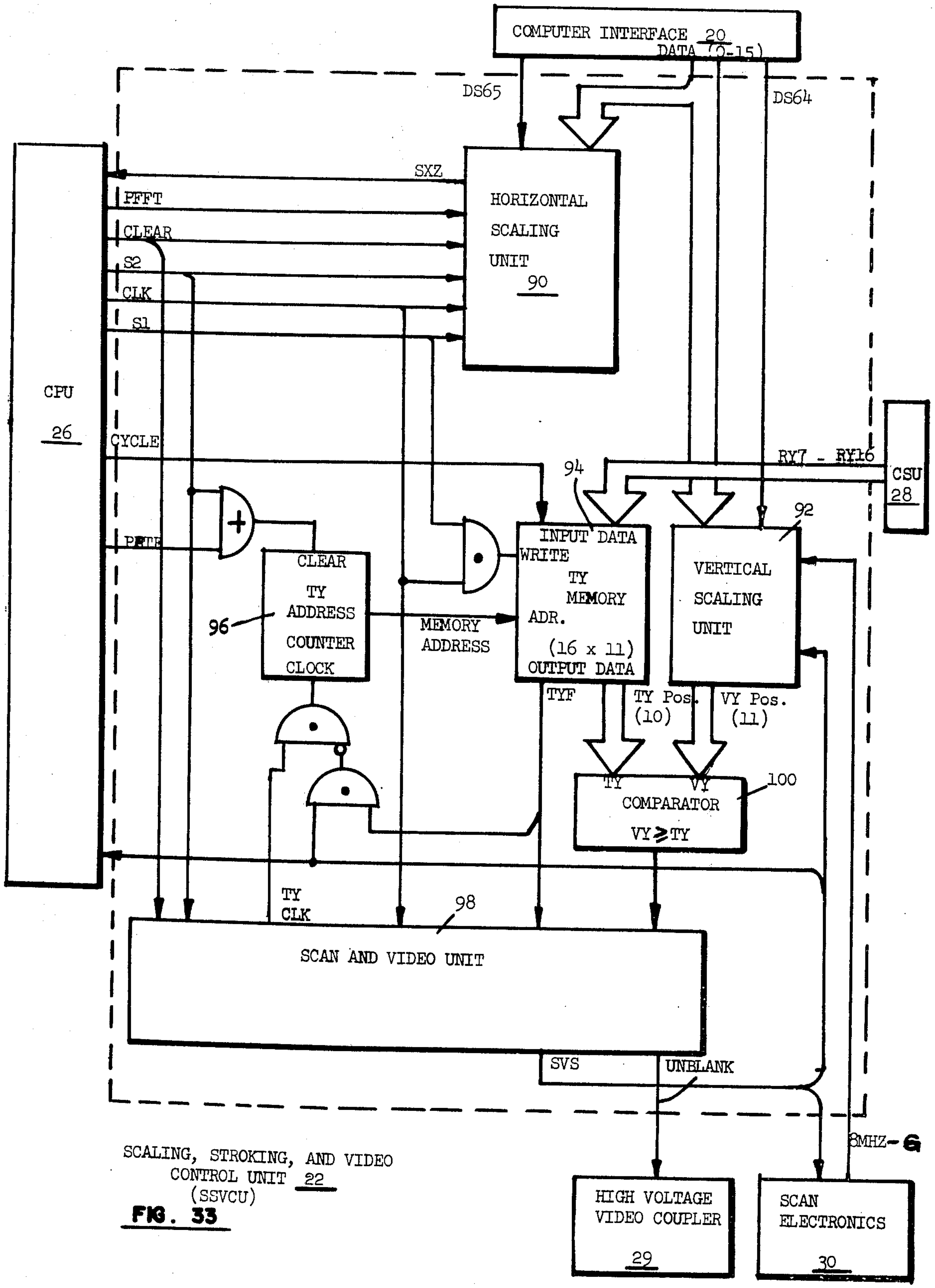
FIG. 33 is a detailed block diagram of the Scaling, Stroking, and Video Control Unit of FIG. 29.

The (SSVCU) 22 is shown in detail in block diagram FIG. 33. Primary components are the horizontal scaling unit 90 and the vertical scaling unit 92, each of which in response to the corresponding strobes DS 65 and DS 64 receive the scaling information from the data 0 – 15 input from the computer interface 20, as previously described.

A temporary Y (TY) coordinate memory 94 receives the bits RY7 – RY16, representing the Y transition coordinate of each of the outlines. The Y coordinates are supplied by CSU 28 in ascending numerical order, by the command S1 from CPU 26. TY memory 94 can store 16 eleven bit words, the last bit normally being zero. The cycle output from CPU 26 sets the 11th bit to 1 when the last Y transition coordinate is read in. This serves to identify the last outline to be processed in a given computational cycle, as will be explained.

The TY memory 94 is addressed by a TY address counter 96 advanced by a TY clock from the scan and video unit 98. Each Y coordinate value read out of TY memory 94 by the address counter 96 is supplied to a comparator 100 for the comparison VY ≥ TY.

As will be recalled, the vertical scaling function permits generating a character of any desired point size from the encoded character data related to the 72 point size or maximum point size for the established quad coordinates. The 8 MHz clock from scan electronics 30 supplied to vertical scaling unit 92 causes a counter provided therein to increment by a value corresponding to the scaling of the character to be displayed. If, for example, a 72 point character is to be displayed, the counter increments by a unit for each clock pulse input. Conversely, if a four point character is to be displayed, the counter would increment by 18 for each clock pulse, the ratio of the display point size to the standard encoded size.

Hence, the scaled CRT spot coordinate position output from the scaling unit 92 is compared in comparator 100 with the Y transition coordinate read from TY memory 94. When the comparison VY ≥ TY results, an output is supplied to scan and video unit 98 which then unblanks the scanning beam by control of the video coupler 29. As before noted, the beam is initially blanked and thus becomes unblanked on a first comparison. By virtue of the concept of outline pairs, each successive comparison then causes the beam to switch from its current state to the opposite state and thus a subsequent comparison results in blanking of the beam once again.

As soon as Scan and Video Unit 98 receives a comparison signal from comparator 100, it supplies TY CLK to the TY address counter to address TY memory 94 to read out the next transitional coordinate.

The eleventh bit stored in TY memory 94 produces the TYF output when the last Y coordinate is supplied to comparator 100. By definition, when VY ≥ TY occurs it results in blanking the beam for that stroke. The TY CLK is disabled, and the SVU 98 switches and SVS signal to an opposite logic state, indicating to the CPU 26 that the stroke is now completed. The scan electronics 30 thus terminates further stroking, readying itself for a successive stroke function. Thus, the scan electronics is not committed to scanning the beam through a fixed raster. This function thus permits higher speeds of operation.

Figure 34:
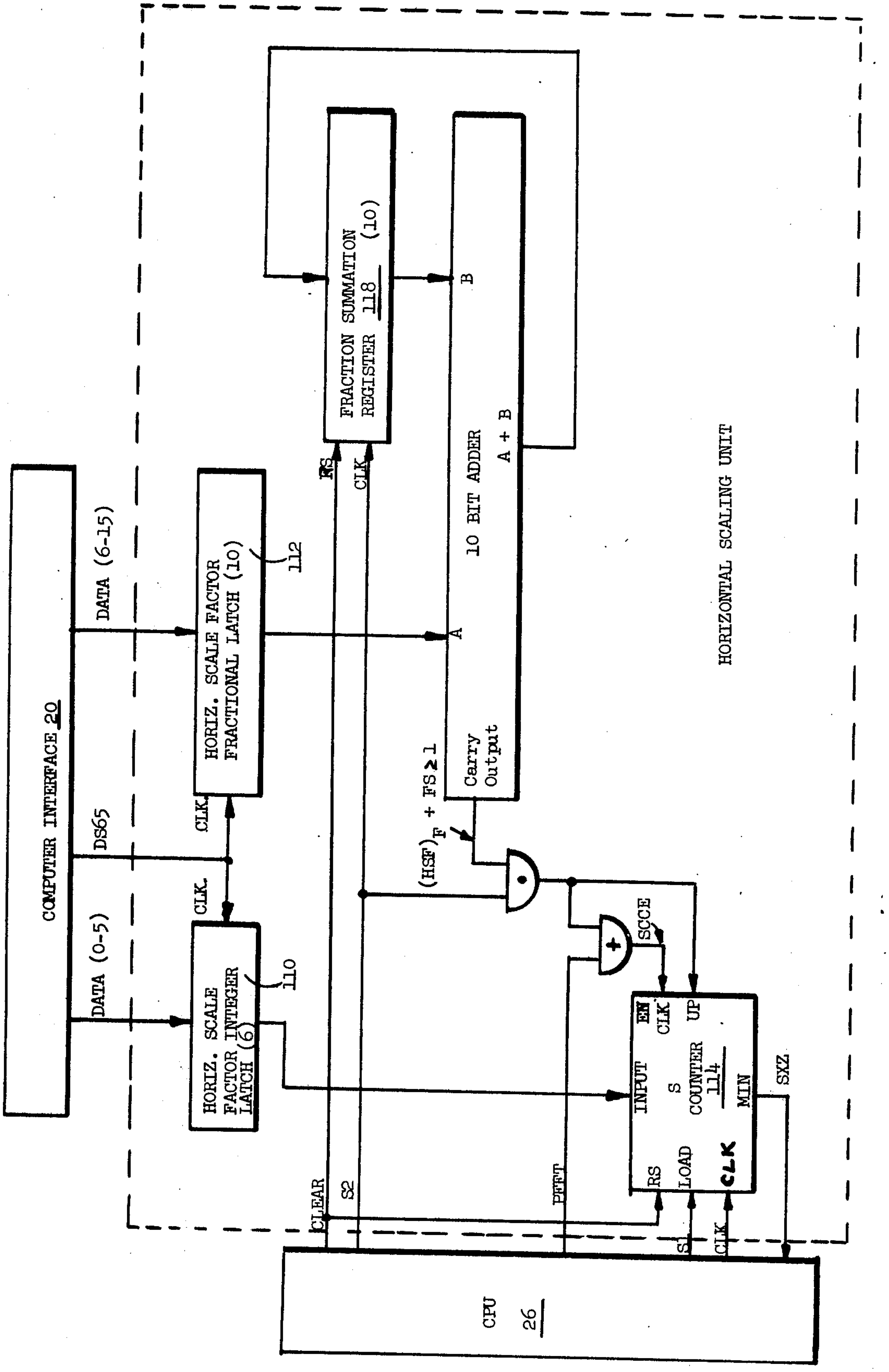
FIG. 34 is a detailed block diagram of the horizontal scaling unit of the Scaling, Stroking, and Video Control Unit of FIG. 33.

Details of the horizontal canning unit 90 are shown in FIG. 34. It will be recalled that non-integer scale factors are possible in the present system. The integer latch or register 110 contains the integer part of the horizontal scale factor and the latch 112 contains the fractional part, as supplied by the data inputs from the computer interface 20 and loaded therein by DS 65. The interger part from latch 110 is loaded into the S counter 114 under the S1 control of the (CPU) 26. After each computation cycle, CPU 26 issues PFFT to enable the S counter 114 to be decremented by the next CLK input. When it reaches a vlue of 0 (the "MIN" output) SXZ is supplied to the CPU 26 which then inhibits further computations until it initiates a new stroke.

The value in the fractional latch or register 112 is supplied to a ten-bit adder as input A, to be combined with the fraction currently stored in fractional summation register 118. Register 118 is initially cleared to a zero value by the CLEAR command of (CPU) 26, which also resets S counter 114.

When the result of the addition in adder 116 produces a carry output (e.g., as would happen on every fourth addition for a scale factor of 5¼), the carry output is gated to the S counter 114 by S2 from CPU 26 to increment its count by 1. This function, of course, is performed after the S counter 114 has been preset to the integer part of the horizontal scale factor by the load command S1.

The foregoing operations of the S unit thus will be seen to accomplish the objective of processing non-integer horizontal scale factors. This is very significant, since it not only affords precise scaling to desired point sizes, but also accommodates the use of various CRT scan densities.

Figure 35:
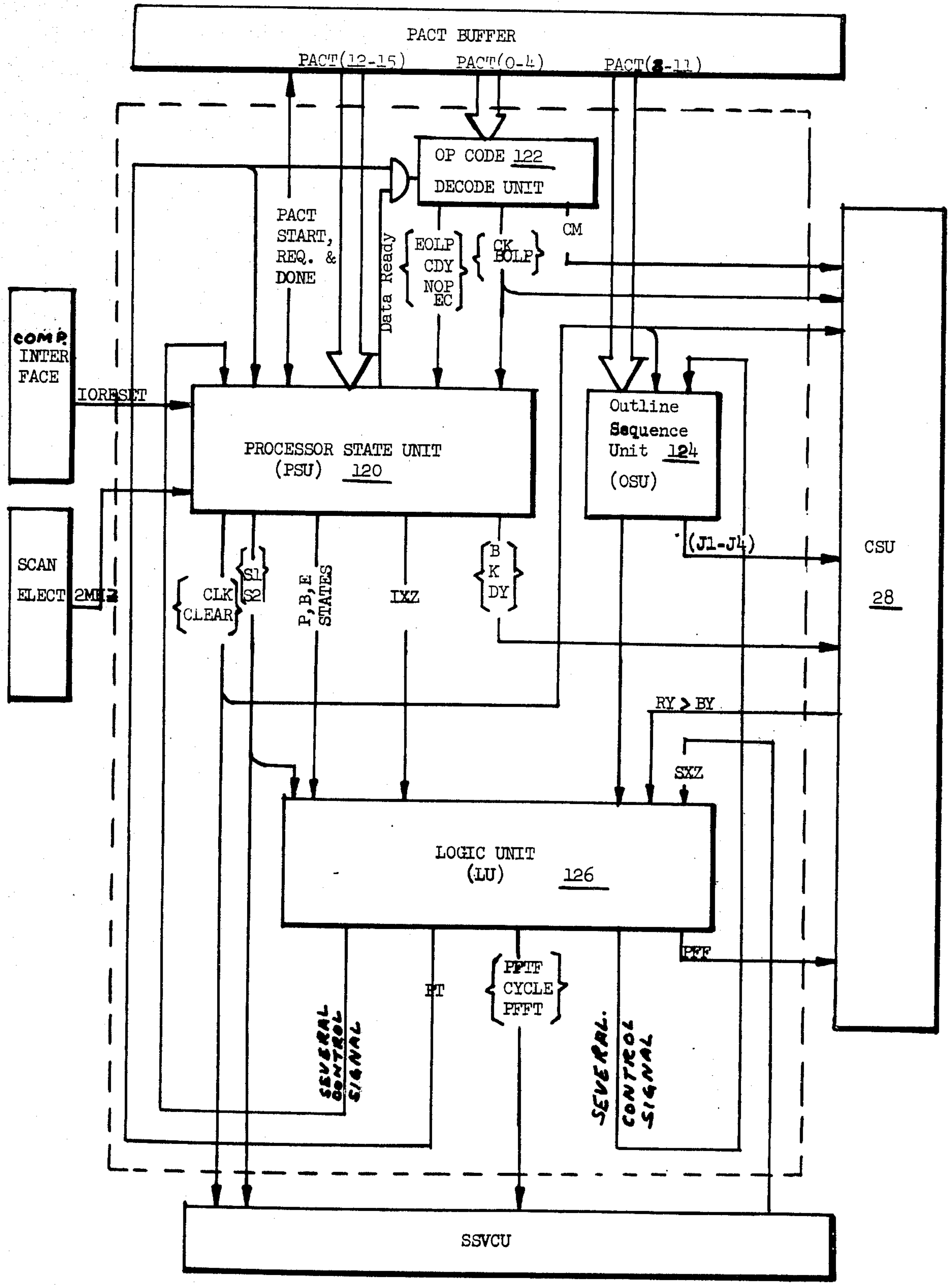
FIG. 35 is a detailed block diagram of the Central Processing Unit of FIG. 27.

The central processing unit (CPU) 26 is shown in more detail in FIG. 35 and includes as basic components a processor state unit 120, an OP decode unit 122, and an outline sequence unit (OSU) 126. The OP code decode unit 122 receives the first five bits of each pact instruction and directs the corresponding instructions to the appropriate units, as therein illustrated. Bits 8 to 11 of the instructions containing the outline bits J1 to J4 are supplied to the Outline Sequence Unit (OSU) 124 which stores the values J1 through J4 for output to the (CSU) 28. Finally, the bits 12 through 15 of those instructions identifying the number of computation cycles to the next instruction, are supplied to the (PSU) 120.

Central Processing Units in data processing systems are conventional, and the design thereof for implementing the basic sequencing and control functions required for the present system will be apparent to those skilled in the art. Hence, description of the present CPU will be limited to certain significant aspects directly relative to processing controls required in the present system.

Figure 36:
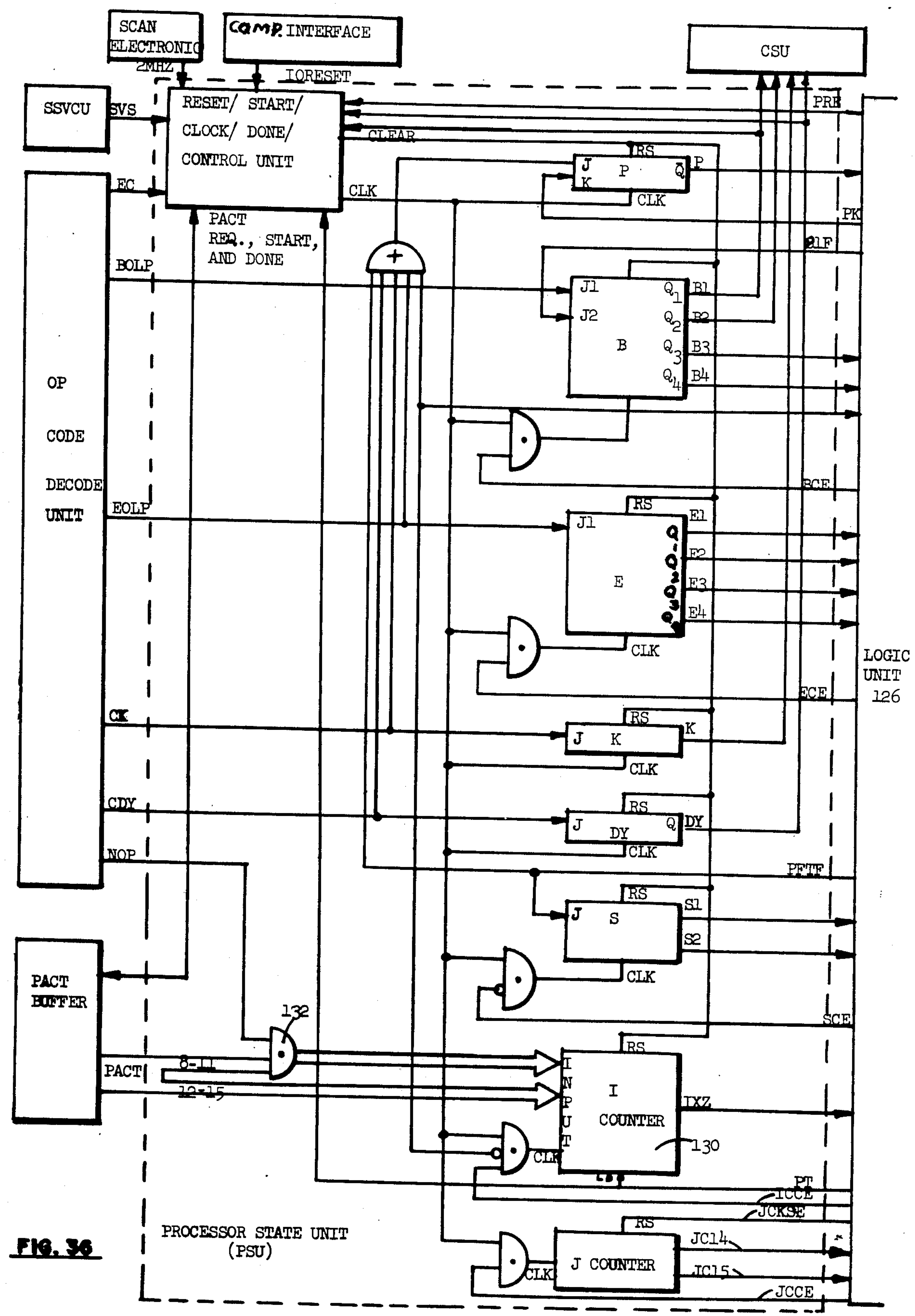
FIG. 36 is a detailed block diagram of the Process State Unit of FIG. 35.
Figure 37:
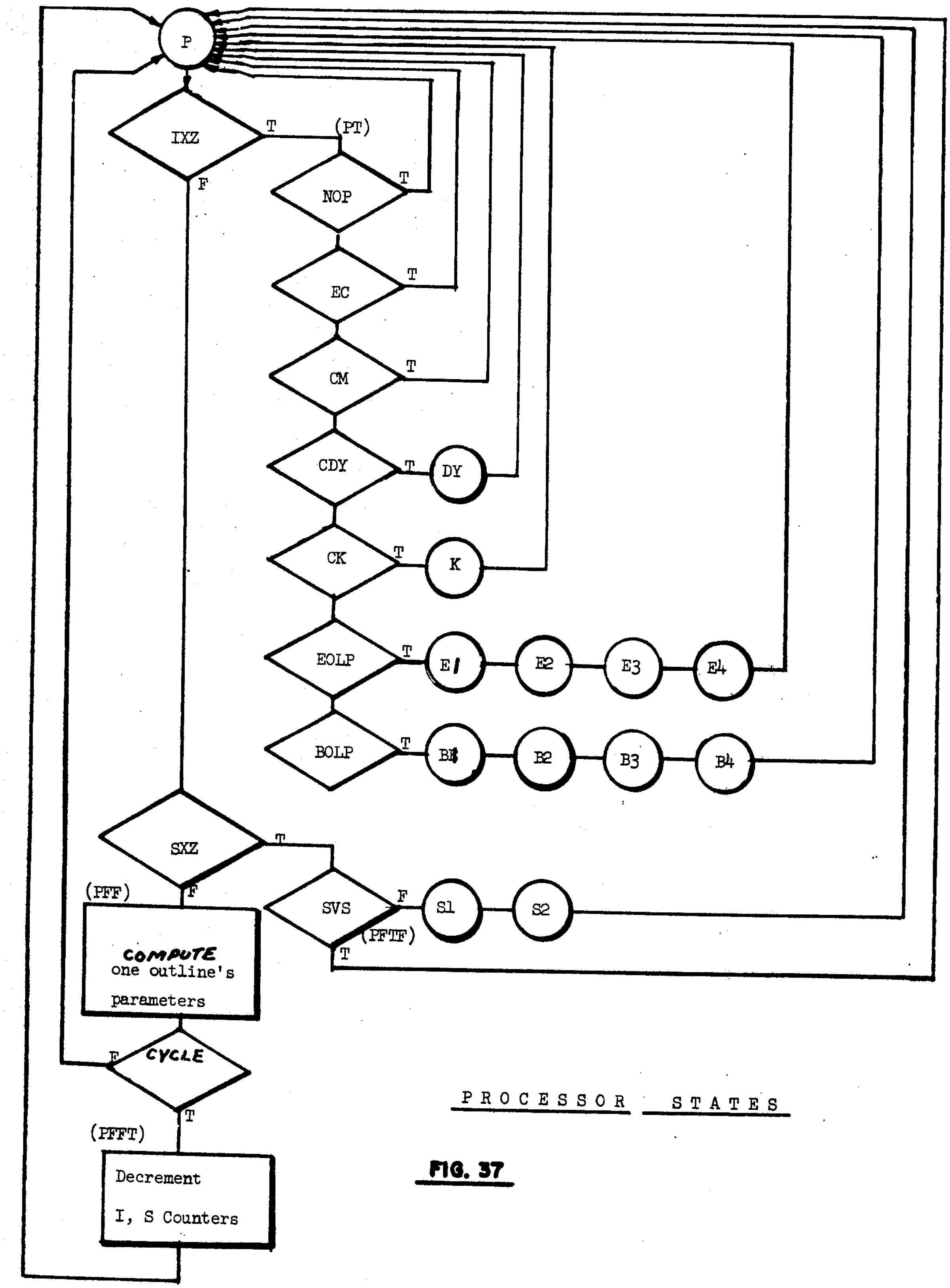
FIG. 37 is a flow chart illustrating the sequence of states of the system.

FIG. 36 shows further details of the processor state unit and serves to clarify the various outputs therefrom as shown in FIG. 35. Note that each of the instructions BOLP, EOLP, CK, and CDY is supplied to a corresponding flip-flop B, E, K, and DY, and causes the system to exit the P state, as does PFTF. The sequence of the states is more readily appreciated from the flow chart of FIG. 37, in which the EOLP and BOLP instructions are seen to estalish moreover a sequence of sub-states.

Of particular interest is the I counter 130 which is preset to the computation cycle number contained in pact bits 12 through 15 and, in the case of the NOP instruction, contained in bits 8 through 11 as well. NOP thus enables the gate 132 to pass these additional bit to the I counter. The I counter than is decremented by one during the last computation of each successive computation cycle, to 0 count, and produces the output IXZ as previously discussed.

Figure 38:
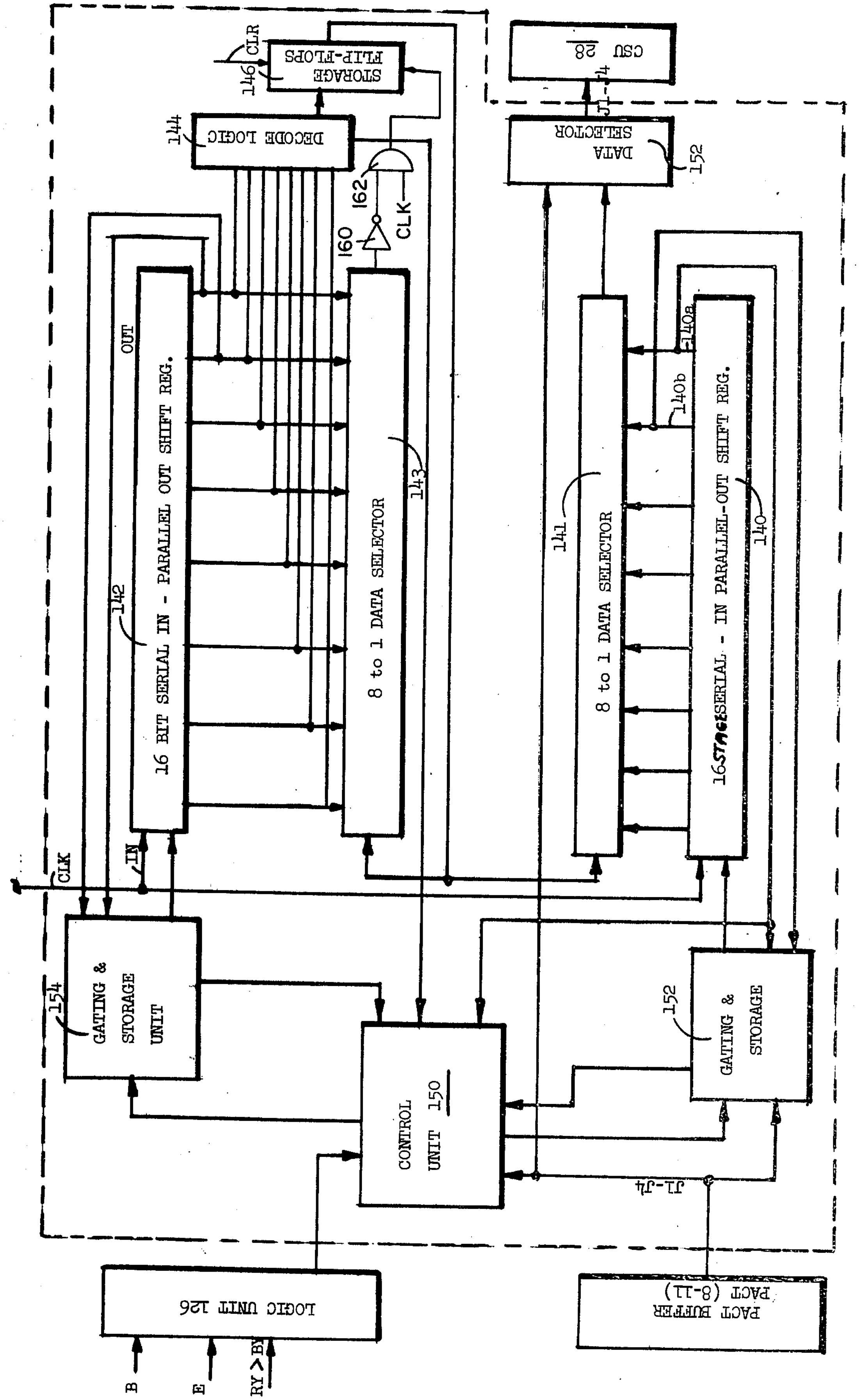
FIG. 38 is a detailed block diagram of the Outline Sequence Unit of FIG. 35.

In FIG. 38 is shown the outline sequence unit 124. Two sixteen bit, serial-in, parallel-out shift registers are provided. Register 140 stores the four bit outline numbers and register 142 stores, in a corresponding position, a single bit identifying valid outline numbers in register 140.

Primary functions to be performed include storing the outline numbers as they are supplied by BOLP instructions, and eliminating those outlines previously stored upon receipt of an EOLP instruction.

The unit 124 also organizes the outlines by ascending Y coordinate values. The assignment of outline members, of course, is arbitrary, within the range of 0 to 15 for J1 to J4. Once assigned, however, the parameters for that outline are stored in the various memories (i.e., Y, M, K, and S) at addresses defined by their respective outline members J1 to J4.

Prior examples herein of encoded characters have demonstrated that as new outline pairs develop, or as old ones end, previously unrelated outlines may now form a pair. For example, new outlines may have coordinate values intermediate to existing ones, and form new pairs. These changes are processed during the B and E states, in response to BOLP and EOLP instructions.

Hence, although there is not and cannot be an ordered sequence to the outline number assignments, it is necessary that the outline numbers be stored in accordance with an ordered sequence of the respective Y coordinate values.

This requirement is imposed to permit the direct comparison function between the vertical scaling and the TY memory read outs as discussed in relation to FIG. 33 which produces the unblanking controls for the strokes. The outline sequence unit 124 thus provides for achieving that correct ordering of the outline numbers in view of the Y coordinate values of their respective outlines. In a Y coordinate transfer operation from the CSU to the TY memory in FIG. 33, therefore, the Y RAM 40 (FIG. 29) of Y unit 38 (a portion of the CSU 28 — see FIG. 28) then is addressed by the outline numbers J1 – J4 output from CPU 26 in the correct succession of outline members which corresponds to reading out the Y coordinate transition values in the requisite ascending order.

It will be recalled from FIG. 29 that the comparison RY>BY was output to CPU 26 which in the more detailed diagram of FIG. 35 is shown more specifically as being applied to the logic unit 126 for further processing.

These functions are shown somewhat schematically in FIG. 38 to simplify an understanding of the operation. There the B and E states corresponding to BOLP and EOLP instructions are supplied to the logic unit 126 (FIG. 35) as well as RY>BY, unit 126 then providing an output to control unit 150 indicating to the latter whether the Y coordinate in the BOLP instruction is less than a Y coordinate value currently being read from memory. Recall again that the Y coordinate value being read is identified by the outline number J1 – J4. That outline number at any given moment is the J1 – J4 output from data selector 152 which is supplied to the CSU 28 to perform the addressing.

In operation, the registers 140 and 142 continuously recirculate under control of a clock. As will be explained, the register 142 with decode logic 144 identify the position, at all times, of the outline having the smallest Y coordinate value. That shift register stage is identified and loaded into the storage flip-flops 146 when the output of the 8 to 1 data selector 143 indicates the largest Y coordinate is currently addressed and another shift register stage must be selected.

The output of data selector 143, more specifically, is supplied through inverter 160 as a first input to AND gate 162 which also receives a second input, CLK. The output of the AND gate 162 then is supplied to the clock input of the storage flip-flops 146. As above discussed, a logic bit 1 comprising a so-called flag bit is stored in the register 142 for each valid outline stored in register 140, that flag bit then identifying the corresponding stage of register 140 in which a valid outline number is stored. Each of the registers 140 and 142 recirculates in synchronous fashion.

The output of the flip-flops 146 is supplied to the 8 to 1 data selectors 141 and 143.

In operation, the decode logic 144 identifies the output of the eight outputs from flag bit shift register 142 which identifies the lowest *y* coordinate outline number stored in the shift register 140. With regard to the counterclockwise direction of recirculation of the shift register 142, as illustrated in FIG. 38, it will be apparent that that first or lowest *y* coordinate identifying flag bit is the first logic 1 following a logic 0 in the register 142. That stage currently storing the first logic 1 is identified by decode logic 144 and supplied as a three bit binary number (one out of eight) to the storage flip-flops 146. Specifically, since a logic 0 value necessarily follows the logic 1 flag bit identifying the highest coordinate, a 0 output is produced. by the selector 143 following the highest Y coordinate identifying logic 1 flag bit. The logic 0 output, through inverter 160 enables AND gate 162 to supply the clock pulses to the storage flip-flops 146 whereby they are set to the binary number from decode logic 144. That newly set binary number then is supplied from the flip-flops 146 to the data selector 143 to gate through the logic 1 flag bit identifying the lowest Y coordinate. The logic 1 is inverted by inverter 160 to disable AND gate 162. Thus, as long as a continuing succession of logic 1 flag bits is produced at that identified output, the AND gate 162 remains disabled and the storage flip-flops 146 remain set to identify that specific stage at which the lowest flag bit was then stored. To complete the cycle, it then will be seen that when all valid outlines of a sequence of outlines currently stored have been processed, a logic 0 then is supplied through data selector 143 to enable setting of the flip-flops 146 to the number of the new stage in the register 142 at which the lowest Y coordinate flag bit currently is stored, by virtue of the decode logic 144.

The output of storage flip-flops 146 also is supplied to the 8 to 1 data selector 141 to gate through the outline numbers currently circulating through register 140 from the thus identified output stage of register 142, for supply to the data selector 152.

The outline sequence unit 124 thus functions to greatly increase the speed of processing of a stored sequence of outline numbers. Particularly, where less than 16 outline numbers are stored (16 being the maximum number possible in this illustrated embodiment), the system need not wait for the clocking rate of the shift registers to recirculate through a full cycle before computations on valid, stored outlines of a sequence can be reinitiated, following a prior cycle of processing of those stored outline numbers.

As an example, assume that lowest Y coordinate outline of four such outlines in storage is stored currently so as to produce a logic 1 flag bit output on the second and third outputs (counted from the right) of register 142. This identifies four corresponding valid outline numbers, two of which likewise are producing outputs on the second and third outputs of register 140. (Recall that because of using outline pairs, it is only necessary to identify the lower one of the pair of two outline numbers — the Y coordinate values of such pairs always being in adjacent, ascending value relationship relative to other such outline pairs.) Assume that the three bit output of decode logic 144, in binary form, then identifies the second output and supplies same to the storage flip-flops 146. This then controls selector 143 to pass the logic "1" output from the second output of the shift register 142 through inverter 160 thereby to disable AND gate 162. Similarly, the outline number is derived by the data selector 141 from the second position output of register 140 for supply to the data selector 152.

The logic 1 output from selector 143 continues until the four outlines have been processed at which time the second output of register 142 becomes a logic 0 and is supplied through selector 143 to produce a logic 1 from inverter 160. AND gate 162 then is enabled to supply the clock CLK to storage flip-flops 146 and set the same to the current binary output of decode logic 144. In this example, the two flag bit outputs of register 142 (identifying the location of four outline numbers in register 140) might then be located in the first and the eighth output positions of the registers 142. (This assumes shifting from left to right in each of registers 140 and 142, as is apparent from the circuit shown.) Decode logic 144 would then identify the eighth output of register 142 as containing the flag bit corresponding to the lowest Y coordinate value outline number stored in register 140 and that value would be set into the storage flip-flops 146. The selection scheme then would proceed as outline above.

Thus, the stages two through seven of register 140 containing no outline numbers, as identified by the intervening logic "0" states currently existing on the corresponding outputs two through seven of register 142, are simply "skippedover" by the operation of the sequence unit 124. This technique greatly enhances the speed of processing of the outlines.

The 8 to 1 data selector 141 thus is controlled to read out the lowest Y coordinate outline number to the data selector 152 during the succeeding clock interval.

If the Y coordinate value of a BOLP instruction is less than the thus identified lowest Y coordinate value of existing outlines (i.e., RY>BY) then the outline number from the shift register is taken out of recirculation and held in the gating and storage unit 152' and the outline number for the new outline identified by the BOLP instruction is inserted through the unit 152' into the input stage of register 140. More precisely, since BOLP includes two words and two Y coordinate values corresponding to two outlines of a pair, and recalling from FIG. 4 that the smaller coordinate value is in the first BOLP word the larger is in and the second BOLP word, it will be appreciated that the two successive corresponding outline numbers for the two Y coordinate values of the two BOLP words are inserted in succession.

Conversely, if the Y coordinate value of the BOLP instruction is greater than that of an existing outline, the gating and storage unit 152 recirculates the existing outline numbers until such time as the comparison RY>BY obtains.

The converse situation obtains with the EOLP instruction, in the sense that existing outline members are to be eliminated from the shift register. This function is easily appreciated as being more readily implemented. Note that the EOLP instruction, from FIG. 4, is encoded with the outline number having the smaller Y coordinate of a pair of outlines to be terminated. Thus, when this outline number is supplied from pact buffer to the units 150 and 152; when a comparison obtains with the outline number being recirculated by register 140 the comparison is identified to control unit 150 and the latter controls the gating unit 152' to remove that outline by inhibiting recirculation of that outline number. In addition, unit 152' now switches from the last stage output 140A to the next to last stage output 140B thereby to advance all successive outline numbers by one stage in the register 140. This serves to maintain all existing outlines in consecutive stages of the register 140, affording more efficient processing.

It will be readily perceived that the flag bit for identifying valid outline numbers may be entered into the shift register 142 or removed therefrom by generally identical control of the gating unit 154 whereby the latter performs substantially parallel operations as the gating portion of the unit 152'.

As a final point, note that only eight outputs are derived from each of the registers 140 and 142. This is a result of the unique relation of outlines in pairs. By appropriate timing, those eight parallel outputs may at all times correspond to the lower Y coordinate outline in which case the system inherently knows that the next outline in storage is the related higher Y coordinate outline of a pair. Reliance on this relationship was had and demonstrated earlier in relation to inserting the higher Y coordinate outline of a new pair from the BOLP instruction. With regard to the EOLP instruction, as above mentioned, only the lower Y coordinate outline is encoded. Thus, the cancellation function performed by control unit 150 serves to cancel both the outline for which a comparison is attained and as well the next successive outline. Hence, the EOLP instruction does not require a second word to identify the higher Y coordinate outline since this simply would be redundant.

In short, the outline sequence unit 124 serves to maintain the outlines in a correct sequence of ascending Y coordinate values. Moreover, the outline numbers are maintained in consecutive stages of the register 140. The flag bits identifying valid outlines correspondingly are maintained in the register 142. The significance of the flag bit and decode logic 144 thus will be seen to be that the processing functions may initiate immediately with the lowest Y coordinate and proceed through all valid stored outlines. The processing thus is not constrained timewise to a complete recirculation of each register. This saves valuable computing time. For example, where only one outline pair is registered, the system can immediately identify the location of the outlines, process the two outlines and then be enabled for a further processing function. The remaining fourteen stages of the shift registers thus do not have to be considered. In this example, only one-eighth of the processing time is consumed as compared to a situation where all 16 stages of the shift register would have to be examined and processed.

Conclusion

The foregoing has described the encoding technique of the present invention and a very basic form of processing circuitry for computing coordinates of characters to be generated, and finally a substantially fully detailed implementation of processing circuitry corresponding to an actual operating system. Those skilled in the art will readily appreciate that numerous modifications and adaptations of the technique and specifically implemented systems in accordance with the invention may readily be achieved. As examples of such modifications, although the invention has been disclosed in relation to a quad of rectangular coordinates, it is apparent that other coordinate systems may be employed. As well, other than rectangular coordinate-type display systems may be employed. Moreover, the coordinate system of the encoding need not be directly related to the scan pattern. To clarify, the specifically disclosed system employs a rectangular coordinate encoding quad and a raster scan pattern. The invention, nevertheless, is not confined to such a direct relationship and merely by way of exemplification and not limitation, alternative arrangements could include a rectangular encoding quad with a circular scan pattern or a polar coordinate encoding system and either a raster or circular scan for display. The necessary techniques for correlating the encoding system and resultant computations for defining coordinates of the outlines in relation to control of the display for any desired scan pattern used in the display will be apparent to those skilled in the art. Moreover, whereas significant advantages for particular applications arise out of utilization of the concept of outline pairs as set forth in the detailed disclosure of a preferred embodiment of the invention herein, it is to be recognized that the character configuration need not be defined by pairs of outlines. Instead, a character may be defined by a single outline. This may be visualized readily in relation to characters such as "E", "F", "I", etc. Where a single outline approach is adopted, the basic encoding techniques as set forth herein are still applicable. The encoding would include in such an instance both incrementing and decrementing values of computation cycles identifying the extent of applicability of any given encoded coordinate value or parameter value from which the locus of points defining the outline position are computed. Moreover, it is to be recognized that, even where the character is defined by two or more outlines, the concept of relating the outlines as pairs is primarily useful for visualization of the encoding function. In fact, it is clear that each outline may be separately defined. In any of the variations suggested above, the basic consideration is that the integrity of the character is maintained in accordance with the desired use of one or more outlines in the resultant encoding and computation functions taught by the invention. Thus, it is intended by the appended claims to cover all modifications and adaptations which fall within the true spirit and scope of the invention.

What is claimed is:

1. A character generator for generating characters encoded in accordance with a normalized quad of X Y coordinates wherein each successive X coordinate value corresponds to a computation cycle, each character being encoded in a succession of data instructions related to outlines of the character segments and including a beginning line instruction identifying the initial Y coordinate of each of a related pair of outlines, outline change instructions specifying variously fixed and variable directions of outline, and termination of an outline pair, and an instruction designating the end of a character, each change instruction including an identification of the outline to which it relates, and a number designating the computation cycles to a subsequent instruction, means responsive to a beginning line instruction to identify an initial pair of outlines and to store in relation thereto their respective Y coordinates, means responsive to a change instruction for a related outline, as identified and stored, for computing, in each successive computation cycle, a new Y coordinate value for each identified outline in accordance with its associated change instruction, said means maintaining a stored Y coordinate value for an outline for which there is no change instruction, means for updating the Y coordinate values in said storing means in accordance with the computed new value thereof, as computed in each computation cycle, and means responsive to the encoded computation cycle number of each successive change instruction to request and receive the next successive instruction for the character upon completion of the encoded number of computation cycles of a present instruction.

2. A character generator as recited in claim 1, wherein there is provided:

means for storing plural sets of instructions corresponding to plural sets of characters;

a buffer storage means for storing the successive instructions for each character of a selected set of characters to be generated; and means for supplying the successive instructions for each character of a selected set thereof to said buffer storage means.

3. A character generator as recited in claim 1, wherein said means responsive to a beginning line instruction comprises a Y unit including a Y memory for storing the initial Y coordinates of an initial pair of outlines, said Y memory having a number of storage positions corresponding to a maximum number of outlines in a given computation cycle and addressable in accordance with the identification number of each outline.

4. A character generator as recited in claim 3 wherein said Y unit further comprises a further memory having a plurality of incremental Y coordinate changes stored therein and addressable in accordance with a corresponding identification number of an instruction encoded to specify a fixed increment of change of the Y coordinate for an identified outline, and means operable in each computation cycle to add to the current Y coordinate from the Y memory and the increment of Y from the further memory to compute a new value of Y updated by the increment and means for storing the updated Y value in the Y memory position for the outline, in each successive computation cycle until a further change instruction for the outline or an end of character instruction.

5. A character generator as recited in claim 3 wherein one of the change instructions includes a change slope instruction encoded in accordance with a designated slope and each slope being defined as a predetermined increment of Y in each computation cycle, and wherein:

said Y unit further includes a Y increment memory having a plurality of storage positions addressable by an encoded slope designation and storing in the corresponding position the value of the Y increment, and said updating means includes:

means operable in each computation cycle for addressing the Y memory for the outline identified by a change slope instruction and for addressing the incremental Y memory in accordance with the slope designation to derive the corresponding Y coordinate value and Y increment values, and means for adding the derived Y coordinate and Y increment values to compute a new value of Y thereform, and said updating means updates the Y memory with the thus computed new value of Y.

6. A character generator as recited in claim 5 wherein said computing means further comprises an M unit having an M memory addressable in accordance with the outline number of a change slope instruction to store in a corresponding memory position the slope designation of the instruction, said M memory supplying the slope designation for each outline to the Y increment memory of said Y unit.

7. A character generator as recited in claim 6, wherein a further outline change instruction comprises a change of curvature instruction for an identified outline and wherein each designated curvature corresponds to an increment of change in slope, defining a succession of slope values updated by the said increment, each said updated slope value being utilized for a predetermined number $S_N$ of computation cycles to effect a corresponding number of updates of the Y coordinate to establish a desired radius of curvature of the resulting outline, and said computing means further comprises:

a K memory addressable in accordance with the identified outline of a change curvature instruction to store in the corresponding memory position the curvature designation of the instruction;

K decode logic means responsive to a curvature designation derived from the K memory for supplying the increment of slope corresponding to the designated curvature; and a further memory having stored therein a plurality of values $S_N$ respectively corresponding to the number of computation cycles of Y updates for each of the updated values of slope for a given curvature designation and addressable in accordance with the designated curvature of a change curvature instruction and each of the updated values of the slope, in succession, to supply the corresponding $S_N$ value as as output.

8. A character generator as recited in claim 7, wherein:

said computing means further includes an S unit for accumulating a count S as a function of the number of updates of the Y coordinate for each of the succession of slope values related to a given curvature, said S unit including an S memory addressable in accordance with the outline identification to store in the corresponding memory position a current value S corresponding to the number of Y updates at a given slope, said K decode logic means of said K unit furthermore provides an S increment $\Delta$ S for a given curvature designation, and said S unit further includes an adder for adding in each computation cycle, corresponding thereby to each Y update, the value $\Delta$ S supplied by said K decode logic to the S value for the corresponding outline stored in said S memory, and means for updating, in accordance with the summation output of said adder, the value of S stored in said S memory for the corresponding outline.

9. A character generator as recited in claim 8, wherein said S unit further comprises:

a comparator for comparing the updated S value from said S memory with the stored value $S_N$ of the predetermined number of Y updates from said memory of said K unit in accordance with a present slope value, to determine when the accumulated S value corresponds to said predetermined value $S_N$ of Y updates, and means responsive to said comparator to continue the addition by said adder of an incremental S value $\Delta$ S to the stored S value when the S value is less than said predetermined number $S_N$ and alternatively to supply a reset value $S_O$ in lieu of the updated S value when the latter equals or exceeds a predetermined number of Y updates.

10. A character generator as recited in claim 9, wherein there is further provided decode logic responsive to the slope value and to the curvature designation for defining respectively corresponding reset values $S_O$.

11. A character generator as recited in claim 9, wherein there is further provided means responsive to the output of said comparator when the incremented value of S equals or exceeds the predetermined number of Y updates thereby to enable update of the slope designation in accordance with the increment of slope change supplied by said decode logic in response to the curvature designation.

12. A character generator as recited in claim 11 wherein said curvature designation identifies positive or negative curvatures and wherein the succession of slope values defined for a given curvature correspondingly are incremented or decremented.

13. A character generator as recited in claim 12 wherein said Y unit further includes means for recognizing alternatively the incrementing or decrementing effect of incremental changes of slope to supply corresponding incrementing or decrementing Y coordinate increments to said added for producing correspondingly incrementing or decrementing Y update changes whereby outlines of positive and negative curvatures are selectively defined.

14. A character generator as recited in claim 10, wherein said further memory of said K unit having stored therein the predetermined number of successive updates for a given curvature designation defines for unitary increments of the value S the base radius of curvature and wherein different radii of curvature are derivable from the stored number of updates for a given radius of curvature by selectively or in combination incrementing the S count in accordance with non-unitary values and incrementing or decrementing the slope in accordance with non-unitary values, and wherein said decode logic receiving the output of said K memory correspondingly provides integer $\Delta M_I$ and fraction $\Delta M_F$ values of said slope increments and integer $\Delta S_I$ and fractional $\Delta S_F$ values of the S count update values.

15. A character generator as recited in claim 14, wherein there is further provided a memory having stored therein fractional S values $S_F$ and an associated further added for adding each fractional S update value $\Delta S_F$ to the stored $S_F$ value, and means to update the $S_F$ memory by storing the updated value $S_F + \Delta S_F$ for outline in the $S_F$ memory, and means for supplying said carry output to said adder for the S and $\Delta S_I$ update increments when the successive updates of the value $S_F$, as defined by the output of the $S_F$ and $\Delta S_F$ adder, reaches unity.

16. A character generator as recited in claim 1, wherein said means responsive to the encoded computation cycle number comprises:

a counter set to the encoded number in response to each change instruction and means responsive to completion of the computation for all outlines computed in a given cycle to decrement the counter by unity value, and means responsive to a zero count of said counter for requesting a successive instruction for the character.

17. A character generator as recited in claim 1, wherein there is further provided a sequencing unit storing the outline identification numbers in a sequence corresponding to an ordered succession of Y coordinate values of the thereby identified outlines.

18. A character generator as recited in claim 17, wherein there is further provided a control unit including a temporary memory and a temporary memory address counter and means responsive to the sequence of outline number designations stored in said sequence unit for supplying updated Y coordinates of the outlines in each computation cycle to said temporary memory in an ordered sequence of coordinate values.

19. A character generator as recited in claim 18 for use with a display means having scanning means effecting a succession of horizontally displaced vertical strokes, each vertical stroke having a fixed ramp rate and said scanning means being normally blanked, and wherein the updated Y coordinate values of a given computation cycle are employed to control blanking and unblanking of a scanning beam in a corresponding stroke of the beam, further comprising a vertical scaling unit for scaling the Y coordinate values of the normalized quad to the deflection of the beam in each stroke, and a comparator for comparing the effective scaled coordinate position of the stroke relative to the Y coordinates of the normalized quad with the ordered succession of updated Y coordinate values of the said temporary memory to produce unblanking and blanking control outputs in alternate succession for each comparison of the vertically scaled unit output being equal to or greater than the stored and updated Y coordinate stored in the temporary memory, for each such stored Y coordinate value of the ordered succession thereof.

20. A character generator as recited in claim 19, further comprising means for storing in association with the last Y coordinate value an identification of the absence of further coordinate values in said temporary memory, and means responsive to said stored identification upon said last coordinate value being supplied to said comparator to identify the conclusion of Y coordinate information and thereby terminate the current stroke.

21. A character generator as recited in claim 19, wherein there is further provided:

means for generating a clocking signal during each vertical stroke and related to the ramp rate of the stroke, and said vertical scaling unit includes means for receiving a vertical scaling factor relating the size of a character to be displayed to a maximum point size corresponding to the encoding of the character in the normalized quad, and a counter and means to increment the counter in response to each clock pulse during a stroke by an amount corresponding to the vertical scaling factor.

22. A character generator as recited in claim 19, wherein each vertical stroke of the display means is performed at a predetermined horizontal spacing in accordance with a desired stroke density, and there is further provided:

a horizontal scaling unit for receiving and storing a horizontal scale factor relating the computation cycles of the normalized quad for a maximum size character display to the desired size of the character to be displayed and to the stroke density, and means for decrementing said stored horizontal scale factor in accordance with completion of said computation cycle and producing an output upon the stored scale factor being decremented to a minimum value, and means enabling a successive scanning stroke of the display means in response to said output for controlling the blanking and unblanking of the scanning means in accordance with the ordered sequence of Y coordinate values of the preceding, completed computation cycle.

23. A character generator as recited in claim 22, wherein said horizontal scaling unit comprises first and second storage means for storing horizontal and fractional portions of the horizontal scale factor, respectively, an adder for receiving the horizontal fractional scale factor in each computation cycle and adding that fraction to a fraction summation value, a fraction summation register for storing said fraction summation value and supply thereof to said adder, a counter for storing the horizontal scale factor supplied thereto by said first storage means, and gating means for decrementing the integer count stored in said counter for each computation cycle and for incrementing the count thereof in response to a carry output from said adder when the addition of the fractional scale factor to the fraction summation of said register thereby is equal to or greater than unity.

24. A character generator as recited in claim 23, wherein said means responsive to the minimum output of said counter for thereby enabling the stroke effects loading of the horizontal scale factor into said counter for a successive operation.

25. A character generator as recited in claim 17, wherein said sequencing unit comprises a first recirculating shift register having a number of storage positions corresponding to the maximum number of outlines capable of being processed, a second recirculating shift register of a corresponding number of storage positions and recirculating in synchronism with said first shift register, and gating means for inserting a flag bit in each stage of said second shift register for which a valid outline number is stored in the corresponding stage of the first shift register.

26. A character generator as recited in claim 25, wherein each of said shift registers includes parallel outputs and there is further provided decode logic responsive to the parallel outputs of said second shift register to identify in accordance with the position of a flag bit therein the storage position of said first shift register having, at any given point in time, the outline number corresponding to the lowest ordered Y coordinate outline value, and a data selector for reading out the stored outline identification numbers from said first shift register supplied at said parallel outputs thereof from the position identified by the decode logic, in succession for the plurality of identification numbers stored therein, thereby to avoid delays in requiring complete recirculation of each shift register to obtain outputs of the stored identification numbers therefrom.

27. A character generator as recited in claim 25, wherein there is further provided first and second gating means respectively associated with said first and second shift registers, means operable in response to each stored identification number for comparing the corresponding Y coordinate value with the Y coordinate value of a newly received beginning line instruction to determine whether the stored Y coordinate value is greater than the encoded Y coordinate value of the instruction, and said gating means responding to said comparison when the stored Y coordinate value exceeds the Y coordinate value of the instruction to interrupt the recirculation of the corresponding identification number in said first shift register and insert in advance thereof the identification number of the new outline encoded in the instruction.

28. A character generator as recited in claim 27, wherein said second gating means is operable in parallel with said first gating means to insert a further flag bit in the corresponding shift register position of said second shift register.

29. A character generator as recited in claim 25, wherein there is further provided gating means associated with said second shift register to control the recirculation of data therein, and there is further provided:

means responsive to an end of line pair instruction to store the outline identification number encoded therein for comparison with the stored identification numbers recirculating in said first shift register, and said gating means for said first shift register responding to the comparison of a currently recirculating outline number and the stored outline number from the instruction to inhibit further recirculation of that outline number 30. A character generator as recited in claim 23, wherein said gating means is connected to said first shift register to receive and recirculate the contents thereof from a stage displaced from the last stage in response to inhibiting recirculation of a terminated outline number thereby to maintain the recirculating outline numbers in consecutive order position in the shift register.

31. A character generator as recited in claim 30, wherein said gating means for said second shift register is operated in parallel with said gating means for said first shift register to eliminate the corresponding flag bit and to recirculate remaining flag bits from a stage of the shift register displaced from the last stage thereby to maintain the flag bits in the corresponding positions of the second shift register for identifying valid outline numbers in the first shift register.

32. A method for automatically generating characters with respect to a normalized encoding quad of X-Y coordinates having predetermined Y coordinate values wherein for at least one parameter of directional variations of a line within the quad, there are selected a plurality of fixed values of the parameter variations, the fixed values respectively relating to Y coordinate increments to successive X coordinate positions and wherein a first and each successive X coordinate position defines a computation cycle, each character capable of being generated being encoded in an instruction set in accordance with storing the initial Y coordinates of the outlines of each pair of outlines of a character as an instruction identifying the beginning of the outline pair, storing, in relation to each outline having a directional variation, the corresponding parameter value as a parameter change instruction, determining the number of X coordinate positions from the first and each successive parameter change instruction to the respectively next successive instruction, and storing the determined number as a number of computation cycles in associated with the first of each two said successive instructions, storing an end of character instruction, and storing the termination of an outline pair intermediate the beginning and end of a character as an end of outline pair instruction, and the generating method comprising:

providing a set of instructions in accordance with the aforesaid encoding of a character to be generated, for each character available to be generated, identifying a desired character to be generated and selecting, in succession, the instructions of the corresponding said set thereof for processing, in accordance with responding to each begin outline pair instruction corresponding to outline pairs initiating with the first X coordinate position of the character to identify and store the Y coordinate and thereby establish a starting point for each such outline relative to the quad, and in each successive computation cycle, computing the Y coordinate position of each outline in accordance with the stored value thereof and any encoded parameter change instructions for the outline and storing said computed Y coordinate values, and storing the number of computation cycles from a first instruction encoded therewith and reducing that number by a predetermined amount upon completion of computations in each of successive computation cycles and, in response to said number being reduced to a predetermined value, selecting the next successive instruction of said set for said character.

33. A method for automatically generating characters as recited in claim 32, further comprising:

computing a new Y coordinate value of each outline in accordance with the Y coordinate increment stored for the value of the parameter change instruction for that outline in each successive computation cycle in response to a parameter change instruction for that outline and, upon completion of a number of computation cycles corresponding to the stored, determined number of X coordinate positions from a given instruction, computing a Y coordinate value in accordance with the next successive instruction for the outline to which that next successive instruction relates, and terminating computations of Y coordinate values in response to an end of outline pair instruction as to the outlines of the terminated pair and terminating all computations in response to an end of character instruction.

34. A method for automatically generating characters encoded in a normalized quad of predetermined X and Y coordinate values wherein successive X coordinates define successive computation cycles and wherein each outline is encoded in a begin outline pair instruction for each outline thereof as to its initial Y coordinates, in a parameter change instruction as to at least a first parameter of directional variations comprising one of a plurality of fixed values of the first parameter, each said fixed value defining a Y coordinate increment; an end of outline pair instruction for the outlines of a pair terminating intermediate the beginning and end of a character; each foregoing instruction furthermore being encoded with an outline number identifying the outline to which it relates; and an end of character instruction for terminating all outlines of the character; each instruction excepting the begin outline pair instruction and the end of character instruction furthermore being encoded with the number of computation cycles corresponding to the number of X positions to the next encoded instruction for the character, comprising:

providing a set of instructions in accordance with the aforesaid encoding of a character to be generated for each character available to be generated, identifying a desired character to be generated and selecting, in succession, the instructions of the corresponding said set thereof for processing, in accordance with, in a first computation cycle, responding to each begin outline pair instruction corresponding to an outline pair initiating at an initial X coordinate position of the character to establish an initial Y coordinate value for each such outline relative to the quad, in each successive computation cycle, generating the Y coordinate value of each outline in accordance with its Y coordinate value generated in the respectively next preceding computation cycle and any current instruction as to that outline, to define the Y coordinate value for the corresponding X coordinate position in relation to the quad, including for each outline having a parameter change instruction, computing a new y coordinate value in accordance with modifying the initial value by the amount of the increment identified by the parameter value encoded in the instruction, and terminating the computation of Y coordinate values for each outline pair identified by an end of outline pair instruction, and storing the number of computation cycles from a first instruction encoded therewith and reducing that number by a predetermined amount upon completion of generating the Y coordinate values of each outline in each of successive computation cycles and, in response to said number being reduced to a predetermined value, selecting the next successive instruction of said set for said character, terminating the computation of Y coordinate values for all outlines for a given character in response to an end of character instruction.

35. A method for automatically generating characters as recited in claim 34, further comprising:

responding to each begin outline pair instruction subsequent to an initial such instruction to identify initial Y coordinate values for the outlines of each such subsequent pair at an X coordinate position of the quad corresponding to the elapsed number of computation cycles of preceding instructions, thereby to initiate the generation of new outlines of the character.

36. A method for automatically generating characters as recited in claim 35, wherein the characters further are encoded as to a second parameter having a plurality of fixed values each thereof defining a succession of incremental changes in the first parameter and wherein the change of the first parameter in accordance with the increment is a function of a predetermined number of changes in the Y coordinate in accordance with each successively changed value of the first parameter, comprising:

responding to each instruction of a change in the second parameter for a given outline, to compute the Y coordinate for the outline in each of successive computation cycles by identifying the increment of change of the first parameter in accordance with the second parameter and computing the value of the first parameter therefrom, identifying the incremental value of change of the Y coordinate in accordance with the computed first parameter value and computing a new Y coordinate value therefrom in each of successive computation cycles for the predetermined number of changed values of Y, and continuing to compute new successive values of the first parameter upon completion of computations for the predetermined number of changed values of Y in accordance with said identified increment of change of the first parameter corresponding to the value of the second parameter and computing new changed values of Y in accordance with the new computed value of the first parameter for the predetermined number of changes in values of Y in successive computation cycles.

37. A method for automatically generating and displaying characters encoded in a normalized quad of predetermined X and Y coordinate values wherein successive X coordinates define successive computation cycles and wherein each outline is encoded in a begin outline pair instruction for each outline thereof as to its initial Y coordinates, in a parameter change instruction as to at least a first parameter of directional variations comprising one of a plurality of fixed values of the first parameter, each said fixed value defining a Y coordinate increment; an end of outline pair instruction for the outlines of a pair of terminating intermediate the beginning and end of a character; each foregoing instruction furthermore being encoded with an outline number identifying the outline to which it relates; and an end of character instruction for terminating all outlines of the character; each instruction excepting the begin outline pair instruction and the end of character instruction furthermore being encoded with a number of computation cycles corresponding to the number of X positions to the next encoded instruction for the character, comprising:

generating characters in accordance with:

providing a set of instructions in accordance with the aforesaid encoding of a character to be generated, for each character available to be generated, identifying a desired character to be generated and selecting, in succession, the instructions of the corresponding said set thereof for processing, in accordance with, in a first computation cycle, responding to each begin outline pair instruction corresponding to an outline pair initiating at an initial X coordinate position to establish initial Y coordinates for each such outline relative to the quad, in each successive computation cycle, generating the Y coordinate value of each outline in accordance with its Y coordinate value generated in the respectively next preceding computation cycle and any current instruction as to that outline, to define the Y coordinate value for the corresponding X coordinate position in relation to the quad, including for each outline having a parameter change instruction, computing a new Y coordinate value in accordance with modifying the initial value by the amount of the increment identified by the parameter value encoded in the instruction, and terminating the computation of Y coordinate values for each outline pair identified by an end of outline pair instruction, and storing the number of computation cycles from a first instruction encoded therewith and reducing that number by a predetermined amount upon completion of computations in each successive computation cycles and, in response to said number being reduced to a predetermined value, selecting the next successive instruction of said set for said character, terminating the computation of Y coordinate values, for all outlines of a given character in response to an end of character instruction, and displaying characters thus generated on a display means including means for effectively horizontally displaced vertical strokes on a display element in accordance with a desired stroking density and wherein the scanning means may be selectively controlled to blank and unblank each stroke on the display element, in accordance with:

correlating the size of the display character in the X coordinate direction, in accordance with the effective displacement of successive X positions of the quad, to the stroke density of the display means to define a first component value of a horizontal scaling factor thereby to control character size in the X coordinate direction by control of stroke density on said display means, in the character generation operation, and controlling the unblanking and blanking of the scanning beam during each stroke in accordance with the computed Y coordinate values for the cycle correlated with the stroke.

38. A method of characte generation and display as recited in claim 37 further comprising:

correlating the size of the characters to be displayed with respect to the maximum size in accordance with which the character is encoded to define a second component value of the horizontal scaling factor, and defining a series of numbers of computation cycles in accordance with the horizontal scaling factor, storing a first number of said series of numbers of computation cycles and reducing same by a predetermined amount for each successive computation cycle and producing an output when the said stored number is reduced to a predetermined value thereby to select the computation cycle from which the Y coordinate information is obtained to control the scanning means in each stroke thereof, and storing a successive number of said series thereof in response to said output and upon completion of a prior stroke, thereby to initiate a successive number of computation cycles for control of a subsequent, correlated stroke of said scanning means.

39. A method of character generation and display as recited in claim 38 wherein each stroke of the vertical scan in performed at a known, fixed ramp rate of displacement on the display element, and wherein the characters are encoded in the normalized quad for a maximum size character display, further comprising:

correlating the size of the charactes to be displayed with respect to the maximum size in accordance with which the character is encoded and with respect to the ramp rate to define a vertical scaling factor, and unblanking and blanking the scanning means during each stroke in accordance with the Y coordinate values of the outlines defined in the computation cycle corresponding to the stroke as those values are scaled by the vertical scaling factor.

40. A method of automatically generating characters with respect to a normalized encoding quad of X-Y coordinates having predetermined Y coordinate values wherein each character capable of being generated is encoded in accordance with selecting and designating a plurality of slopes, each slope having a value defined as a corresponding, fixed increment of the Y coordinate for a unit change in the X coordinate, selecting and designating a plurality of slopes, each slope having a value defined as a corresponding, fixed increment of the Y coordinate for a unit change in the X coordinate, selecting and designating a plurality of curvatures, each curvature having a succession of incrementally changing values of slopes, with each incrementally changed slope having a related predetermined number of changes in Y in accordance with the Y increment for a given slope value, relating each of the characters to be encoded to the normalized quad, and, for each character, defining and identifying outlines of the character, wherein the outlines are related in pairs, each pair containing therebetween a solid continuous segment of the character, storing in a corresponding beginning of line instruction the initial Y coordinate of each outline of the character, storing, for each outline having a slope, the outline identification and the corresponding slope designation in a slope change instruction, storing, for each outline having a curvature, the outline designation and the corresponding curvature designation in a change curvature instruction, storing in at least each instruction subsequent to the beginning of line instruction and prior to the end of a character, the number of X coordinate positions to the next successive instruction for the character as a corresponding number of computation cycles, storing an end of character instruction, and said method of character generation comprising:

providing at least one set of instructions, each such set defining a corresponding character to be generated, identifying a desired character to be generated and selecting, in succession, the instructions of the corresponding said set thereof for processing in accordance with responding to each begin outline pair instruction of said at least one set corresponding to an outline pair initiating with the first X coordinate position of the character to identify and store the initial Y coordinate and establish a starting point for that outline relative to the quad, and in each successive computation cycle, determining the Y coordinate value of each outline for the corresponding X coordinate position of the quad in accordance with:

maintaining the initial Y coordinate value in the absence of a change instruction for the outline;

computing a new, changed Y coordinate value in response to a change instruction for the outline, and storing said new Y coordinate value, and storing the number of computation cycles from a first instruction encoded therewith and reducing that number by a predetermined amount upon completion of computations in each of successive computation cycles and, in response to said number being reduced to a predetermined value, selecting the next successive instruction of said set for said character.

41. A method for automatically generating characters as recited in claim 40, further comprising:

in response to a slope change instruction for an outline, computing a new Y coordinate value of that outline in accordance with the Y coordinate increment stored for the designated slope of the slope change instruction in each successive computation cycle, and in response to an end of outline pair instruction, terminating computations of Y coordinate values for the outlines of the terminated pair, and terminating all computations in response to an end of character instruction.

42. A method for automatically generating characters as recited in claim 41, further comprising:

in response to a curvature change instruction for an outline, determining the increment of change of slope for the encoded, designated curvature and computing a first slope value, determining the said predetermined number of changes in Y, and the increment of change of Y for the computed first slope, computing new values of Y in accordance with the determined Y increment in each computation cycle of said predetermined number, and computing a successive slope value and determining the increment for computing new values of Y in successive computation cycles upon each completion of the corresponding predetermined number of such new value of Y computations.

43. A system for automatically generating characters with respect to a normalized encoding quad of first and second coordinates wherein each character capable of being generated includes at least one outline and the character is encoded as to that outline with respect to a normalized encoding quad to define values of the first coordinate with respect to successive values of the second coordinate and including a beginning of line instruction definining the initial first coordinate value for each outline, a slope change instruction for each outline having a slope, a curvature change instruction for each outline having a curvature, each foregoing instruction identifying the outline to which it relates and designating the number of successive positions of the second coordinate prior to the next successive instruction for the character, an end of outline instruction and an end of character instruction, comprising:

means defining a computation cycle with respect to each successive position of the second coordinate of the encoding quad, means responsive to a begin outline instruction corresponding to an outline initiating at the first position of the second coordinate to identify the initial value of the first coordinate, thereby to establish a starting point for that outline relative to the quad, and means operative in each successive computation cycle to determine the value of the second coordinate for each outline with respect to the corresponding position of the first coordinate of the quad, including means for maintaining the said initial value of the second coordinate system in the absence of a change instruction for the outline, and means for computing a new, changed value for the outline in response to a change instruction of the outline.

44. A system as recited in claim 43, wherein said outlines correspond as pairs of outlines defining therebetween a solid segment of the character to be generated, the begin outline instruction being encoded for both outlines of the pair to constitute a begin outline pair instruction, and wherein said means responsive to each begin outline pair instruction thereby identifies the initial value of the second coordinate as the starting point for the said pair of outlines relative to the quad.

45. A system for displaying characters wherein each character to be displayed is encoded in relation to a normalized encoding set of first and second coordinates and wherein a character is defined by at least one outline encoded in a set of instructions defining, for a first value of the second coordinate, a value of the first coordinate corresponding to a point on the outline and at least one value indicative of the extent relative to the second coordinate for which the stored value of the first coordinate corresponds to points on the outline, comprising:

means for generating the character for display, including means for computing a first coordinate value corresponding to a point on the outline for each successive second coordinate value in accordance with the encoded set of instructions for the character outline.

display means including a display element and means for scanning the display element in scan paths of a desired pattern controlled to encompass a region of the display element on which the character is to be displayed, and means for controlling said scanning means between a display state for producing a display and a blanked state for producing no display, said means for computing including means for correlating the second coordinate values and the computed first coordinate values of the outline with the scan pattern and region of display, and said scanning control means controlling said scanning means to switch from one to the other of the display and blanked states when the scanning in each scan path crosses the correlated and computed coordinate values of the outline.

46. A system for displaying characters wherein each character to be displayed is encoded in relation to a normalized encoding set of first and second coordinates and wherein a character is defined by at least one outline encoded in a set of instructions defining, for a first value of the second coordinate, a value of the first coordinate corresponding to a point on the outline and at least one value indicative of the extent relative to the second coordinate for which the stored value of the first coordinate corresponds to points on the outline, comprising:

means for generating the character for display, including means for computing a first coordinate value corresponding to a point on the outline for each successive second coordinate value in accordance with the encoded set of instructions for the character outline, display means including a display element and means for scanning the display element in scan paths of a desired pattern controlled to encompass a region of the display element on which the character is to be displayed, and means for controlling said scanning means between a display state of producing a display and a blanking state for producing no display, said means for computing including means for correlating the second coordinate values and the computed first coordinate values of the outline with the scan pattern and region of display, and said scan controlling means controlling the scanning means in each scan path to switch from the current to the opposite one of display and blanked states at each intersection of the scan path and the computed outline, except at tangential intersections thereof.

47. A character generator for generating characters encoded in accordance with a normalized quad of first and second coordinates wherein each successive value of the first coordinate corresponds to a computation cycle of the generator, each character being encoded in a set of data instructions related to outlines of the character segments and including a beginning line instruction identifying the initial value of the first coordinate of each of a related pair of outlines for a given second coordinate value, outline change instructions specifying, variously, fixed and variable directions of associated outlines and termination of an outline pair, and an instruction designating the end of a character, each change instruction including an identification of the outline to which it relates, and a number designating the computation cycles to a subsequent instruction, comprising:

means responsive to a beginning line instruction to identify an initial pair of outlines and to store in relation thereto their respective coordinate values of the said first coordinate, means responsive to a change instruction for a related outline, as identified and stored, for computing, in each successive computation cycle, a new coordinate value of said first coordinate for each identified outline in accordance with its associated change instruction, and for maintaining a stored value of said first coordinate for an outline for which there is no change instruction, means for updating the value of the first coordinate in said storing means in accordance with the computed new value thereof, as computed in each computation cycle, and means responsive to the encoded computation cycle number of each successive change instruction to request and receive the next successive instruction for the character upon completion of the encoded number of computation cycles of a present instruction.

* * * * *